US012687491B2

(12) United States Patent
Kavosh et al.

(10) Patent No.: US 12,687,491 B2
(45) Date of Patent: Jul. 21, 2026

(54) APPARATUS AND METHOD FOR IN-SITU OPTICAL INSPECTION OF LASER-INDUCED SURFACE MODIFICATIONS AND LASER PROCESS CONTROL

(71) Applicants: Iraj Kavosh, San Jose, CA (US); Raya Kavosh, San Jose, CA (US); Roxanne Kavosh, San Jose, CA (US)

(72) Inventors: Iraj Kavosh, San Jose, CA (US); Raya Kavosh, San Jose, CA (US); Roxanne Kavosh, San Jose, CA (US)

( * ) Notice: Subject to any disclaimer, the term of this patent is extended or adjusted under 35 U.S.C. 154(b) by 188 days.

(21) Appl. No.: 18/395,601

(22) Filed: Dec. 24, 2023

(65) Prior Publication Data

US 2024/0167948 A1      May 23, 2024

Related U.S. Application Data

(63) Continuation-in-part of application No. 17/189,221, filed on Mar. 1, 2021, now Pat. No. 11,860,091.

(60) Provisional application No. 62/956,241, filed on Jan. 1, 2020.

(51) Int. Cl.
*G01N 21/47*          (2006.01)

(52) U.S. Cl.
CPC .................... *G01N 21/4738* (2013.01); *G01N 2201/06113* (2013.01); *G01N 2201/0636* (2013.01)

(58) Field of Classification Search
CPC ..... G01N 21/4738; G01N 2201/06113; G01N 2201/0636; G01N 2021/4709; G01N 21/47; G01N 21/718; G01N 2021/4735; G01N 2021/556; G01N 2021/8411; G01N 2201/105; G01N 21/8851; G01N 21/8806
See application file for complete search history.

(56) References Cited

U.S. PATENT DOCUMENTS

| | | | | |
|---|---|---|---|---|
| 5,781,294 | A | * | 7/1998 | Nakata ............... G01N 21/1702 |
| | | | | 356/502 |
| 5,909,276 | A | * | 6/1999 | Kinney .................. G01N 21/94 |
| | | | | 356/336 |
| 7,079,249 | B2 | * | 7/2006 | Nicolaides ......... G01N 21/9501 |
| | | | | 356/432 |
| 2004/0119983 | A1 | * | 6/2004 | Brasen ................. G01B 11/303 |
| | | | | 356/492 |
| 2006/0012791 | A1 | * | 1/2006 | Reinhorn ........... G01N 21/9501 |
| | | | | 356/237.1 |

* cited by examiner

*Primary Examiner* — Abdullahi Nur
(74) *Attorney, Agent, or Firm* — Edmond DeFrank

(57)          ABSTRACT

The embodiments disclose a method for in-situ processing and inspection of an object including utilizing a process laser beam source in a process for a probe light beam source for in-situ inspection of an object surface, impinging at least one process laser pulse onto a target surface region, modifying at least one of the optical, mechanical, or chemical properties of a first region of the surface, generating back-reflected scattered laser light and/or laser light reflected in a specular beam off an illuminated spot on the object surface, generating scattered light emitted in a laser-surface interaction, collecting and measuring the generated scattered light and/or laser light reflected in a specular beam off an illuminated spot, and constructing an image of the modified surface wherein the constructed image is used to adjust laser pulse intensities for predetermined modifications to other regions.

19 Claims, 47 Drawing Sheets

APPARATUS AND METHOD FOR IN-SITU OPTICAL INSPECTION OF LASER-INDUCED SURFACE MODIFICATIONS AND LASER PROCESS CONTROL

CROSS-REFERENCE TO RELATED APPLICATIONS

This patent application is a Continuation-in-part and claims priority to the United States patent application entitled: "APPARATUS AND METHOD FOR IN-SITU OPTICAL INSPECTION OF LASER-INDUCED SURFACE MODIFICATIONS AND LASER PROCESS CONTROL" U.S. Provisional patent application Ser. No. 17/189,221 filed on Jan. 3, 2021 by IRAJ KAVOSH, based on U.S. Provisional Patent Application Ser. No. 62/956,241 filed Jan. 1, 2020, entitled "APPARATUS AND METHOD FOR IN-SITU OPTICAL INSPECTION OF LASER-INDUCED SURFACE MODIFICATIONS AND LASER PROCESS CONTROL", by IRAJ KAVOSH, all Applications being incorporated herein by reference.

BACKGROUND

Measuring the condition of a smooth flat surface has increased in use as technologies have progressed in fields of miniaturization, for example, nano technology. Metrology is a field of measurement that includes measuring the condition of a smooth flat surface. Light scatterometry is a method for making measurements of a surface by analyzing the angles (and/or intensity) of refracted light projected on the surface. These techniques are used for inspection purposes.

DETAILED DESCRIPTION OF THE INVENTION

Figure 1:
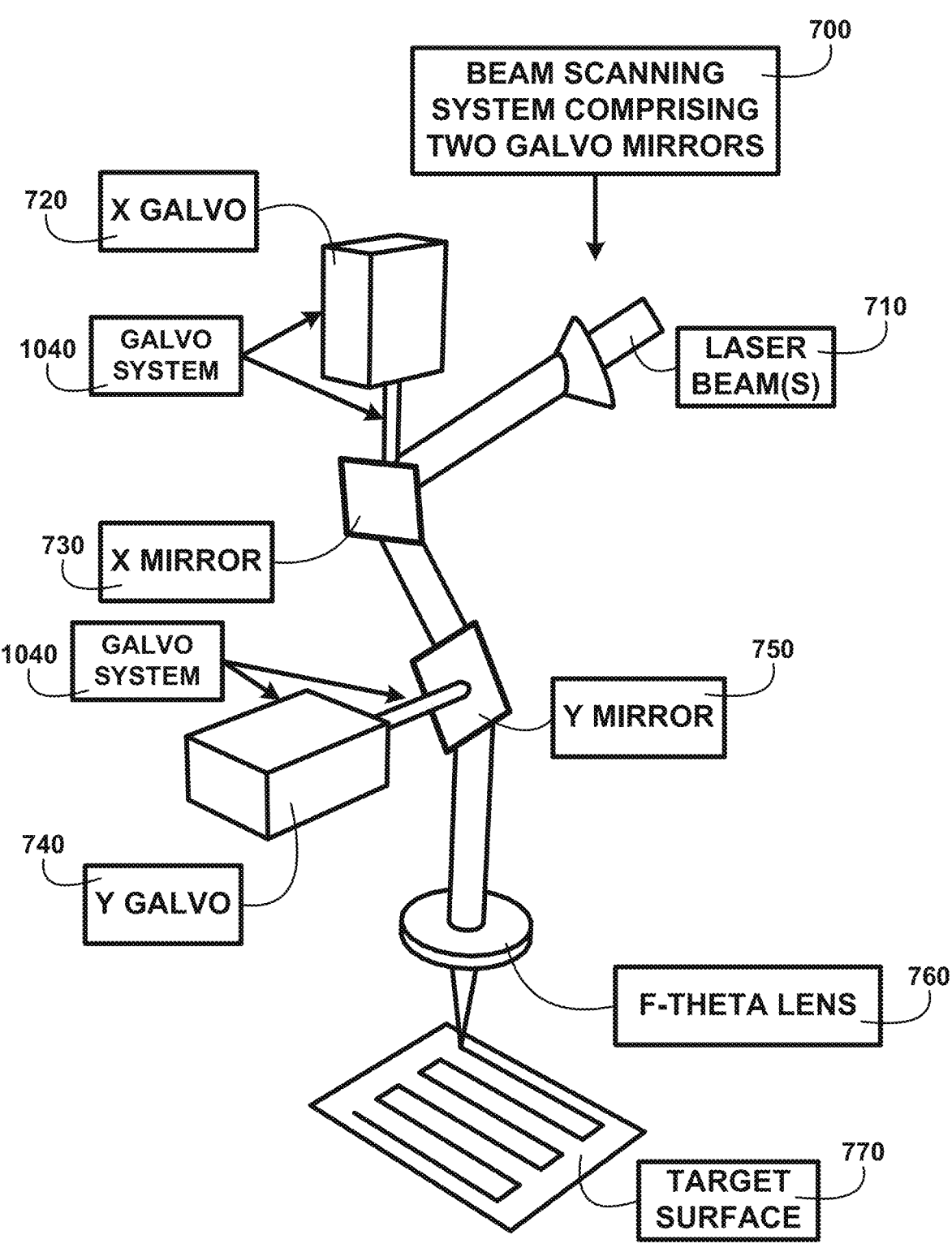
FIG. 1 shows for illustrative purposes only an example of a beam scanning system comprising two galvo mirrors of one embodiment.

In the following description, reference is made to the accompanying drawings, which form a part hereof, and which are shown by way of illustration a specific example in which the invention may be practiced. It is to be understood that other embodiments may be utilized and structural changes may be made without departing from the scope of the present invention.

General Overview

It should be noted that the descriptions that follow, for example, in terms of an apparatus and method for in-situ optical inspection of laser-induced surface modifications and laser process control described for illustrative purposes and the underlying system can apply to any number and multiple types of surface inspections and modifications. In one embodiment of the present invention, the apparatus and method for in-situ optical inspection of laser-induced surface modifications and laser process control can be configured using at least one light source. The apparatus and method for in-situ optical inspection of laser-induced surface modifications and laser process control can be configured to include at least one mirror device and can be configured to include at least one Process laser beam and one Probe beam using the present invention.

The embodiments are directed toward optical inspection of laser-induced surface modifications such as surface micro and nano-roughness, surface cleaning and coating removal, surface micro and nanopatterning, surface micro and nano-structuring, and surface chemistry based on the analysis of scattered probe light reflected off the laser-modified surface. In particular, this invention relates to combining an optical inspection system and a laser processing system into one integrated tool enabling the laser surface modification process, in-situ monitoring of the laser-induced surface changes, and real-time control of the laser process vital parameters.

The apparatus and method for in-situ optical inspection of laser-induced surface modifications and laser process control include two optical techniques of Laser Surface Modification and Treatment Process, and Light Scatterometry-based Metrology are combined to enable in-situ inspection of a laser-treated surface and in-situ control of the laser process. A bi-directional common optics path, or a portion of it, is utilized to deliver both the Process beam (to induce a desired surface modification) and the Probe beam (to examine surface conditions) onto a target surface and to collect and transport probe light beams reflected (or emitted) from the surface back to the apparatus for measurement and analysis.

The embodiments describe two optical techniques of Laser Surface Modification and Treatment Process, and Light Scatterometry-based Metrology is combined to enable in-situ inspection of a laser-treated surface and in-situ control of the laser process. A bi-directional common optics path, or a portion of it, is utilized to deliver both the Process beam (to induce a desired surface modification) and the Probe beam (to examine surface conditions) onto a target surface and to collect and transport probe light beams reflected (or emitted) from the surface back to the apparatus for measurement and analysis.

Light scatterometry is a nondestructive technique for inspection and analysis of surface conditions such as surface roughness, surface texture and microstructure, surface contaminants and defects, and surface coating materials. A laser beam can accurately deliver appropriate radiation intensity at a precise position on a target surface where it is needed to achieve a desired surface change.

The apparatus and method for in-situ optical inspection of laser-induced surface modifications and laser process control combines light scatterometry and laser surface processing, e.g., ablation of a target surface. Laser surface modification processes span across a wide spectrum of applications and are performed to achieve an optimized surface condition or performance for a given application.

Some examples of surface modification processes using pulse lasers include laser cleaning when particulate, molecular contaminants or stain materials can be removed by a pulse UV laser to improve surface cleanliness, e.g., applications in the hard disk drive, HDD, and semiconductor industries to clean disks and wafers. Laser surface texturing to achieve a desired surface micro or nano roughness, e.g., disk laser texturing process to produce surface bumps to reduce slide-disk friction in hard disk drive assembly, or selectively ablating surface materials to define a desired surface texture structure and selectively ablating materials to define a desired surface texture roughness and enhance surface optical properties, e.g., minimize undesired surface reflectivity.

Laser surface ablation process for surface cleaning, e.g., rust or oil removal, surface coating removal, e.g, surface decorating where coating materials (e.g., paint, or organic coating materials) are removed entirely from a surface to expose the surface under-layer or the substrate for surface rework. Surface decorating where coating materials (e.g., paint, or organic coating materials) are removed partially, e.g., removing a damaged top layer, to rework a damaged area. Surface materials are selectively ablated and removed at desired locations for surface patterning, e.g., nano and micro structuring, and generating surface pits, micro-holes, and grooves in a pattern. Laser surface heat treatment to alter surface chemistry and composition. Some other examples of laser applications in surface modification and surface engineering include, but are not limited to, laser-induced enhanced mechanical properties (e.g., increasing surface hardness, or reduction in friction and wear), and applications in altering surface chemistry (e.g., laser carbonizing).

A laser surface modification process can alter the optical properties of a target surface and instigate changes in surface light scattering, reflectivity, and absorption behavior at specific (laser) light wavelength(s). These laser-induced changes lend scatterometry-based optical inspection a suitable technique for inspecting laser-treated surfaces and evaluating laser-induced surface change. For example, Laser surface ablation can alter surface color and/or surface roughness. Changes in surface color and surface roughness can induce changes in surface reflectivity and scattering characteristics of light at a specific wavelength(s). An appropriately selected light beam can be used as a probe to analyze the changes in surface optical response to the probe light beam and to evaluate and assess the condition of laser-treated regions on the surface.

The term "Galvo" as used herein refers to a Galvanometer, an electromechanical instrument that deflects a light beam by using a mirror, meaning that it has sensed an electric current with characteristics of operating at fast speeds and detecting intricate fine detailed markings.

In FIGS. 5-29 the reference numbers follow the following: Drawing reference numbers 100 to 199 refers to an OSI Assembly. Drawing reference numbers 200 to 299 refer to a Process Laser System. Drawing reference numbers 300 to 399 refer to a System Control Unit. Drawing reference numbers 400 to 499 refer to illustrations of appropriate optics to direct combined probe and process laser beams to COA, optics, e.g., a reflective mirror 400. Drawing reference numbers 500 to 599 refer to a Control Optics Assembly (COA). Drawing reference numbers 600 to 699 refer to illustrations of a Positioning Stage Assembly 604 of one embodiment.

Embodiments of the present invention include an apparatus and method that combines a scatterometry-based optical inspection system and a laser surface processing system (more specifically, a pulse laser) into one integrated tool to permit in-situ inspection of a target surface under a laser modification process. The embodiments provide real-time (in-situ) control of laser pulse intensity at the surface. The apparatus and method provide the capability to exploit laser-induced changes in the surface optical response to a probe light beam (e.g., a laser probe beam) of a specific wavelength, i.e., how the light reflected and scattered from the surface at the specific wavelength deviates after the laser surface modification.

Specifically, this apparatus and method provide a bi-directional common optics path, or a portion of it, for process and probe beams by combining and directing collinear process pulse laser and probe laser (i.e., illumination light) beams along a common optic path. Positioning, and focusing both process and probe laser beams at a region on a target surface by shared common focusing optics so that the position of focus spots of the probe and process laser beams a the region are substantially superimposed. Shine probe illumination beam onto a region. Collecting back-scattered light reflected off the region through the same shared focusing optics, and directing it back along the common optics path, or a portion of it, into the apparatus. Sampling, measuring, and analyzing the arriving back-scattered probe light intensity either just before the start of a process laser pulse or just after the completion of the process laser pulse, to determine the surface condition of the region. Utilizing system control logic for in-situ muting or adjusting the intensity of the ensuing laser pulse based on the analysis and assessment of the surface condition of the region, thereby providing in-situ control of the laser surface modification process.

Sampling and measuring the probe light beam is temporally separated from the process laser pulse. The detection and analysis of the scattered light can be executed immediately following the completion of the process laser pulse at the first region. Such in-situ post-process analysis provides a means for in-situ evaluation of the laser-modified region and effectiveness of the laser modification process at the region after delivery of the pulse energy, i.e., post-laser-treatment in-situ inspection. Post-laser-treatment in-situ inspection, in turn, can be utilized by the apparatus control logic for real-time control of the surface treatment process by adjusting the energy of the ensuing laser pulse at the next region, and/or to map the untreated or under-treated regions of the workpiece for a rework run. This methodology is more suited for a fresh, untreated surface.

Additionally, the in-situ detection and analysis of the back-scattered light reflected off of a probed region can be executed just before the delivery of a process laser pulse to the region, i.e., pre-laser-treatment in-situ inspection. The analysis of pre-laser-treatment surface conditions, in turn, is utilized by the apparatus control logic to control the laser process by adjusting or muting the energy of the ensuing laser pulse(s) delivered at the region to induce a desired surface modification.

FIG. 1 shows for illustrative purposes only an example of a beam scanning system comprising two galvo mirrors of one embodiment. FIG. 1 shows a beam scanning system comprising two galvo mirrors 700 for scanning an area in XY direction. A galvo system 1040 includes a laser beam 710, an X galvo 720, an X mirror 730, a Y galvo 740, a Y mirror 750, an f-theta lens 760, and a target surface 770.

The beam scanning system comprising two galvo mirrors 700 is one embodiment of a method for the laser surface modification process combining a pulsed laser modification process, an in-situ surface inspection of the laser-treated surface, and in-situ laser pulse intensity adjustment to control the laser surface modification process. The method comprises the following steps:

The beam scanning system provides a pulsed process laser source to induce an intended modification in a surface material's optical and/or mechanical/chemical, and/or physical properties, and/or surface topography, wherein the induced surface changes alter the region's light-scattering and/or reflectivity response to a probe illumination light beam; directing said process laser beam through an optics path to shape, position, and focus it at a region on the surface. The beam scanning system directs a single, or multiple, process laser pulse at a pre-set pulse intensity to induce surface modification at a first region on the surface.

The beam scanning system provides a probe illumination light beam; directing it to the optics path of the said pulse laser beam to combine and collinear the optical paths of the probe beam and the pulse laser beam, directing the probe beam through the common optics path to focus and deliver it at the same region on the target surface utilizing the common optics of a Control Optics Assembly, whereby superimposing the position of focus spot of the probe illumination laser beam over the focus spot of the process laser beam on the surface and collecting back-scattered probe light reflected off the illuminated region, the first region impinged by the illuminating probe beam, by the same delivery focusing optics of the Control Optics Assembly. The beam scanning system directs the collected light from the illuminated region through said common optics path, or a portion of it, thereby providing a bi-directional common optic path, or a portion of it, for the source process laser beam, probe illumination light beam, and the collected back-scattered probe light arriving from the illuminated region and separating the collected probe light beam, or a portion of it, and directing it toward a Photo-detector sub-assembly. The beam scanning system samples and measures the power of the probe light received by said Photo-detector, after the process laser pulse(s) is completed, and the measured power and the measurement value with predetermined reference values, corresponding to an interrogated region, to assess the surface condition of the laser-treated region in achieving the intended laser-induced surface changes. The beam scanning system moves the target workpiece to position the next region of the surface under the impinging process probes laser beams and adjusts laser pulse intensity for the ensuing laser pulse via system control logic and laser controller to achieve the intended surface modification at the next region of one embodiment.

DETAILED DESCRIPTION

Figure 2:
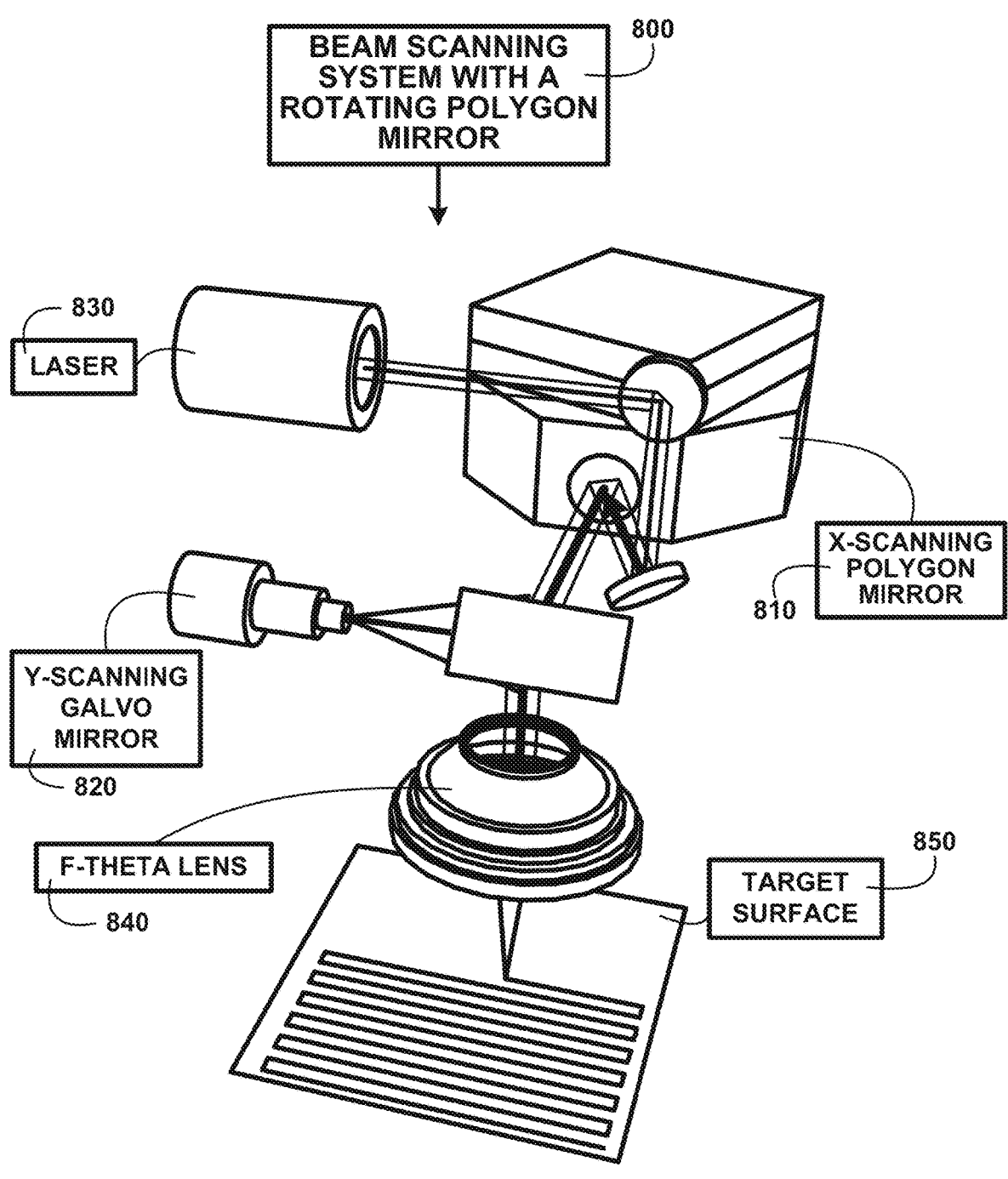
FIG. 2 shows for illustrative purposes only an example of a beam scanning system with a rotating polygon mirror of one embodiment.

FIG. 2 shows for illustrative purposes only an example of a beam scanning system with a rotating polygon mirror of one embodiment. FIG. 2 shows a beam scanning system with a rotating polygon mirror 800, a single-axis galvo mirror, and an F-Theta Lens 840. The single-axis galvo mirror in this embodiment is a Y-scanning Galvo Mirror 820. The rotating polygon mirror in this embodiment is an X-scanning Polygon Mirror 810. The beam scanning system with a rotating polygon mirror 800 includes in this embodiment a laser 830 for projecting a beam to and from a Target Surface 850 using the X-scanning Polygon Mirror 810, Y-scanning Galvo Mirror 820, and F-Theta Lens 840.

The beam scanning system with a rotating polygon mirror is another embodiment of the beam scanning system. The beam scanning system provides sampling, measuring, and analyzing power of the collected back-scattered probe light reflected off of a laser-treated region, or fluorescence light emitted from a region is temporally synchronized with the process laser pulse and temporally separated from the process laser pulse and executed after a process laser pulse, or multiple of pulses, impinging the surface region is completed to perform in-situ post-laser-modification inspection of the region and adjusting laser pulse intensity at the next region if the intended modification at the previous region was not achieved.

The beam scanning system comprises assemblies, subsystems, and components to enable laser surface modification on a workpiece surface by delivering pulsed laser energy at the workpiece surface and inducing a desired modification at a region impinged by the laser beam, in-situ inspection of the region surface conditions by delivering a probe light beam at a laser-treated region before and/or after laser-induced modification, in-situ analyzing the region's condition, and real-time adjusting intensity of the ensuing laser pulses for controlling the surface modification process for a desired outcome. The beam scanning system provides a process laser source to provide a laser radiation beam source for modification of a target surface, wherein the target surface material is absorptive of said laser beam energy. The beam scanning system further comprises at least one Optical Surface Inspection, OSI, assembly, the assembly comprising a probe illumination light beam source for illuminating a region on said surface and a combining dichroic mirror to combine said process laser and probe light beams. A Photo-detector sub-assembly for sampling and measuring collected back-scattered light reflected from the said region as a result of illuminating the region. Also included is an Optical Reflector Component comprising a thru-hole opening. The functions of the Optical Reflector Component comprise allowing the outgoing probe illumination beam(s), preferably with a diameter smaller than the diameter of said opening, to pass through the opening, and to travel toward said combining mirror, separating a portion of the collected back-scattered probe light beam(s), that is reflected off a region on the target surface and transported back inside said OSI, reflecting and directing said portion of the back-scattered probe light beam(s) toward said Photo-detector sub-assembly in the OSI, preventing, or minimizing, specularly-reflected probe light reflected from the target surface from entering Photo-detector by allowing the specularly-reflected probe light mainly transmit through the Reflector Component opening and Positioning Motion Stage Assembly for controlling, positioning, and tracking the position of the process and probe beams on the target surface of one embodiment.

Figure 3:
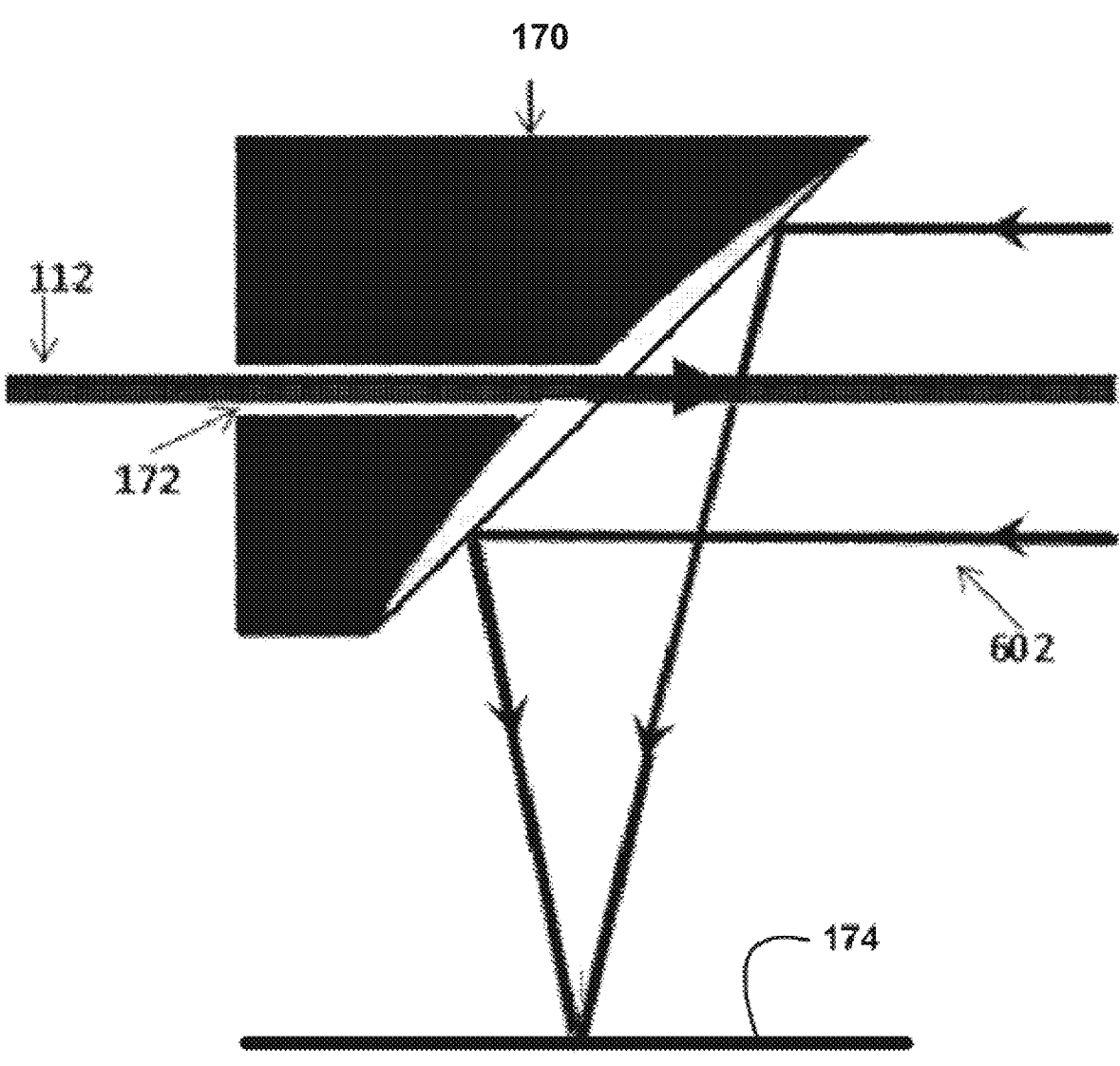
FIG. 3 shows for illustrative purposes only an example of an Optical Reflective Component (with a thru-hole opening) of one embodiment.

FIG. 3 shows for illustrative purposes only an example of an Optical Reflective Component of one embodiment. FIG. 3 shows Optical Reflective Component 170 (of an alternative geometry) with a pass-through-opening 172 that allows source probe beam 112 to pass through the component, and reflective surface 174 reflects the incoming back-scattered probe light reflected off from the target surface target sample 602 of one embodiment.

Figure 4A:
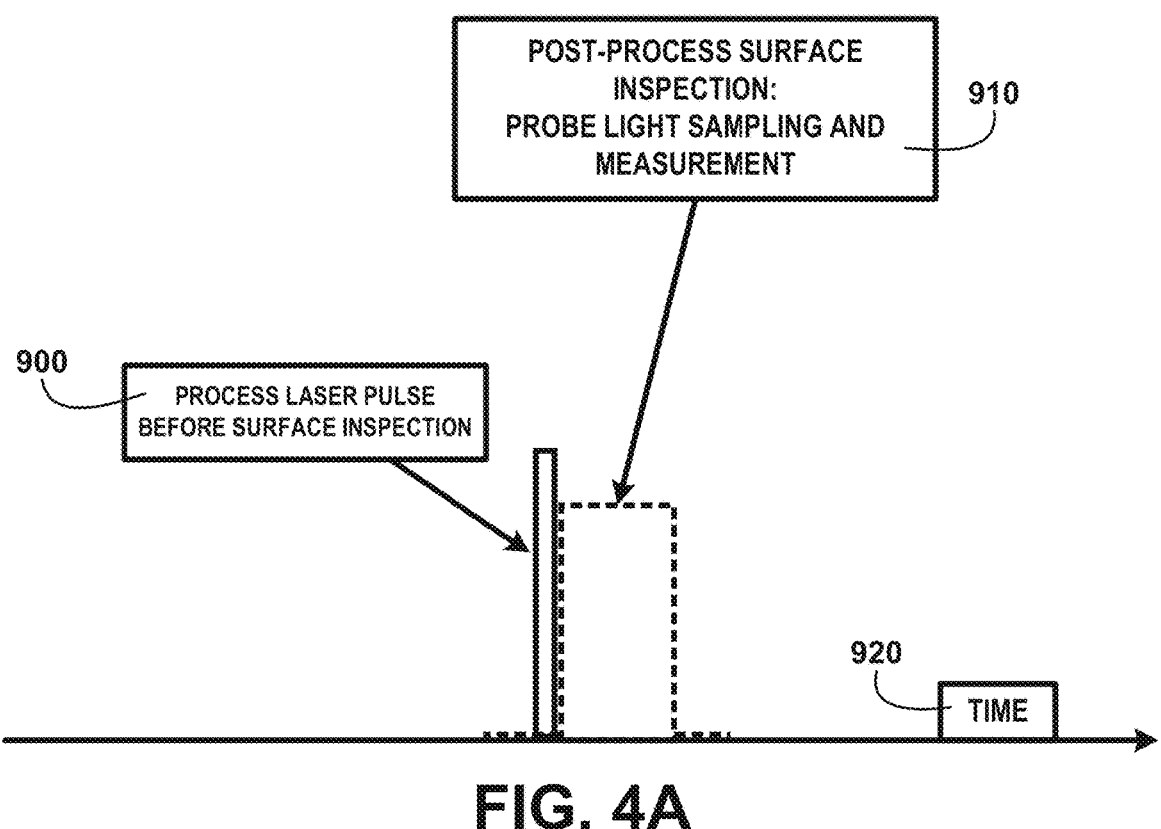
FIG. 4A shows for illustrative purposes only an example of a temporal separation of probe beam sampling of one embodiment.

FIG. 4A shows for illustrative purposes only an example of a temporal separation of probe beam sampling of one embodiment. FIG. 4A shows a temporal separation of probe beam sampling (dotted signal) for inspection and process laser pulse. A process laser pulse before surface inspection 900 and a post-process surface inspection: probe light sampling and measurement 910 can be performed over a predetermined time 920. Probe beam sampling and measurement can be executed before the process pulse (pre-process inspection), after the process pulse (post-process inspection), or both before and after the laser process pulse impinges a region. The apparatus further comprises a muted or removed process laser power utilized for inspecting a surface and analyzing the surface-specific conditions of one embodiment.

Figure 4B:
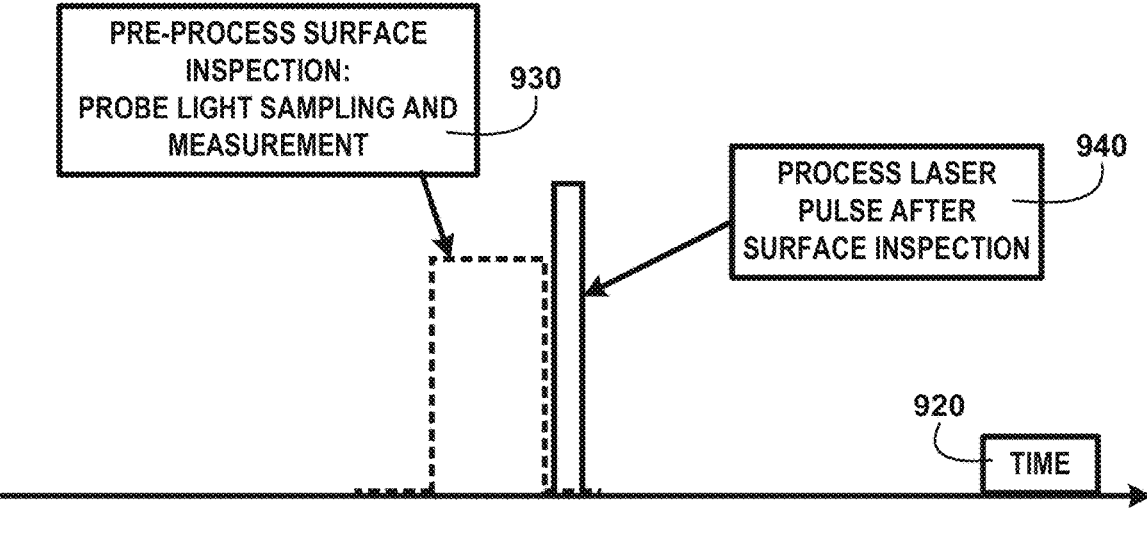
FIG. 4B shows for illustrative purposes only an example of a temporal separation of probe beam sampling of one embodiment.

FIG. 4B shows for illustrative purposes only an example of a temporal separation of probe beam sampling of one embodiment. FIG. 4B shows a pre-process surface inspection: probe light sampling and measurement 930 and a process laser pulse after surface inspection 940 over a predetermined time 920.

The apparatus provides at least one device for extracting and evacuating by-products of the laser surface modification process including particles, contaminants, paint dust, and gases produced in laser surface cleaning and laser surface paint and coating removal of one embodiment.

Figure 5:
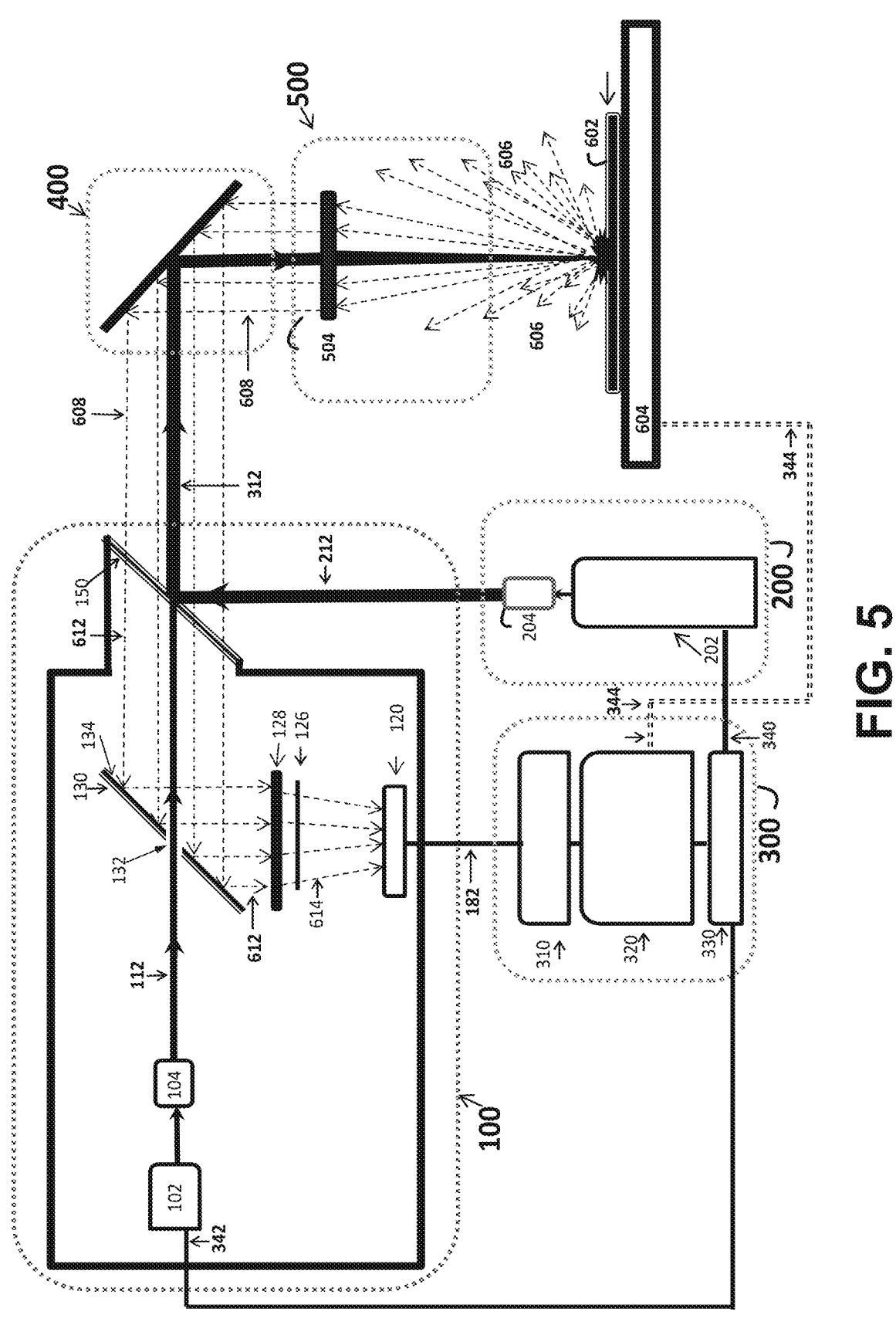
FIG. 5 shows for illustrative purposes only an example of an integrated apparatus of one embodiment.

Integrated Apparatus:

FIG. 5 shows for illustrative purposes only an example of an integrated apparatus of one embodiment. FIG. 5 shows an integrated apparatus comprising a group of systems, units, and assemblies. The integrated apparatus includes an Optical Surface Inspection (OSI) system 100. The Optical Surface Inspection (OSI) system 100 includes a probe laser-A 102 that emits probe beam 112 at wavelength yt, and beam adjusting optics 104 to facilitate producing a desired spot size at the target surface by focusing lens 504 a component of a control optics assembly, COA, 500.

The Optical Surface Inspection (OSI) system 100 includes an Optical Reflector Component 130 comprising a surface with high-reflectivity 134 and a thru-hole opening 132, to allow the source probe beam 112 to pass through the mirror, placed in the path of the probe beam 112. Further, the surface of high reflectivity 134 separates a portion of back-scattered probe light beam(s) 612, reflected off of the target surface, and directs it toward the Photo-detector (e.g., a Silicon Photodiode) 120.

The Optical Surface Inspection (OSI) system 100 includes a dichroic combiner mirror 150 that highly reflects process beam and transmits probe beam(s), and is appropriately positioned and oriented to combine and collinear process beam 212 and probe beam 112 and direct the combined beams 312 toward a turning mirror 400.

The Optical Surface Inspection (OSI) system 100 includes a Photo-detector subassembly comprising a Photo-detector 120 which detects probe light power and sends probe power signal to the signal analyzer unit 310, and appropriate optical components, e.g., optical filters 126 to transmit probe light of a wavelength of interest, and condensing lens 128.

The Optical Surface Inspection (OSI) system 100 includes a Process Laser system 200, as an energy source for modifying the surface of a target, comprising one process laser beam source 202 that emits a process laser beam 212, and directs it toward beam adjusting optics 204 and dichroic mirror 150.

The Optical Surface Inspection (OSI) system 100 includes an Apparatus Control Unit 300 comprising signal analyzer 310, system control logic and electronics 320, and laser and system control software 330. The Optical Surface Inspection (OSI) system 100 includes a Turning Optics 400 comprising appropriate optical components to direct probe and process beams to Control Optics Assembly 500. The Optical Surface Inspection (OSI) system 100 includes a Control Optics Assembly 500 comprising at least a focusing lens 504. The Optical Surface Inspection (OSI) system 100 includes a Positioning Stage Assembly comprising translation stage system 604, and a mounting mechanism to hold the target sample 602 of one embodiment.

A bi-directional common optics path, or a portion of it, is utilized to deliver both Process beam (to induce a desired surface modification) and Probe beam (to examine surface conditions) onto a target surface and to collect and transport probe light beams reflected (or emitted) from the surface back to the apparatus for measurement and analysis.

The intensity distribution profile of the focal spot of the process laser beam or the probe light is a flat-top profile, Gaussian profile, multi-mode, super-Gaussian profile. The focus spot is a circular, or semi-circular, shape, or a square shape; or a rectangular shape spot of the desired aspect ratio.

The COA comprises appropriate achromatic optics, e.g., Telecentric, F-Theta, or simple focusing lens, whereby achromaticity requirements of the COA are realized to achieve the desired superimposition of the focal spots of probe and process laser beams on a target surface. The COA moves the workpiece to position the next surface region under the superimposed focal spots of the process pulse laser and probe light beams. The COA comprises at least one beam scanning mechanism and focusing optics to illuminate a target surface region by region, by scanning the superimposed focal spots of the probe and process beams on the target surface area, controlling, positioning, and tracking the position of the superimposed focal spots of the probe illumination light and process laser beams on the target surface region by region, wherein, the position and motion of the beams on the target is controlled and tracked by the System Control Unit.

The Control Optics Assembly, COA, further comprises beam shaping and focusing optics to shape and focus the process laser and probe beams to focal spots of desired shape and sizes on the target surface. The beam shaping optics comprise refractive optics; or diffractive optics, e.g., two cylindrical lenses of different focal lengths. The Control Optics Assembly, COA, comprises optical means to shape, focus, and superimpose the focal spots of the probe and the process beams onto a region on the target surface continuously by a beam scanning mechanism. The beam scanning mechanism comprises a beam scanning device and focusing optics to illuminate a target surface region by region, by scanning the superimposed focal spots of the probe and process beams on the target surface, controlling, positioning, and tracking the position of the focal spots of the superimposed probe illumination light and process laser beams on the target surface region by region, wherein a region overlaps the previous region(s) and/or the subsequent region(s), and further wherein the scanning device comprises XY scanning galvanometric optics, or combined 1D-linear translation and rotating polygon mirror, or combined scanning galvo mirror and rotating polygon mirror of one embodiment.

Figure 6:
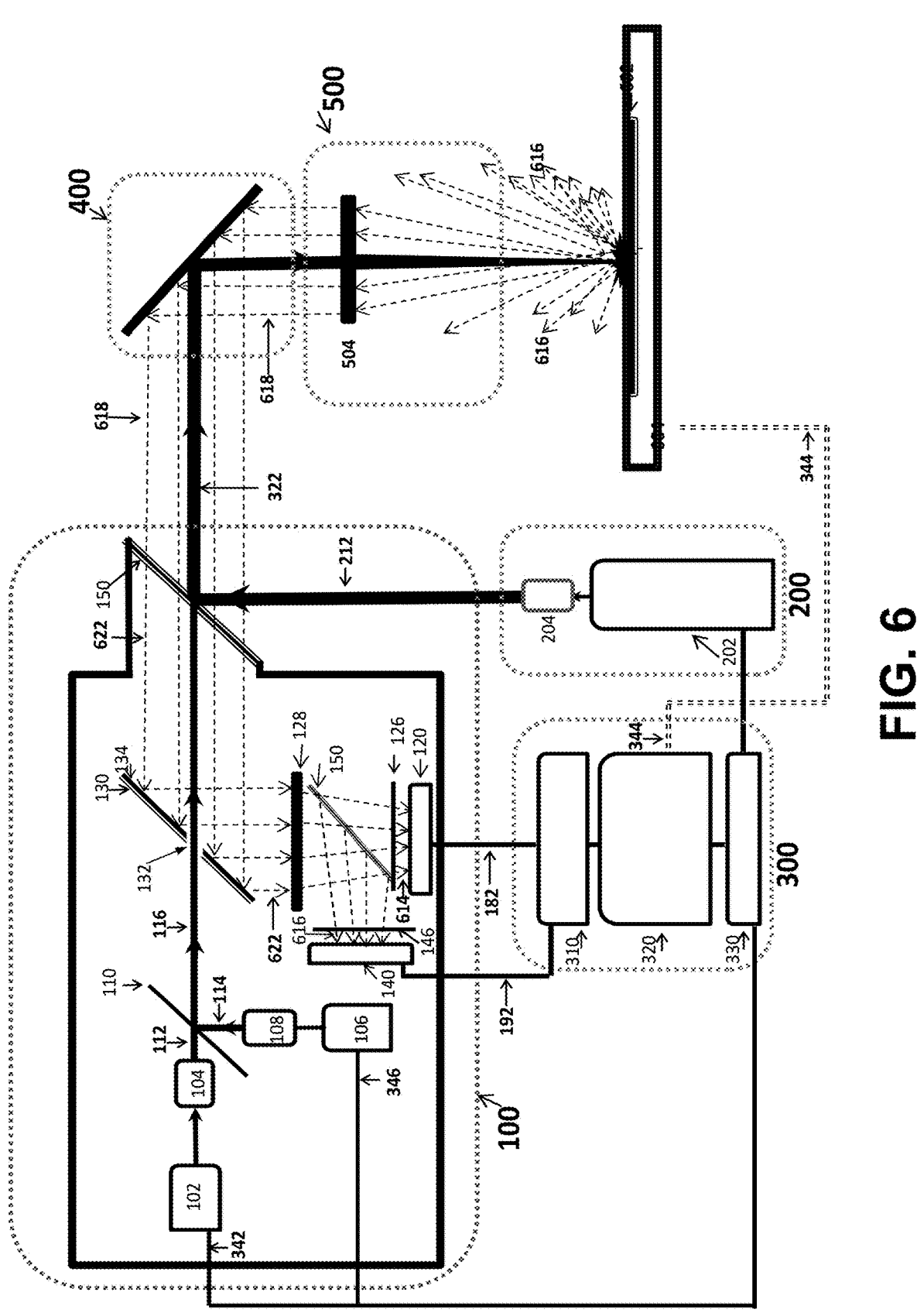
FIG. 6 shows for illustrative purposes only an example of additional integrated apparatus components of one embodiment.

FIG. 6 shows for illustrative purposes only an example of additional integrated apparatus components of one embodiment. FIG. 6 shows additional integrated apparatus components including probe laser-B source 106 that emits a probe laser beam 114, beam adjusting optics 108, and a dichroic mirror 110, to combine and collinear probe beams 112 and 114, and direct the combined probe beams 116, toward the thru-hole in the Optical Reflector Component 130. FIG. 2 also shows a Photo-detector 140, an optical filter 146, and a dichroic mirror 150. The dichroic mirror 150 splits the returned probe beams 622 based on its constituent wavelengths to reach Photo-detectors 120 and 140 of one embodiment.

Figure 7:
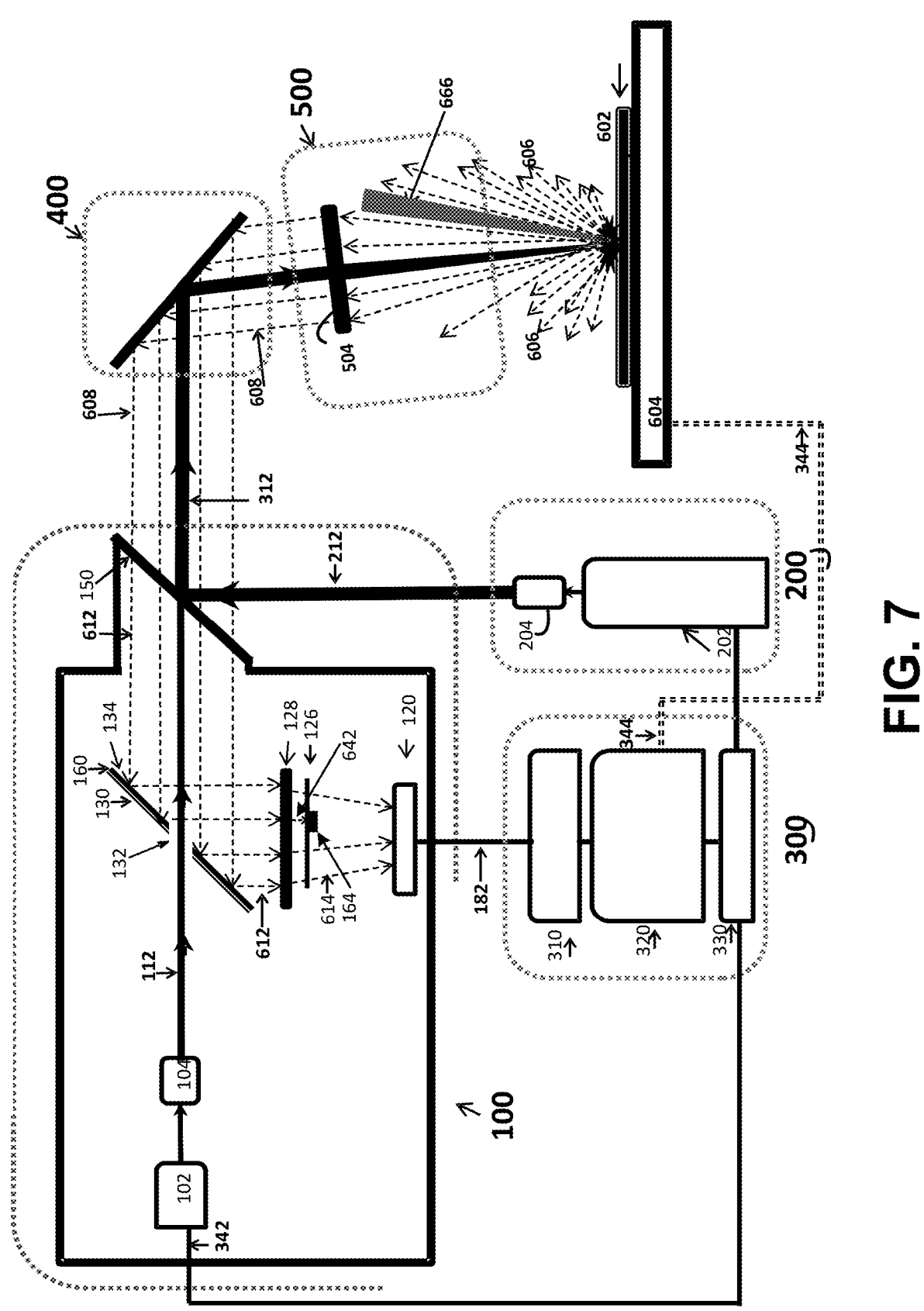
FIG. 7 shows for illustrative purposes only an example of beam splitting and blocking components of one embodiment.

FIG. 7 shows for illustrative purposes only an example of beam splitting and blocking components of one embodiment. FIG. 7 shows a beam-splitting optic 160 that partially transmits the outgoing probe beam(s) and reflects part of the returned scattered probe light, reflected off of the target surface. Additionally FIG. 7 shows a light-blocking component 164 that blocks and prevents the specularly-reflected probe beam 642 from reaching the Photo-detector 120 of one embodiment.

Figure 8A:
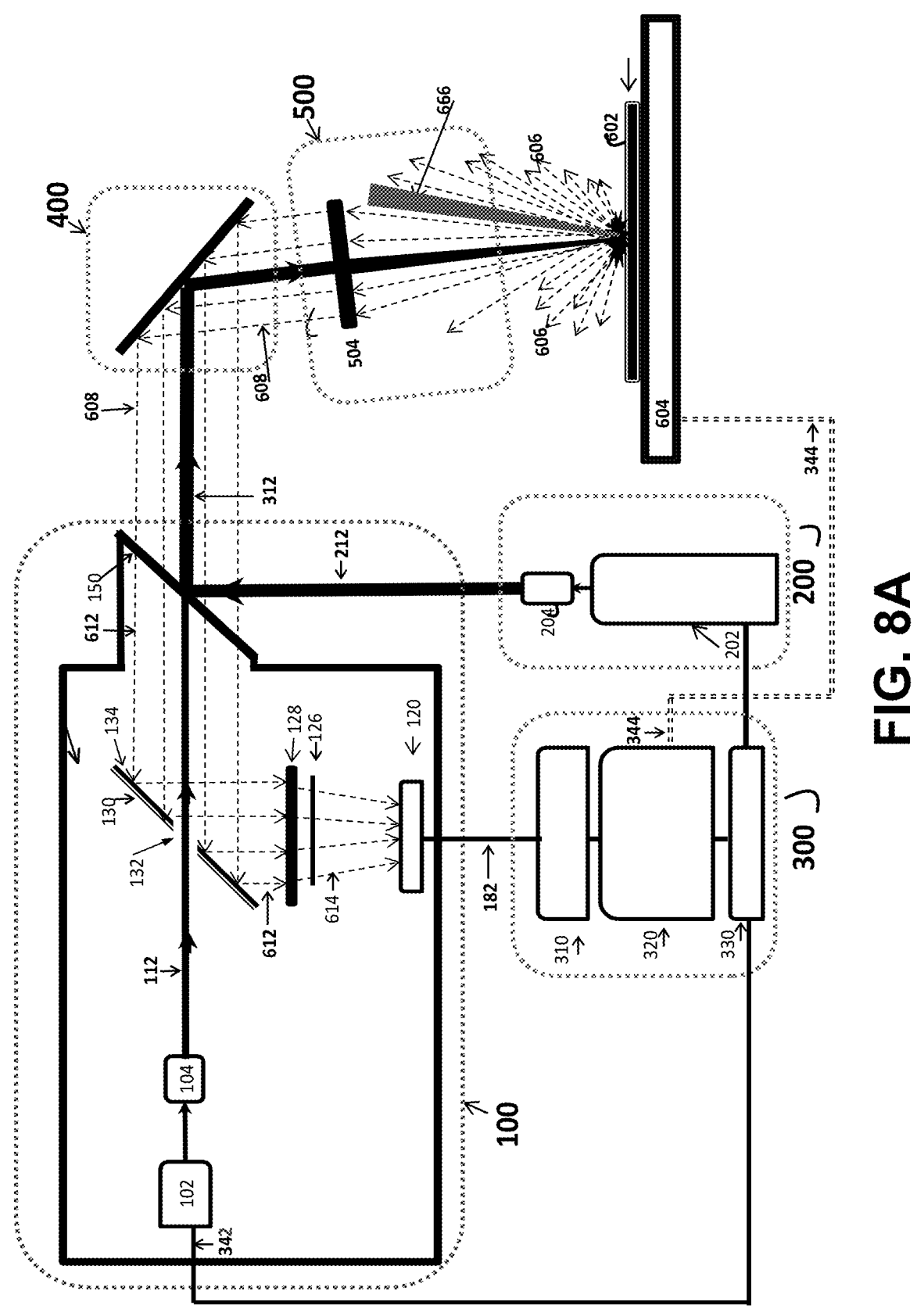
FIG. 8A shows for illustrative purposes only an example of a COA and focusing lens plane of one embodiment.

FIG. 8A shows for illustrative purposes only an example of a COA and focusing lens plane of one embodiment. FIG. 8A shows a COA and focusing lens plane that is tilted concerning the target surface so that the probe and process beams emerging from COA are not normal to the target surface to minimize or prevent specularly-reflected beam 666 reflected off of the target surface from reaching the Photo-detector(s) of one embodiment.

Figure 8B:
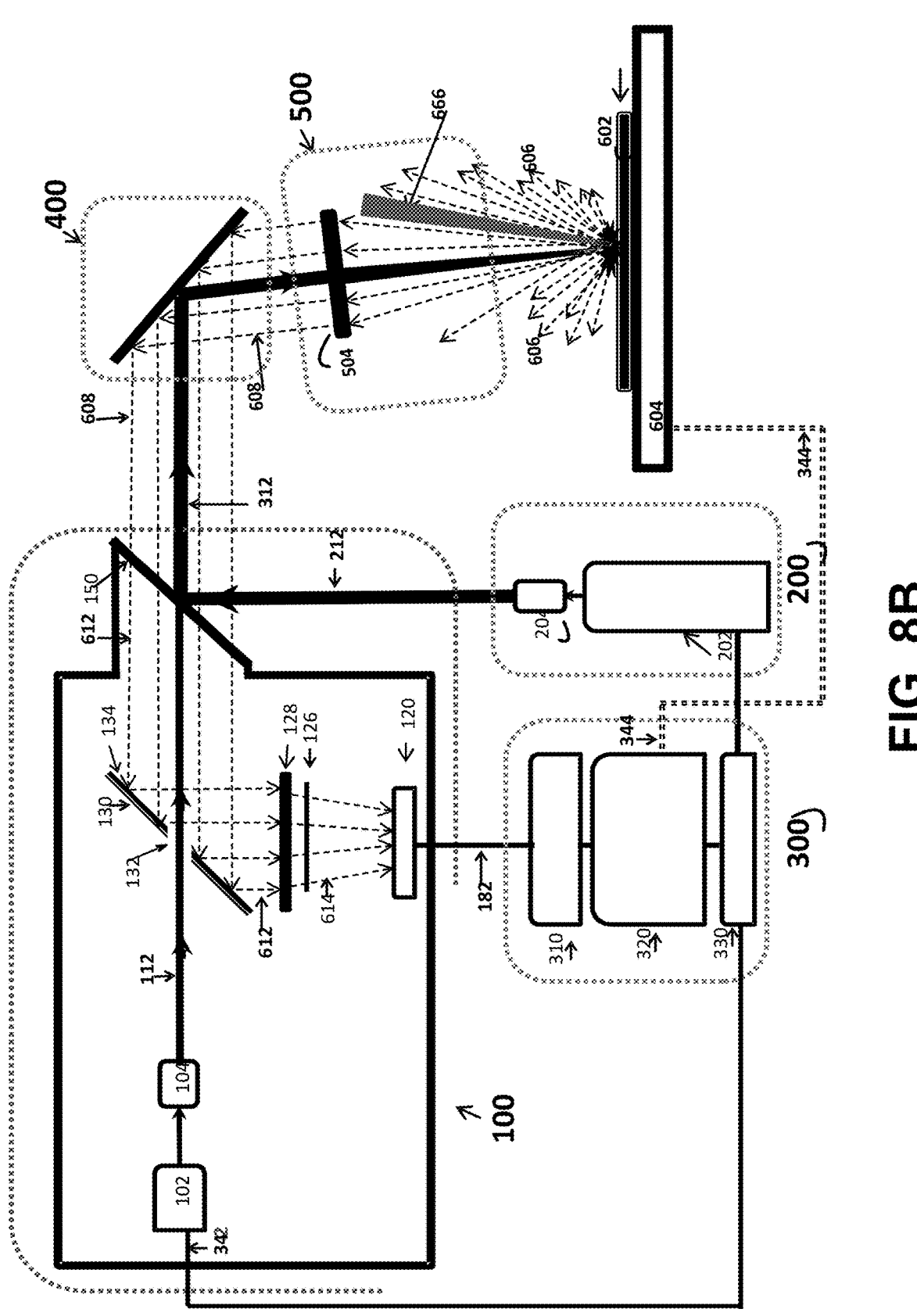
FIG. 8B shows for illustrative purposes only an example of the COA and target surface of one embodiment.

FIG. 8B shows for illustrative purposes only an example of the COA and target surface of one embodiment. FIG. 8B shows the COA and the target surface are tilted concerning each other so that the probe and process beams emerging from COA are not normal to the target surface to minimize or prevent specularly-reflected beam 666 reflected off of the target surface from reaching Photo-detector(s) of one embodiment.

Figure 8C:
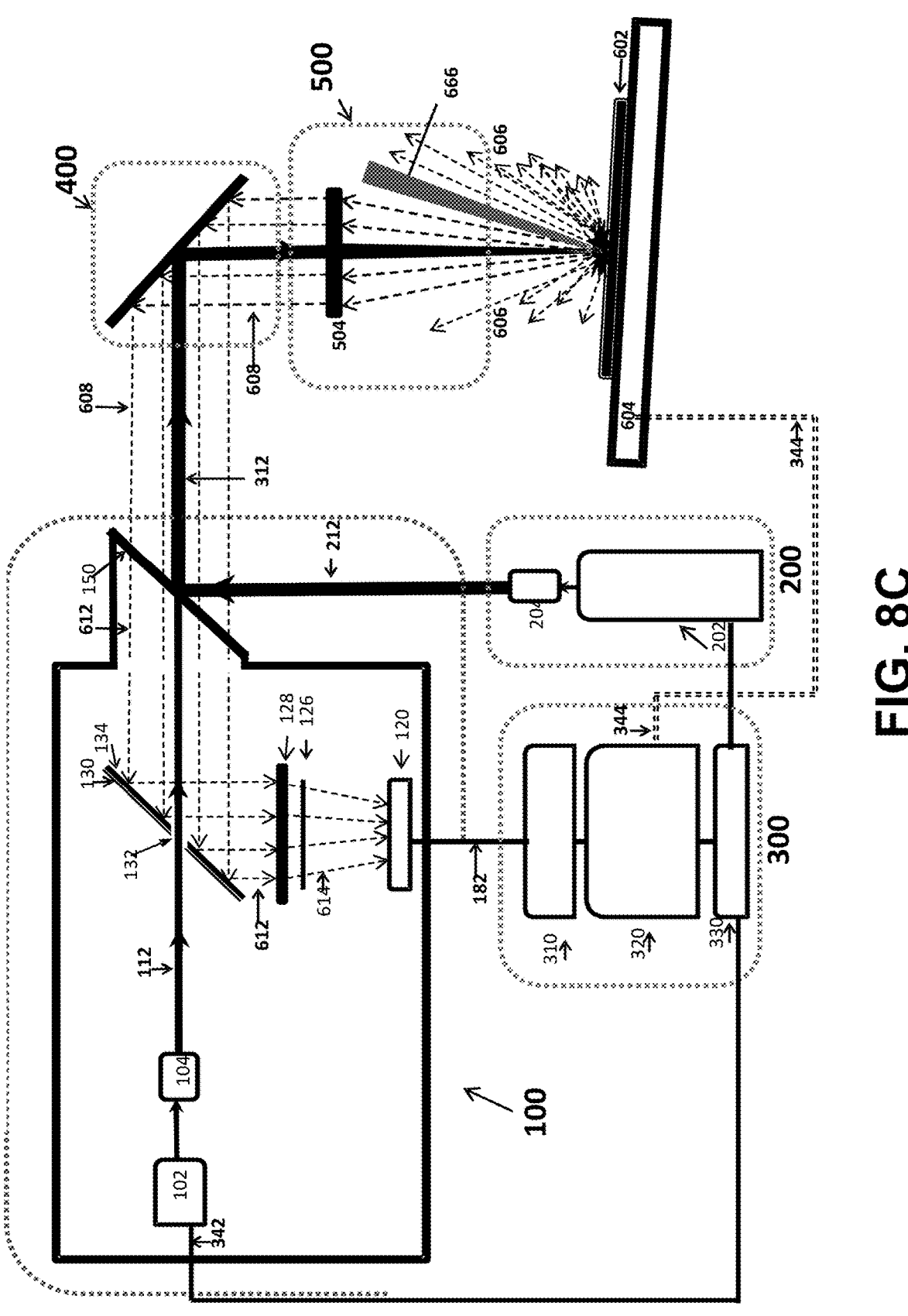
FIG. 8C shows for illustrative purposes only an example of the COA and target surface of one embodiment.

FIG. 8C shows for illustrative purposes only an example of the COA and target surface of one embodiment. FIG. 8C shows the COA and a target surface, wherein the target surface is tilted concerning the COA (or lens) exit surface plane. Alternatively, both the target surface and the COA can be appropriately tilted concerning each other to prevent the potentially harmful influence of the specularly-reflected beam 666 reflected off of the target surface of one embodiment.

Figure 9:
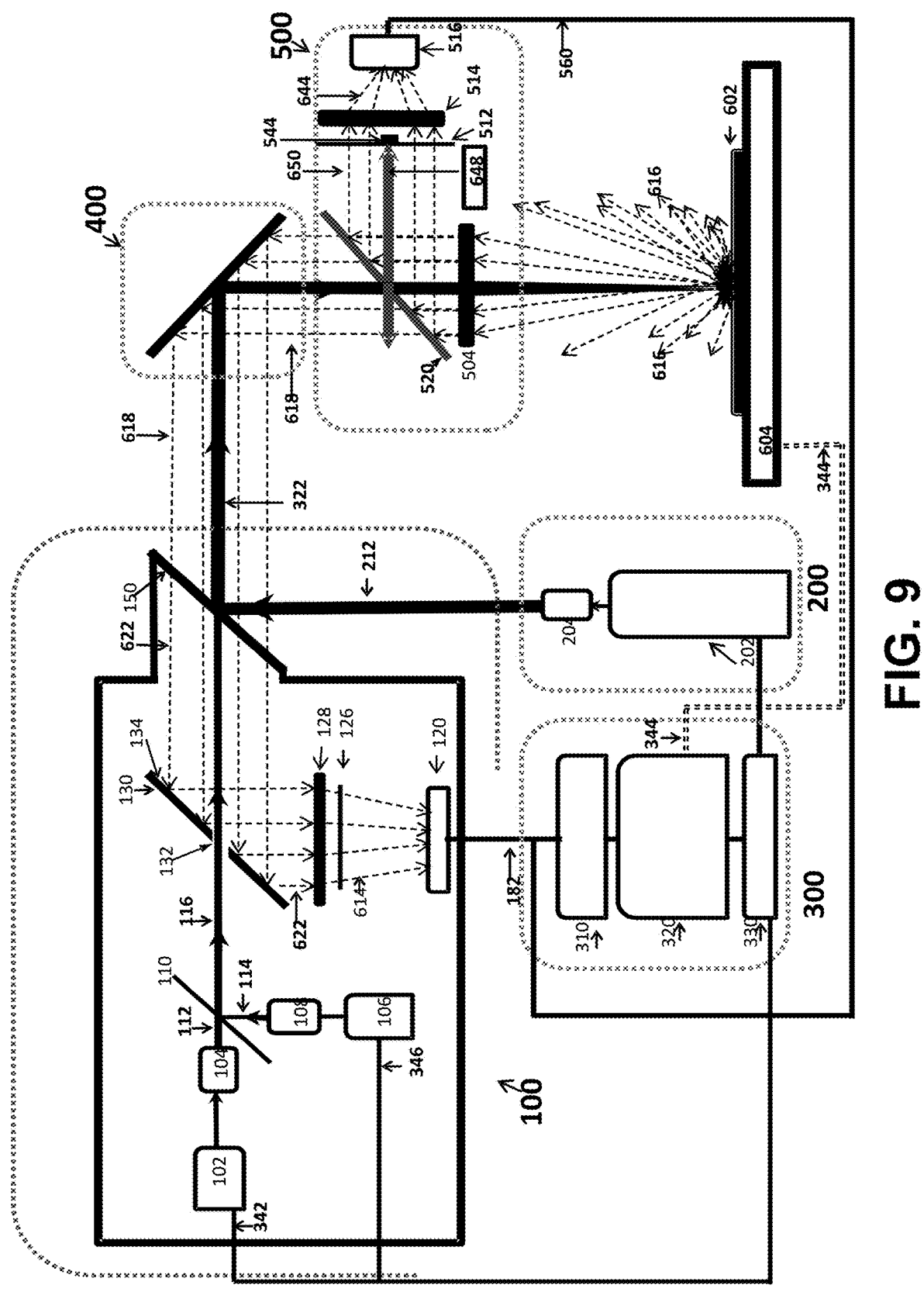
FIG. 9 shows for illustrative purposes only an example of the COA dichroic mirror of one embodiment.

FIG. 9 shows for illustrative purposes only an example of the COA dichroic mirror of one embodiment. FIG. 9 shows the COA dichroic mirror, wherein the dichroic mirror 520 transmits the process laser beam and splits probe light beam(s); (ii) Photo-detector assembly comprising optical filter 512, that transmits probe beam 644 of desired wavelength, condensing optics 514, and Photo-detector 516. The returned scattered probe light reflected off of the target surface is partially reflected 640, by the dichroic mirror and directed toward the Photo-detector assembly that comprises a light-blocking component 544, to prevent the specularly-reflected probe beam 648 from reaching the Photo-detector 516. Further, the OSI comprises another probe laser beam source 106 that emits probe light beam 114. Probe beam 114 passes through beam diameter-adjusting optics 108, and combines with probe beam 112. The combined probe beams 116 are directed toward the COA of one embodiment.

Figure 10:
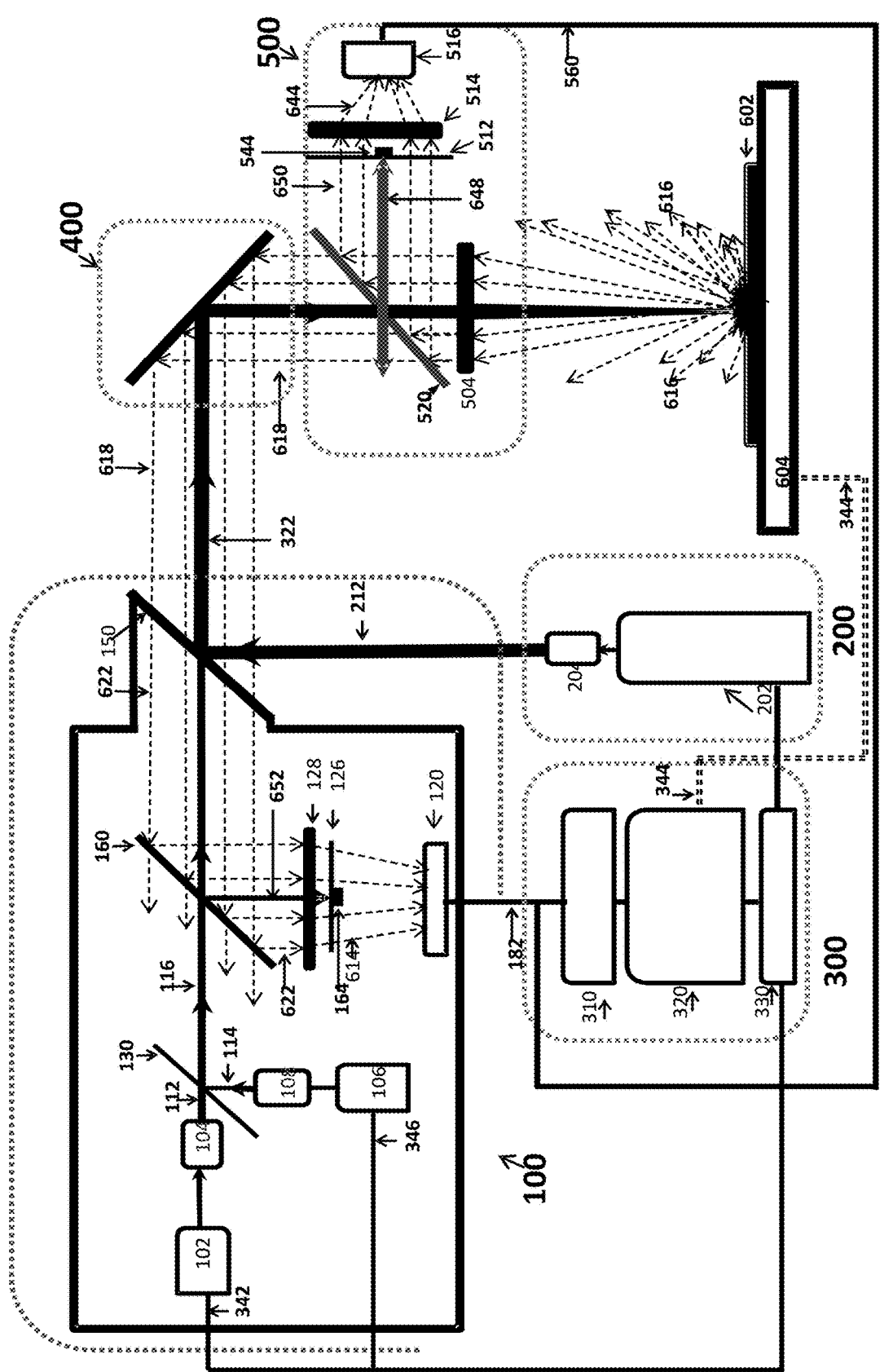
FIG. 10 shows for illustrative purposes only an example of a beam-splitting optic of one embodiment.

FIG. 10 shows for illustrative purposes only an example of a beamsplitting optic of one embodiment. FIG. 10 shows the OSI with a beam-splitting optic 160, in place of the Optical Reflector Component 130, wherein the beam-splitting optic 160 splits returned scattered probe light 622, reflected off of the target surface, reflects, and directs the split beam toward the Photo-detector assembly deployed in the OSI that further, wherein the Photo-detector assembly comprises a light-blocking component 164, that prevents the specularly-reflected probe beams 652 from reaching the Photo-detector 120 of one embodiment.

Figure 11A:
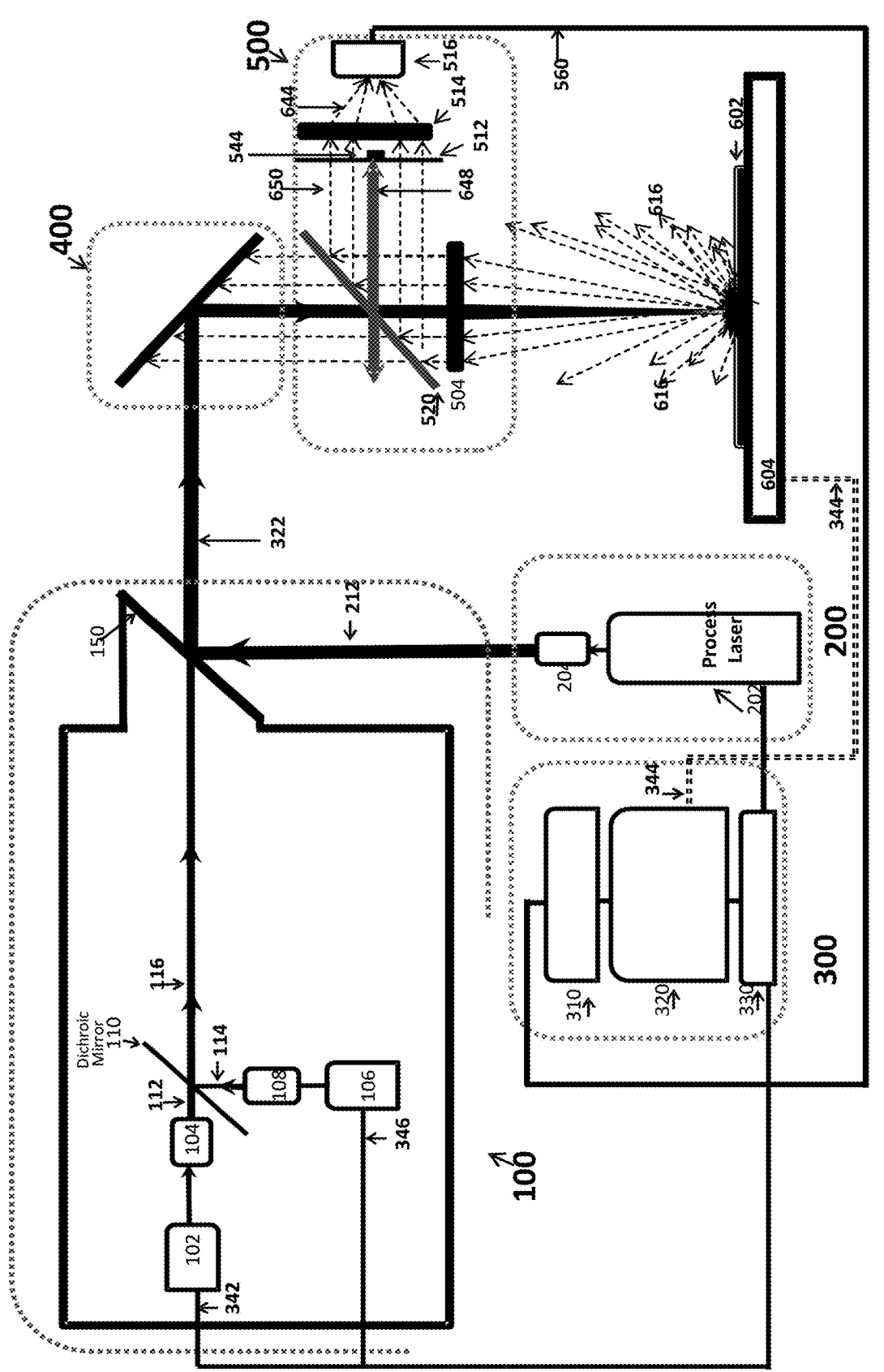
FIG. 11A shows for illustrative purposes only an example of the OSI without the Photo-detector and the Optical Reflector Component of one embodiment.

FIG. 11A shows for illustrative purposes only an example of the OSI without the Photo-detector and the Optical Reflector Component of one embodiment. FIG. 11A shows the OSI without the Photo-detector and the Optical Reflector Component 130 of FIG. 5 with a pass-thru hole. The COA dichroic mirror 520 is shown, wherein the dichroic mirror 520 transmits the process laser beam and splits probe light beam(s). The Photo-detector 516 and a light-blocking component 544 prevent the secularly-reflected probe beam 648 from reaching the Photo-detector 516 of one embodiment.

Figure 11B:
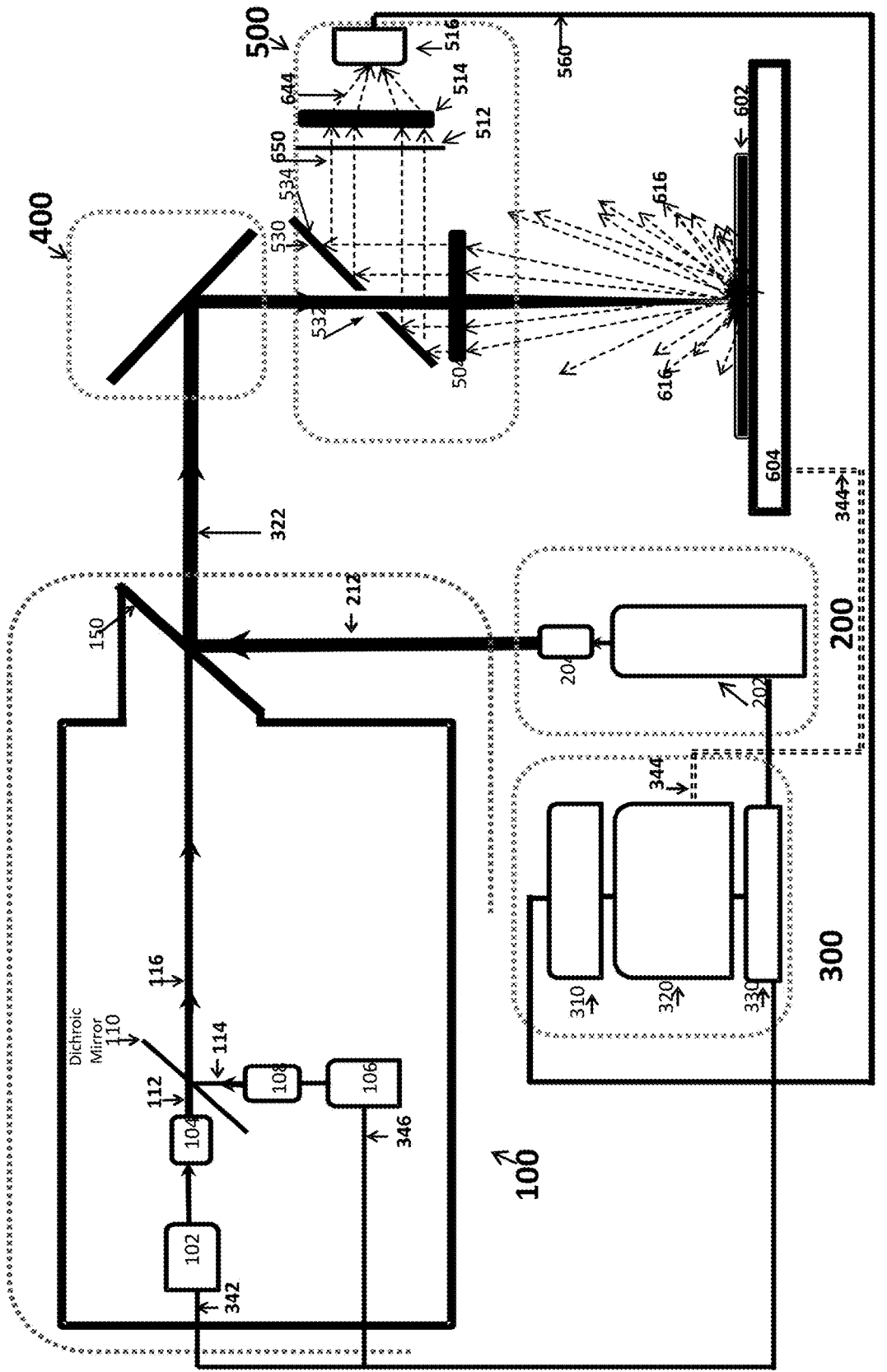
FIG. 11B shows for illustrative purposes only an example of a COA mirror with a pass-thru hole of one embodiment.

FIG. 11B shows for illustrative purposes only an example of a COA mirror with a pass-thru hole of one embodiment. FIG. 11B shows the COA with a mirror 530 with a pass-thru hole, instead of dichroic mirror 520, placed in the path of the probe beams inside COA, wherein the mirror 530 comprising a surface of high-reflectivity 534, and pass-thru opening 532, to permit the combined outgoing process and probe beams 322 to pass through the opening. The returned scattered probe light 616 reflected off of the target surface is partially reflected 650 by mirror 530 and directed toward the Photo-detector assembly and impinges Photo-detector 516 of one embodiment.

Figure 12:
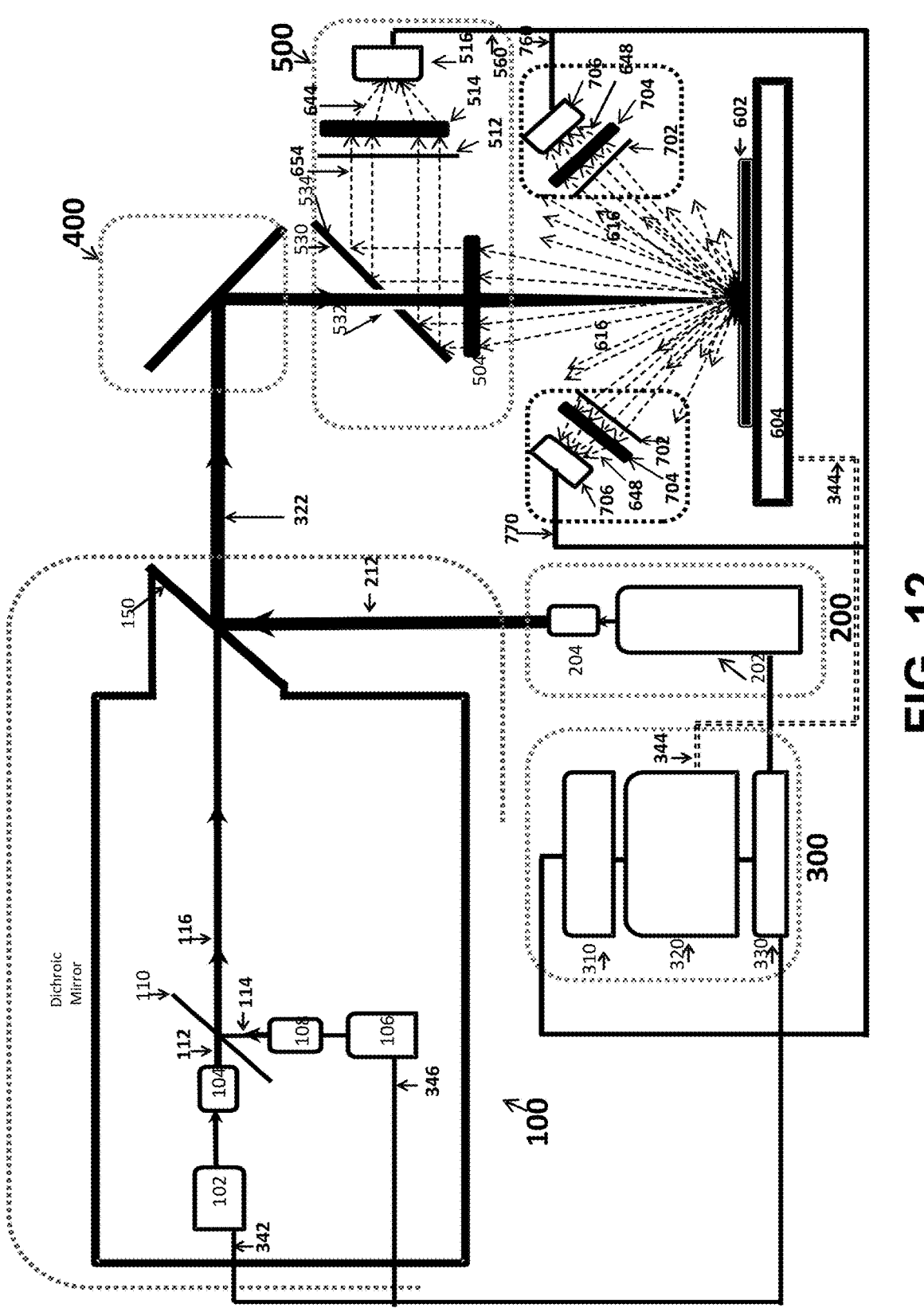
FIG. 12 shows for illustrative purposes only an example of auxiliary Photo-detectors of one embodiment.

FIG. 12 shows for illustrative purposes only an example of auxiliary Photo-detectors of one embodiment. FIG. 12 shows auxiliary Photo-detectors 706 is coupled to the COA and appropriately positioned between the COA and target surface to directly pick up some of the scattered light off of the target surface, not collected by the COA focusing lens of one embodiment.

Figure 13:
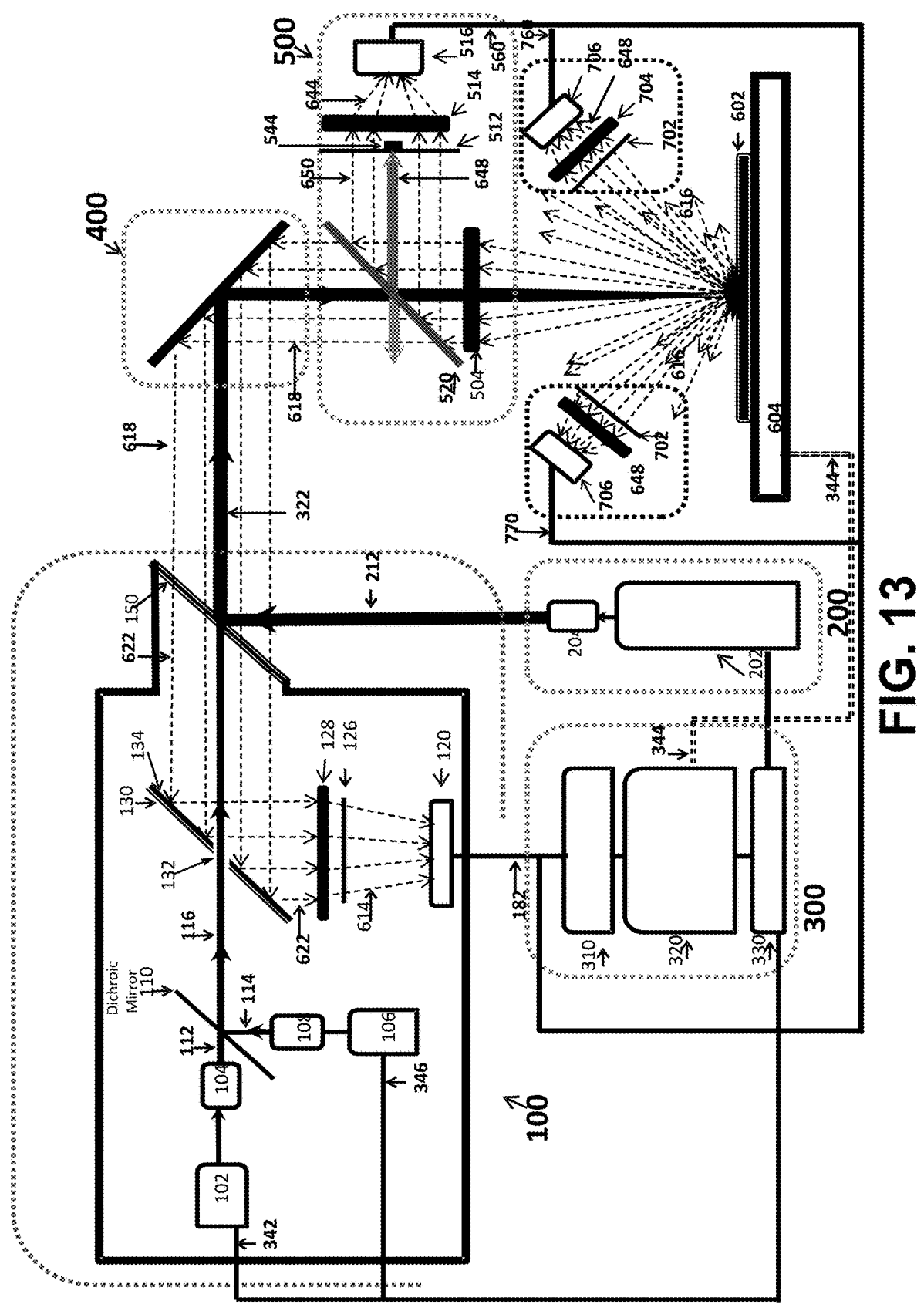
FIG. 13 shows for illustrative purposes only an example of auxiliary Photo-detectors coupled to the COA of one embodiment.

FIG. 13 shows for illustrative purposes only an example of auxiliary Photo-detectors coupled to the COA of one embodiment. FIG. 13 shows auxiliary Photo-detectors 706 coupled to the COA and appropriately positioned between the COA and target surface to directly pick up scattered light off of the target surface of one embodiment.

Figure 14:
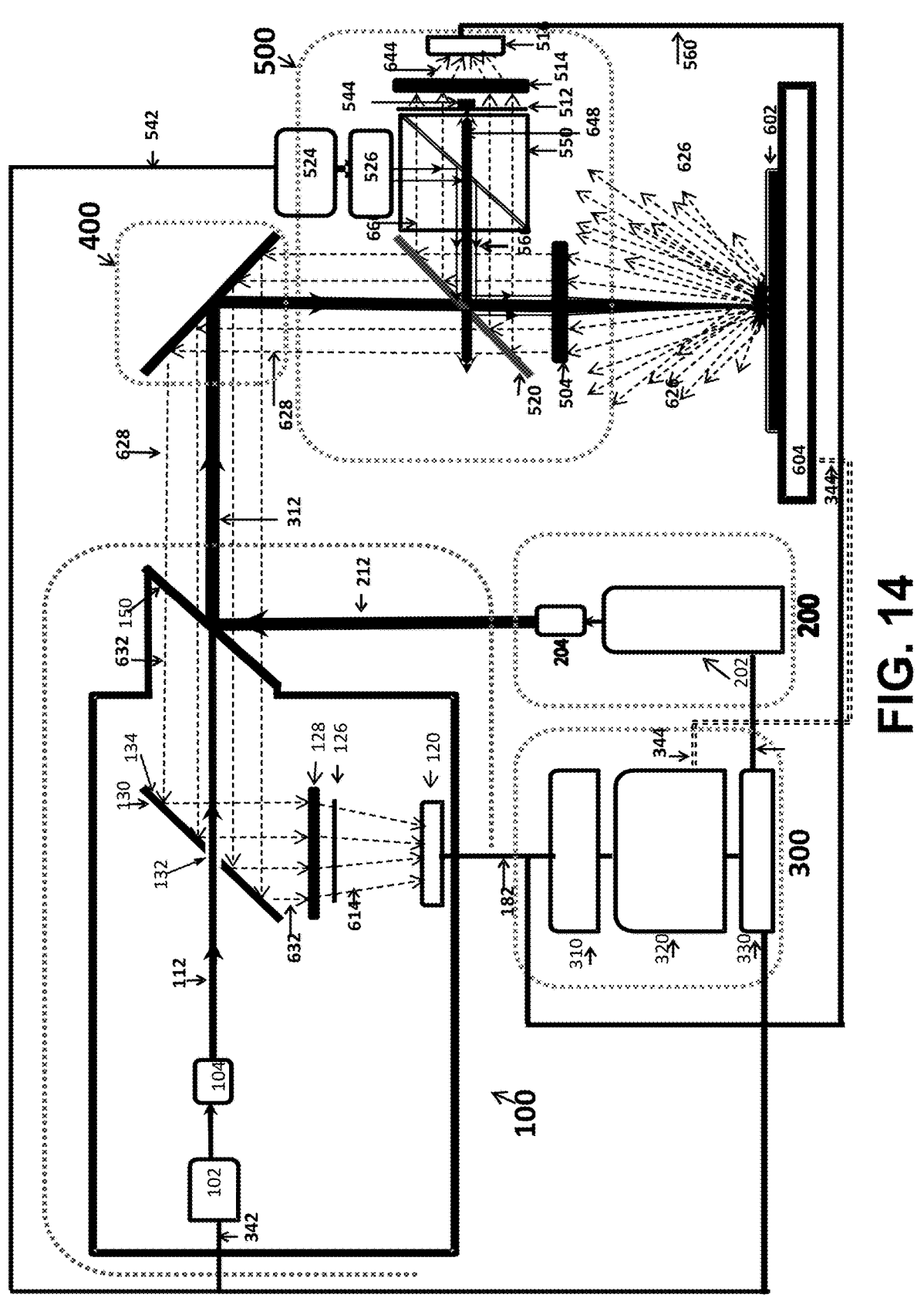
FIG. 14 shows for illustrative purposes only an example of an additional probe laser source of one embodiment.

FIG. 14 shows for illustrative purposes only an example of an additional probe laser source of one embodiment. FIG. 14 shows coupled to the COA an additional probe laser source 524 of desired wavelength □3, laser beam adjusting optics 526, and beam splitter 550, to allow partial reflection/transmission of the probe light 566 (emitted by laser 524). Further, the OSI comprises one probe laser source 102 of one embodiment.

Figure 15A:
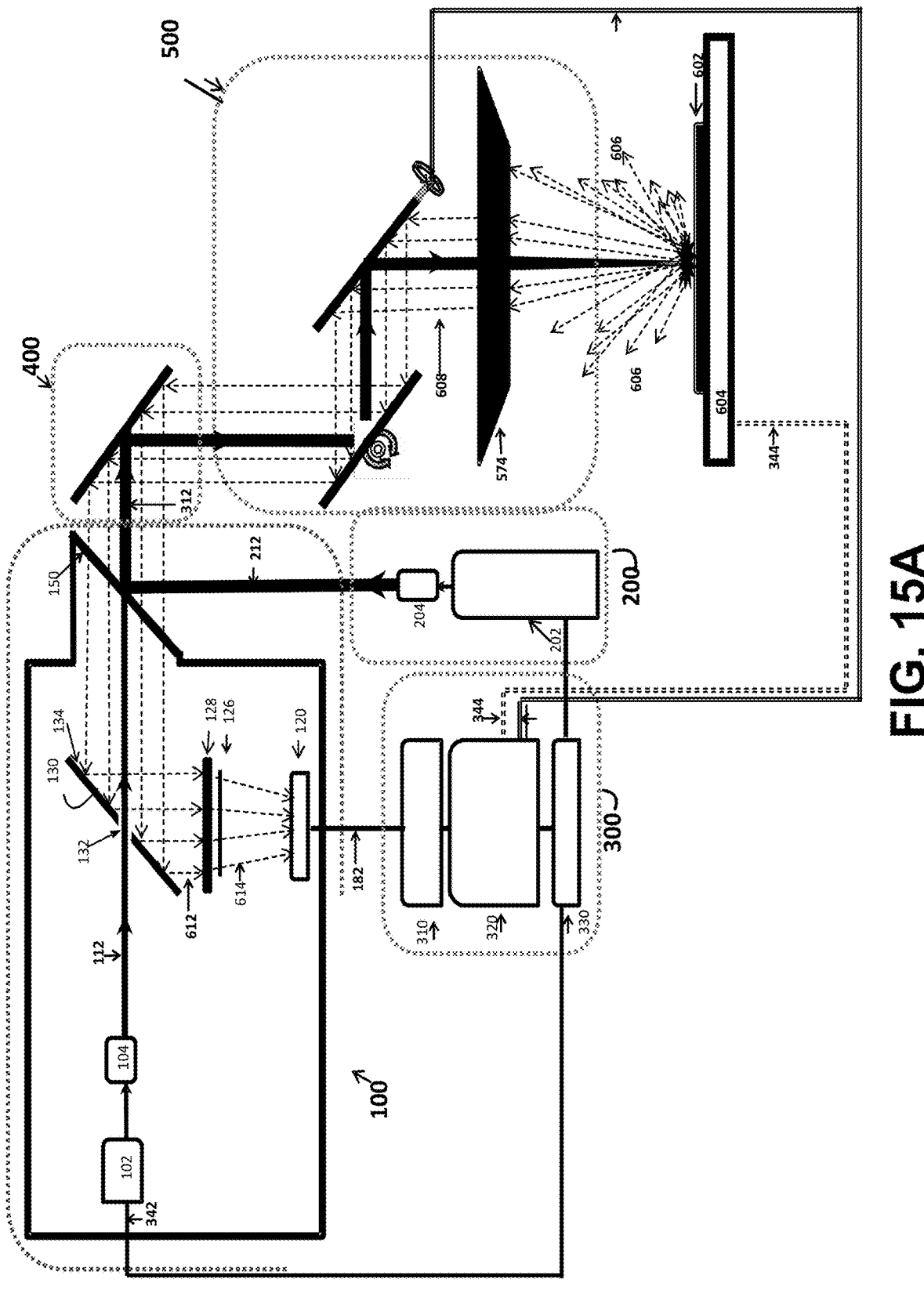
FIG. 15A shows for illustrative purposes only an example of a beam scanning mechanism of one embodiment.

FIG. 15A shows for illustrative purposes only an example of a beam scanning mechanism of one embodiment. FIG. 15A shows coupled to the COA a beam scanning mechanism. The beam scanning mechanism is controlled and monitored by the system Control Logic to position the process and probe laser beams on the target surface, and appropriate focusing lens, e.g., Telecentric or F-Theta lens 574 of one embodiment.

Figure 15B:
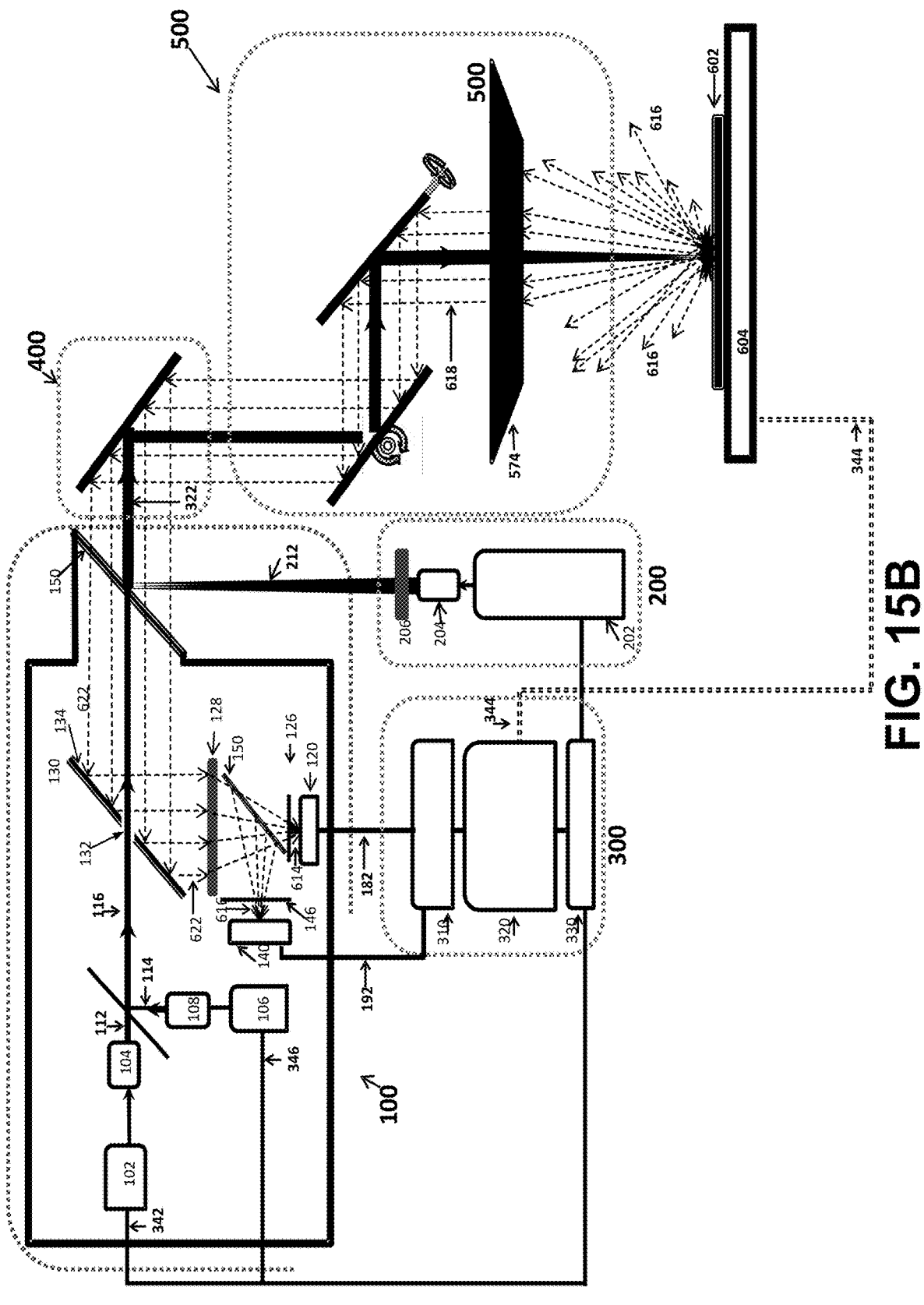
FIG. 15B shows for illustrative purposes only an example of a beam scanning mechanism of one embodiment.

FIG. 15B shows for illustrative purposes only an example of a beam scanning mechanism of one embodiment. FIG. 15B shows the COA coupled beam scanning mechanism, which is controlled and monitored by the system Control Logic to position the process and probe laser beams on the target surface, and appropriate focusing lens, e.g., Telecentric or F-Theta lens 574. In this instance, the beam passes through the additional Photo-detector 140 of one embodiment.

Figure 16:
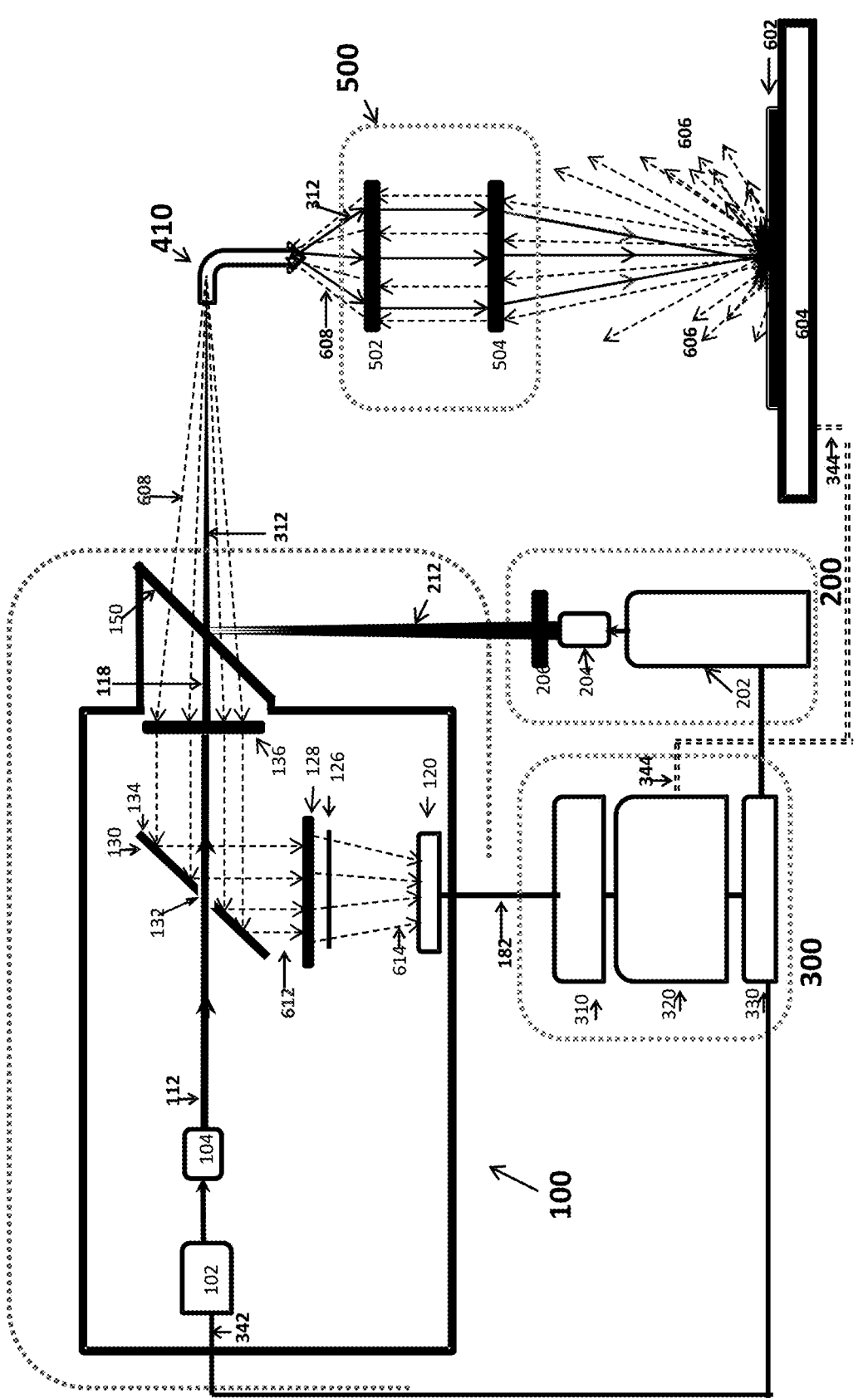
FIG. 16 shows for illustrative purposes only an example of an optics path of one embodiment.

FIG. 16 shows for illustrative purposes only an example of an optics path of one embodiment. FIG. 16 shows an optics path comprised of a fiber-optic medium 410, and, wherein process beam and probe laser beams are focused by focusing lenses 206 and 136, respectively, and coupled into the fiber-optic medium 410 which transports the beams to the COA 500, wherein the COA comprises a collimating lens 502 and focusing lens 504 of one embodiment.

Figure 17:
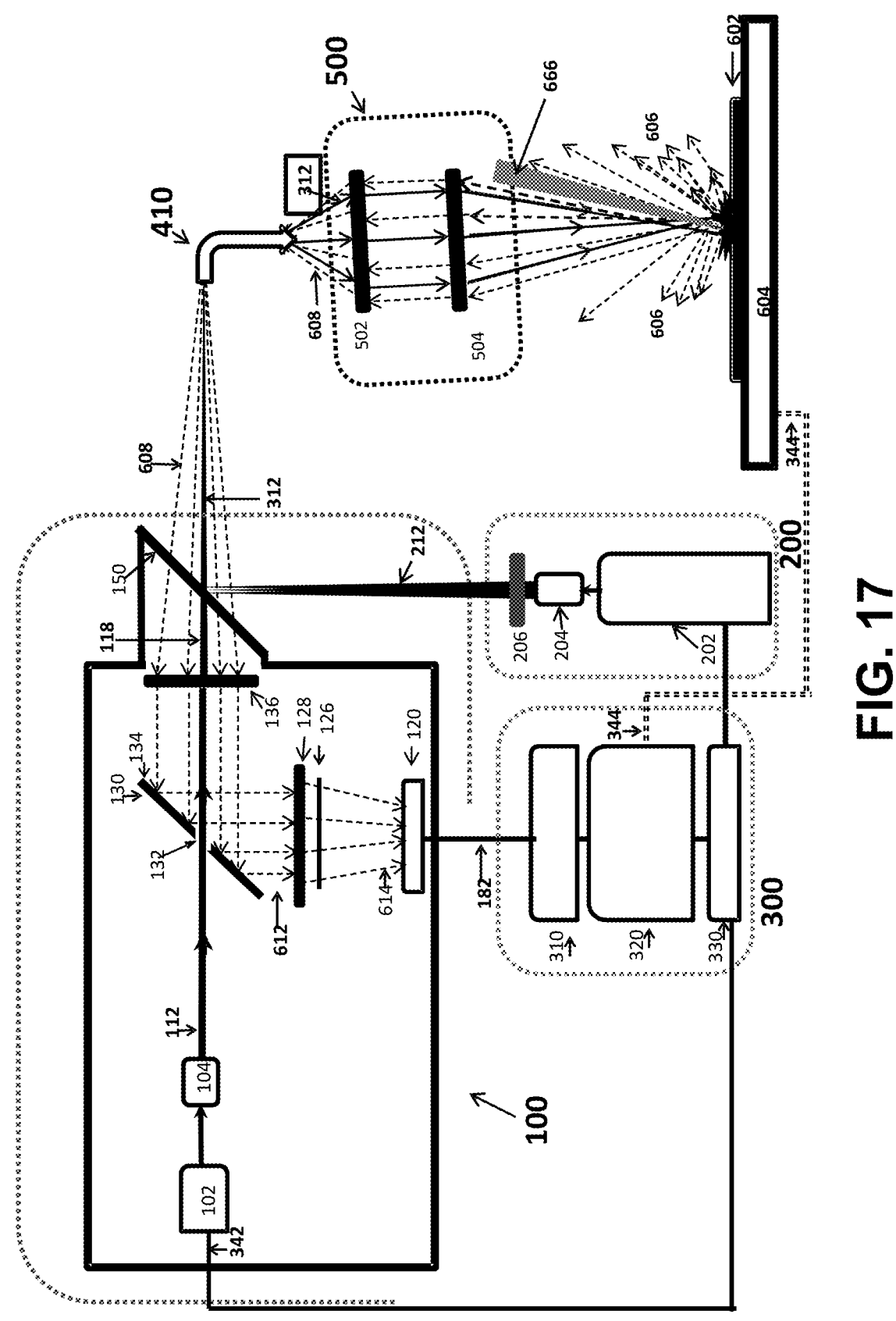
FIG. 17 shows for illustrative purposes only an example of a process and probe laser beams coupled into a fiber-optic medium of one embodiment.

FIG. 17 shows for illustrative purposes only an example of a process and probe laser beams coupled into a fiber-optic medium of one embodiment. FIG. 17 shows a process and probe laser beams are coupled into a fiber-optic medium 410 of one embodiment.

Figure 18:
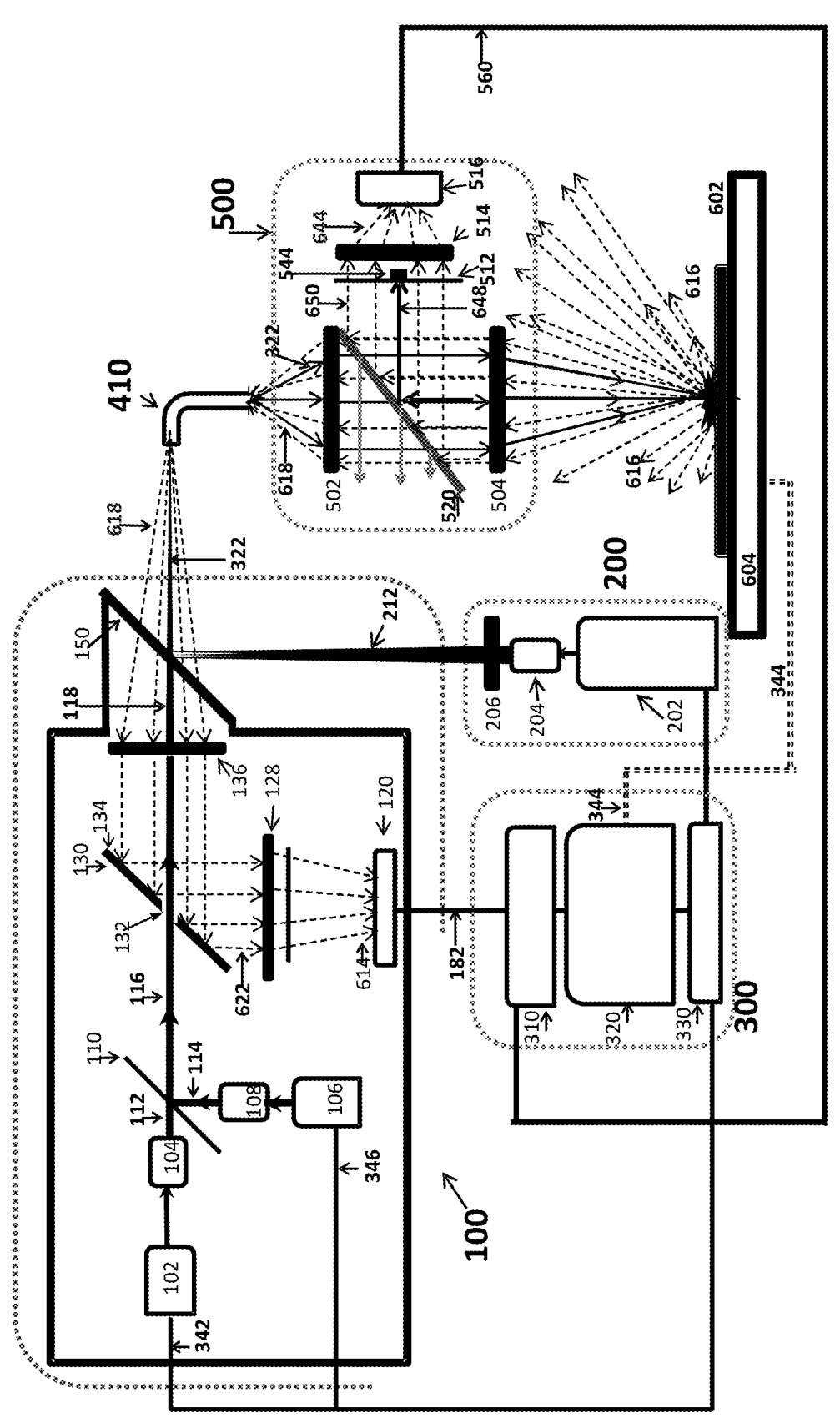
FIG. 18 shows for illustrative purposes only an example of a process and probe laser beams coupled into a fiber-optic medium of one embodiment.

FIG. 18 shows for illustrative purposes only an example of a process and probe laser beams coupled into a fiber-optic medium of one embodiment. FIG. 18 shows the process and probe laser beams coupled into the fiber-optic medium 410, as described in FIG. 16 of one embodiment.

Figure 19:
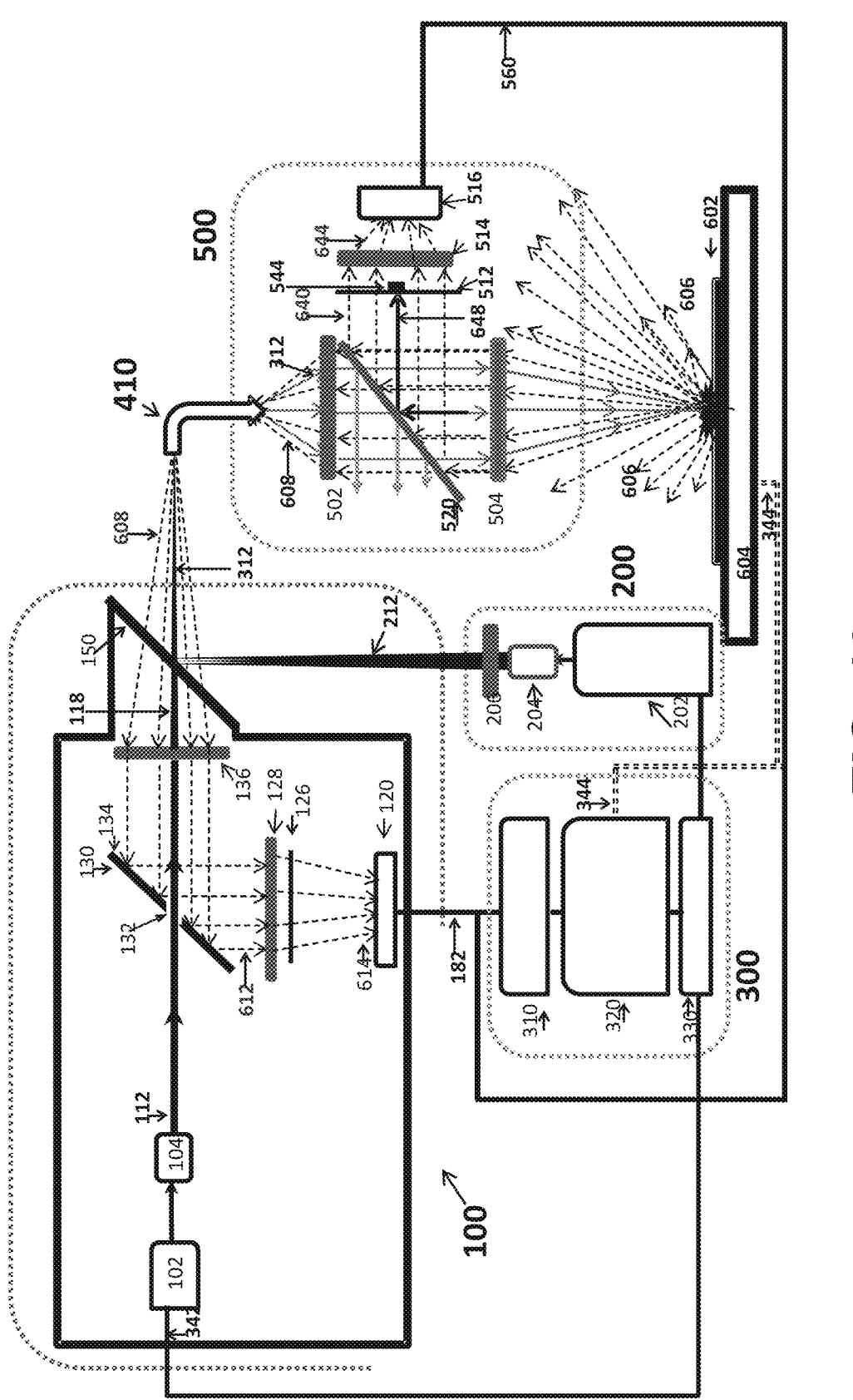
FIG. 19 shows for illustrative purposes only an example of a probe laser beams coupled into a fiber-optic medium of one embodiment.

FIG. 19 shows for illustrative purposes only an example of a probe laser beams coupled into a fiber-optic medium of one embodiment. FIG. 19 shows the OSI comprising one probe laser beam 112 coupled into the fiber-optic medium 410 of one embodiment.

Figure 20:
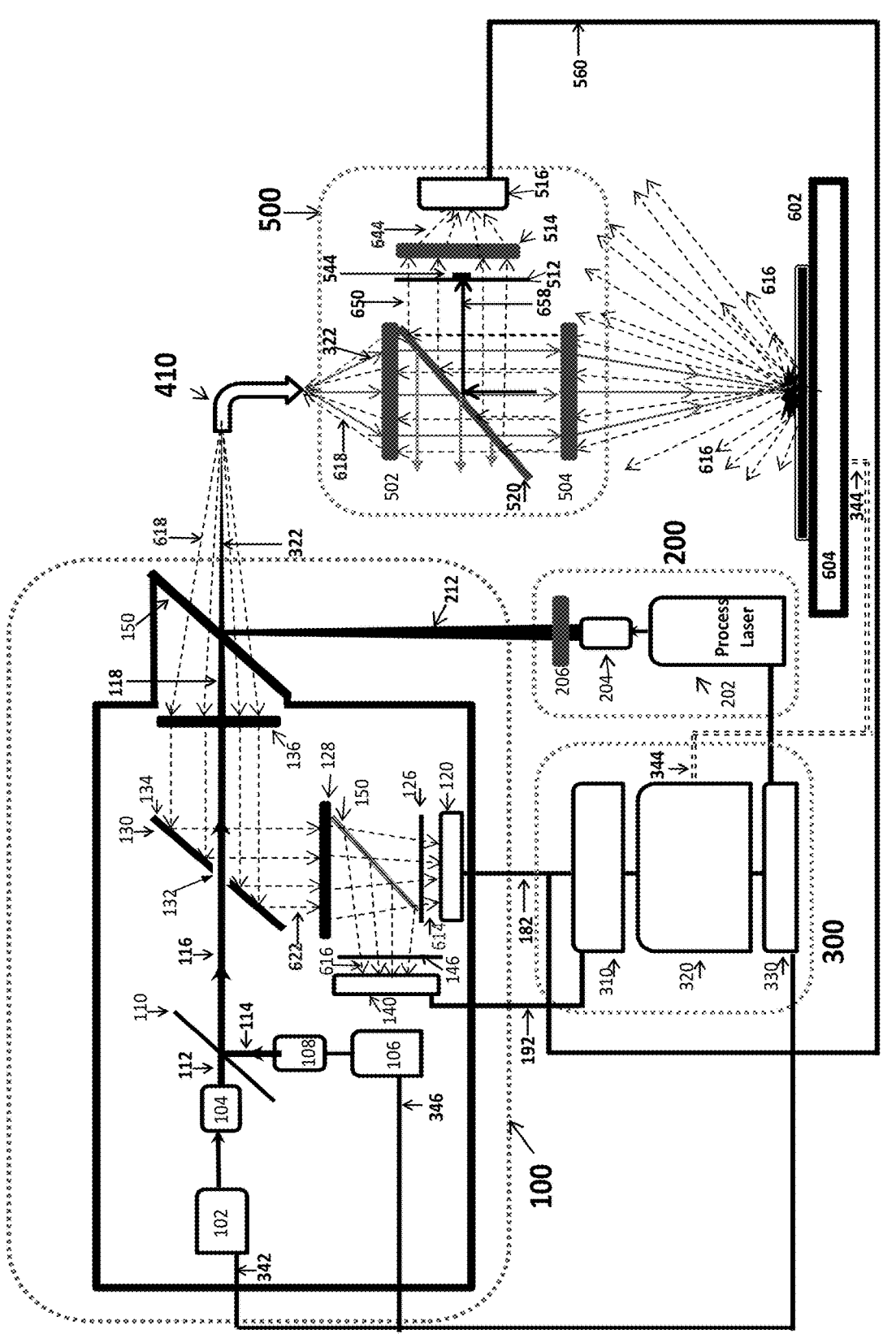
FIG. 20 shows for illustrative purposes only an example of an OSI additional Photo-detector of one embodiment.

FIG. 20 shows for illustrative purposes only an example of an OSI additional Photo-detector of one embodiment. FIG. 20 shows the OSI comprises an additional Photo-detector 140 of one embodiment.

Figure 21A:
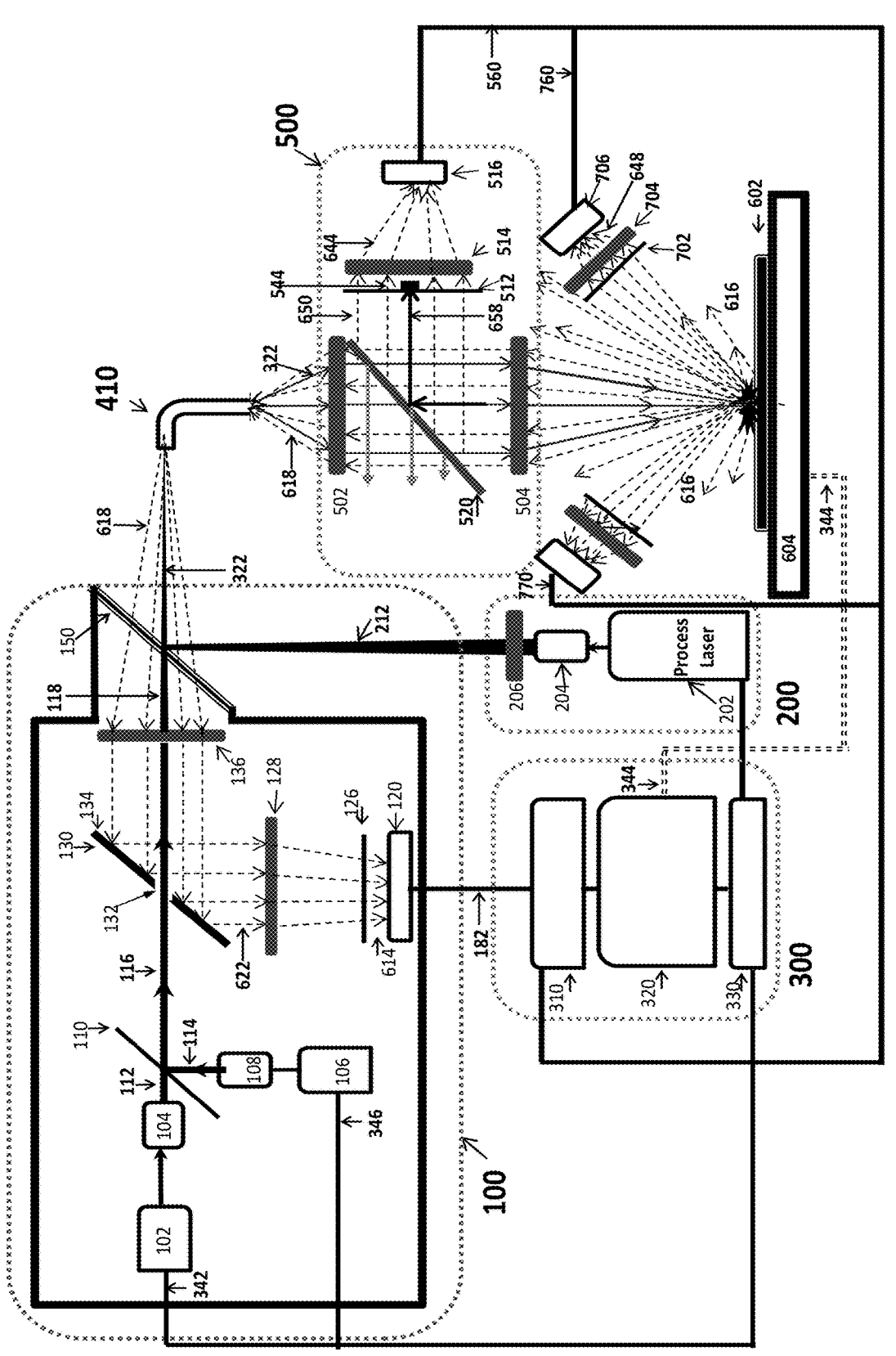
FIG. 21A shows for illustrative purposes only an example of a fiber-optic medium of one embodiment.

FIG. 21A shows for illustrative purposes only an example of a fiber-optic medium of one embodiment. FIG. 21A shows the optics path comprises a fiber-optic medium 410, and process and probe laser beams coupled into the fiber-optic medium 410, as described in FIG. 20.

Figure 21B:
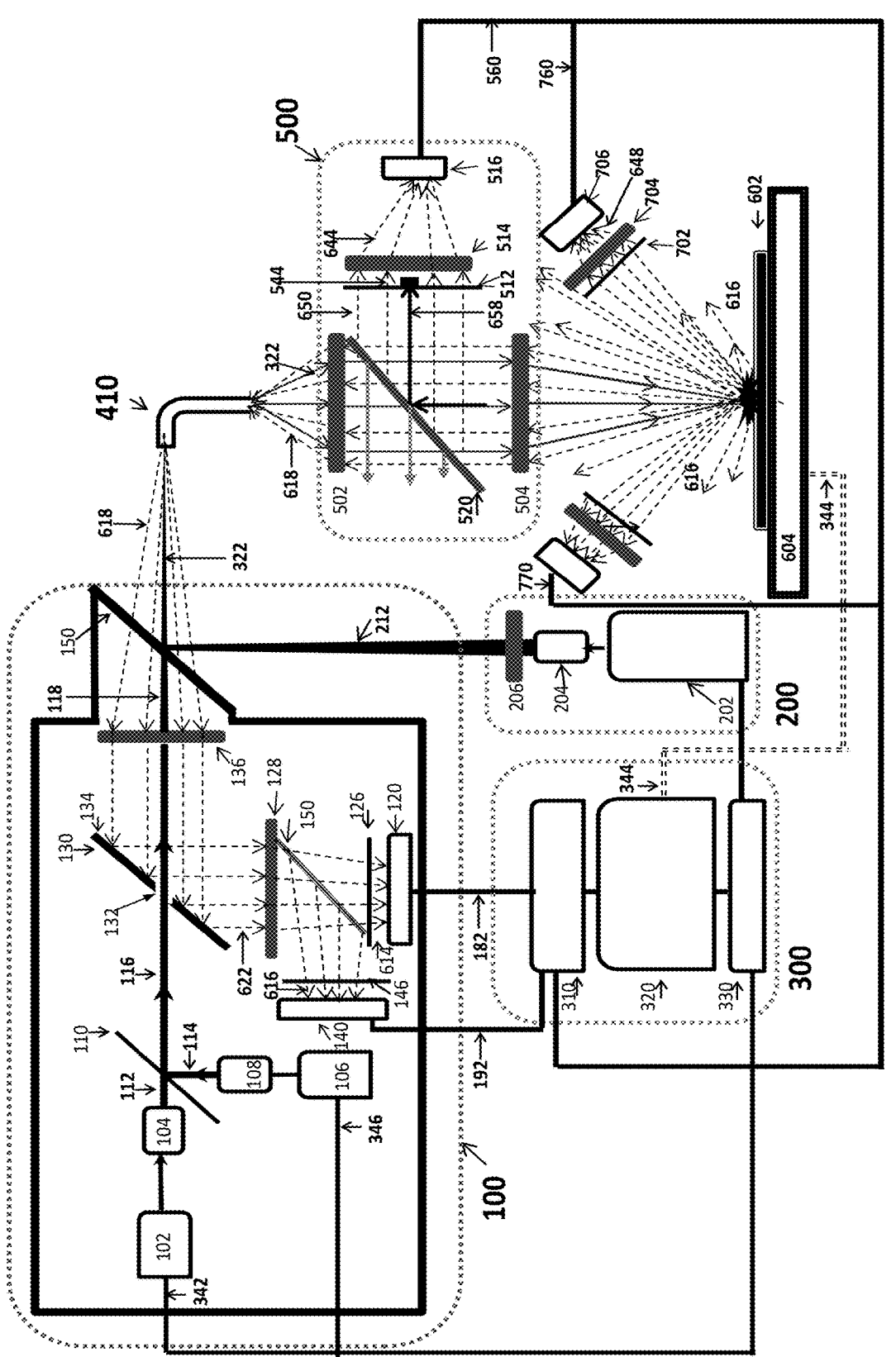
FIG. 21B shows for illustrative purposes only an example of an additional Photo-detector CSI interaction with the fiber-optic medium of one embodiment.

FIG. 21B shows for illustrative purposes only an example of an additional Photo-detector CSI interaction with the fiber-optic medium of one embodiment. FIG. 21B shows an additional Photo-detector 140 CSI interaction with the fiber-optic medium 410 of one embodiment.

Figure 22:
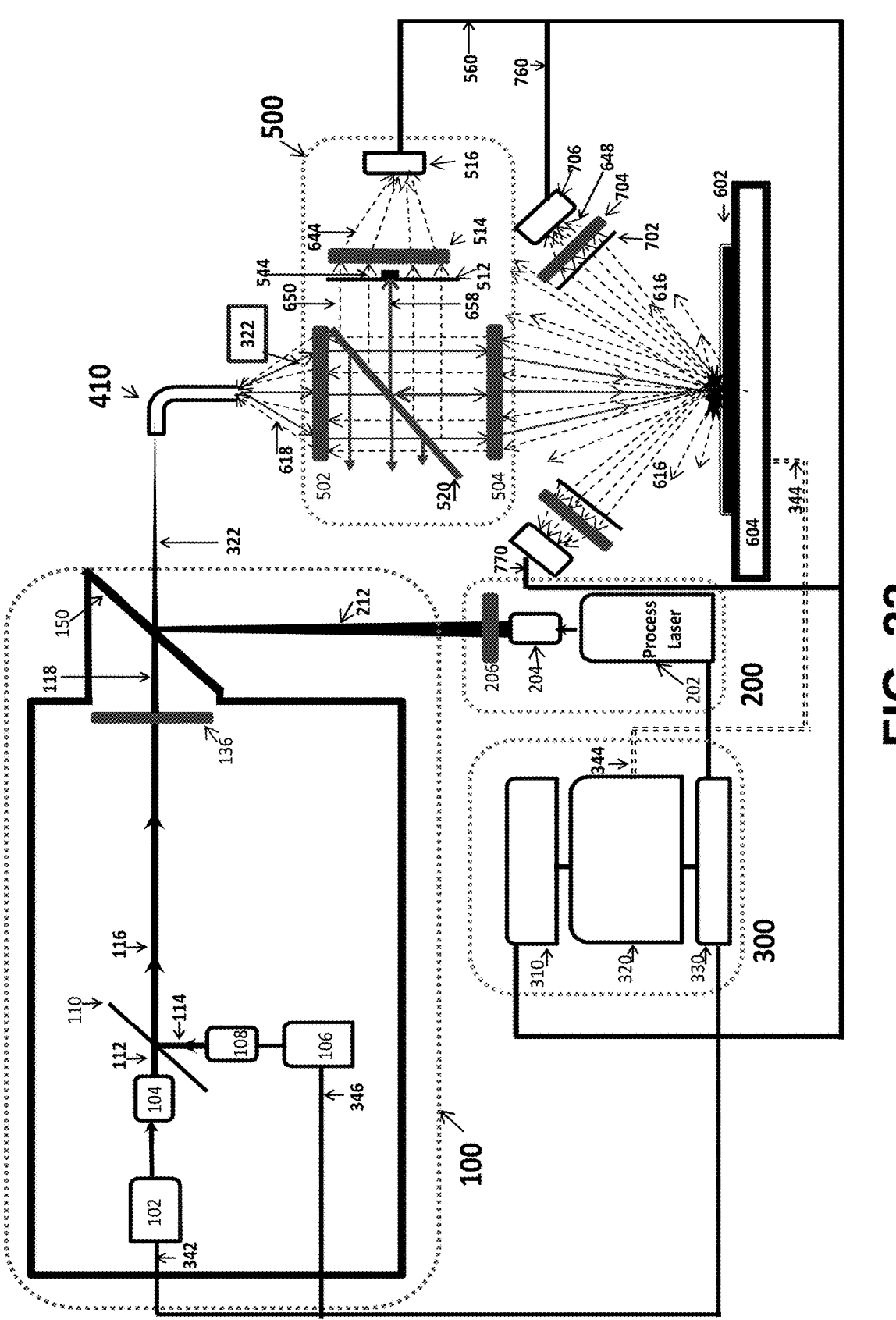
FIG. 22 shows for illustrative purposes only an example of process and probe laser beams coupled into the fiber-optic medium of one embodiment.

FIG. 22 shows for illustrative purposes only an example of process and probe laser beams coupled into the fiber-optic medium of one embodiment. FIG. 22 shows the optics path comprising a fiber-optic medium 410, and process and probe laser beams coupled into the fiber-optic medium 410, as described in FIG. 16. Further, the COA comprises the beam splitter 520 to direct part of the probe light beam reflected off of the target surface toward the Photo-detector 516 of one embodiment.

Figure 23:
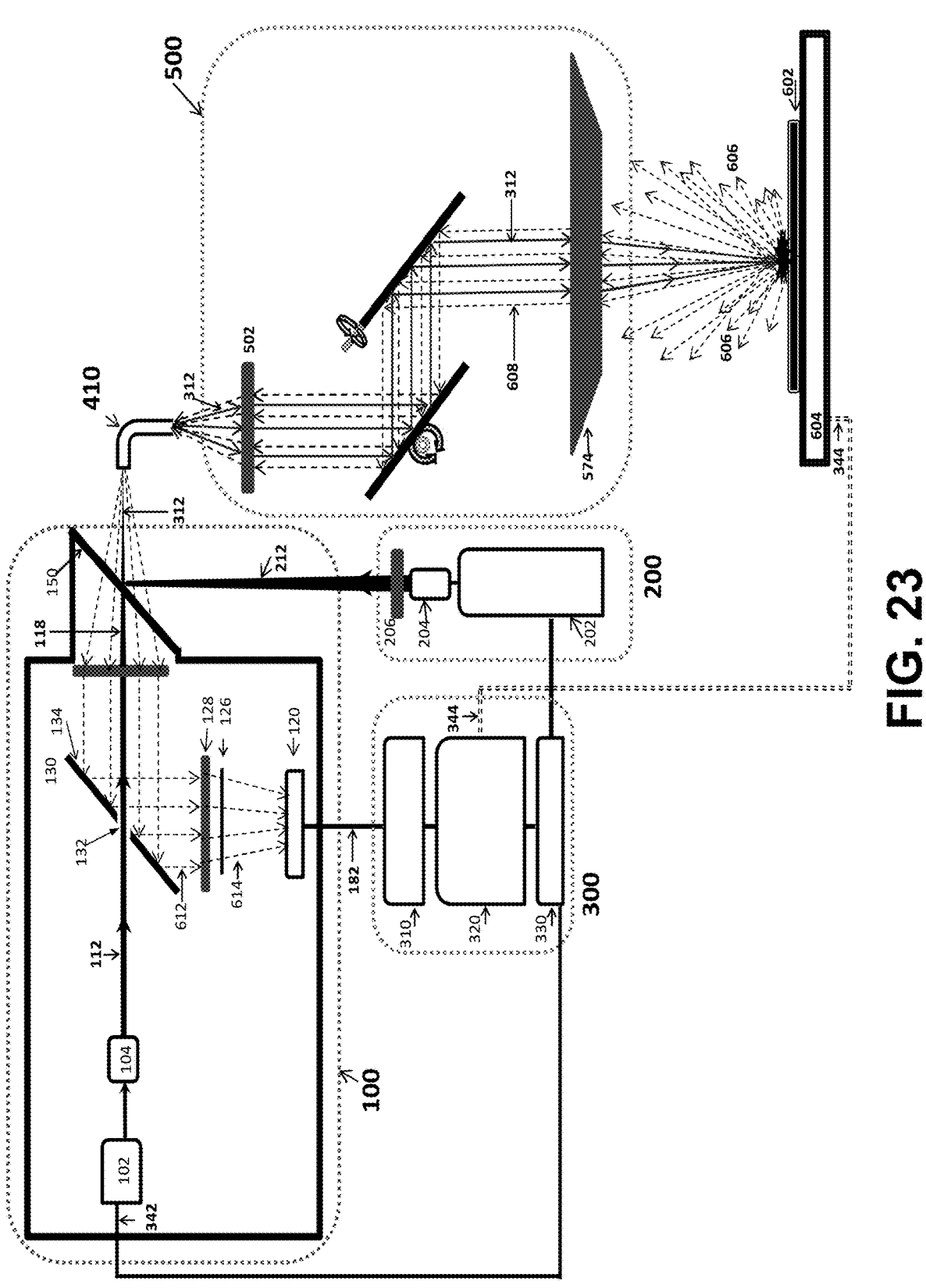
FIG. 23 shows for illustrative purposes only an example of an optics path comprising a fiber-optic medium of one embodiment.

FIG. 23 shows for illustrative purposes only an example of an optics path comprising a fiber-optic medium of one embodiment. FIG. 23 shows the optics path comprises a fiber-optic medium 410, and process and probe laser beams are coupled into the fiber-optic medium 410, as described in FIG. 16 of one embodiment.

Figure 24A:
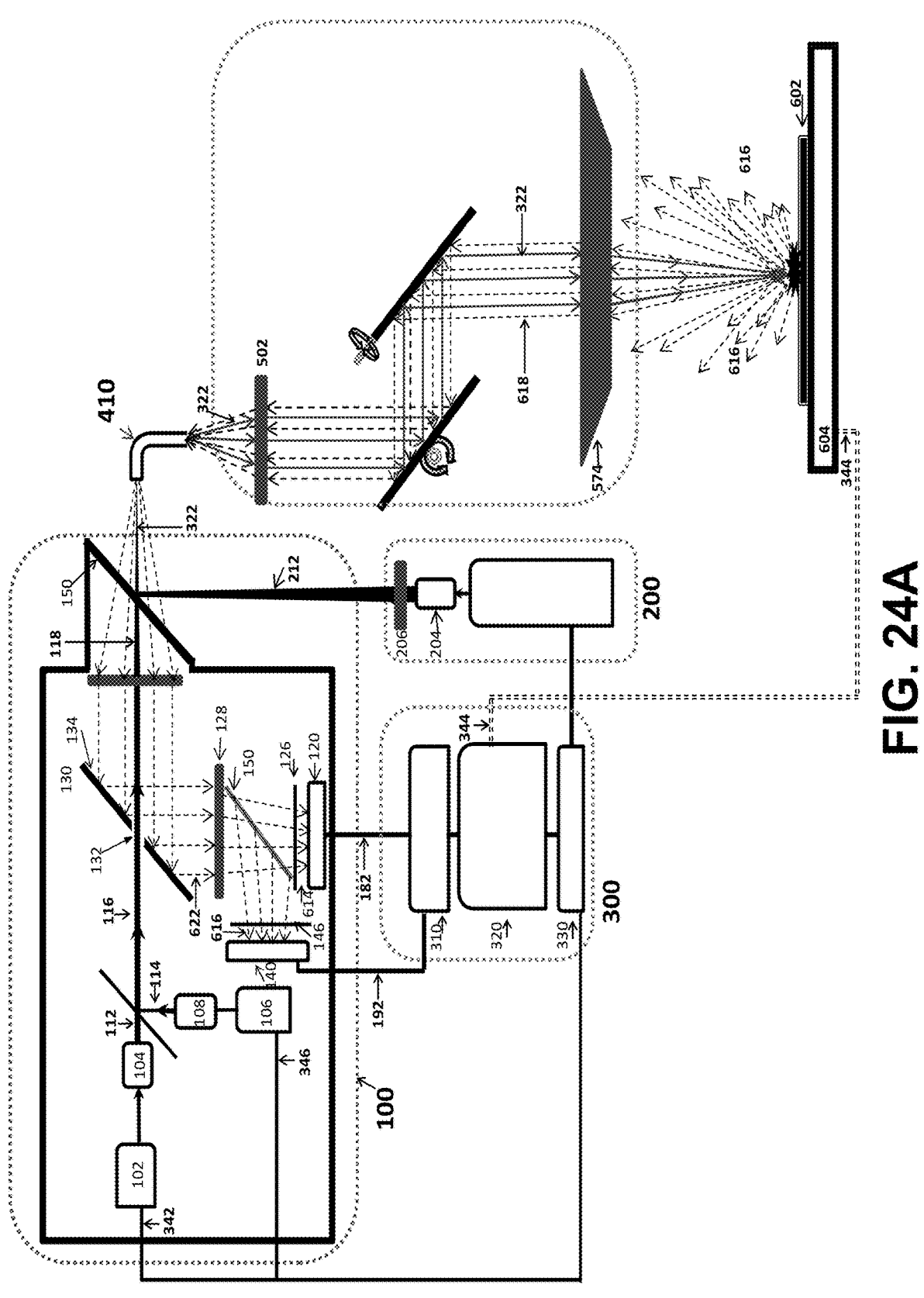
FIG. 24A shows for illustrative purposes only an example of an optics path comprising a fiber-optic medium of one embodiment.

FIG. 24A shows for illustrative purposes only an example of an optics path comprising a fiber-optic medium of one embodiment. FIG. 24A shows the optics path comprises a fiber-optic medium 410, and process and probe laser beams coupled into the fiber-optic medium 410, as described in FIG. 16 of one embodiment.

Figure 24B:
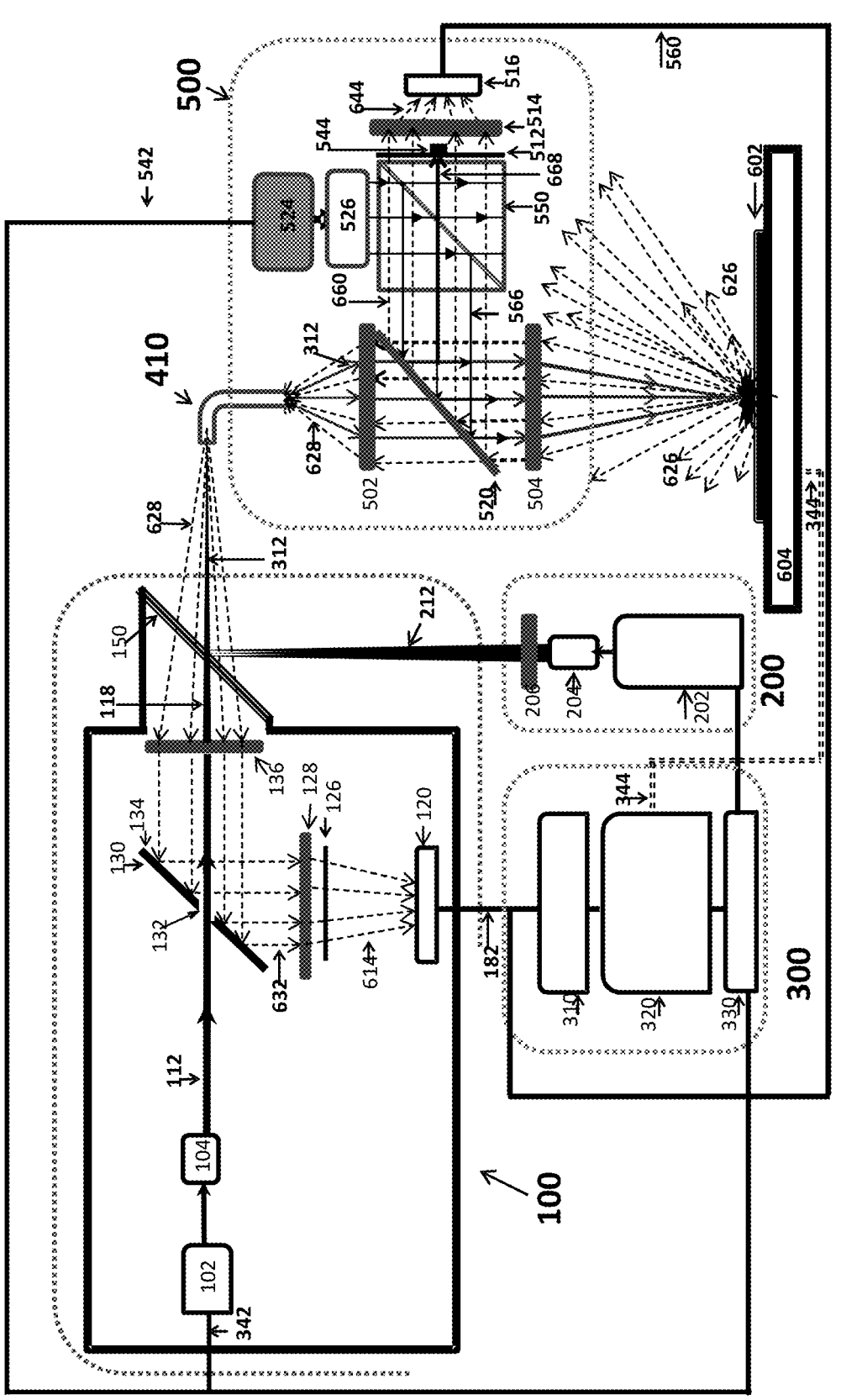
FIG. 24B shows for illustrative purposes only an example of the OSI comprising an additional probe laser-B source of one embodiment.

FIG. 24B shows for illustrative purposes only an example of the OSI comprising a probe laser 102 source of one embodiment. FIG. 24B shows wherein the COA comprises additional probe laser source 524 and Photo-detector 516, as described in FIG. 6 of one embodiment.

Figure 25:
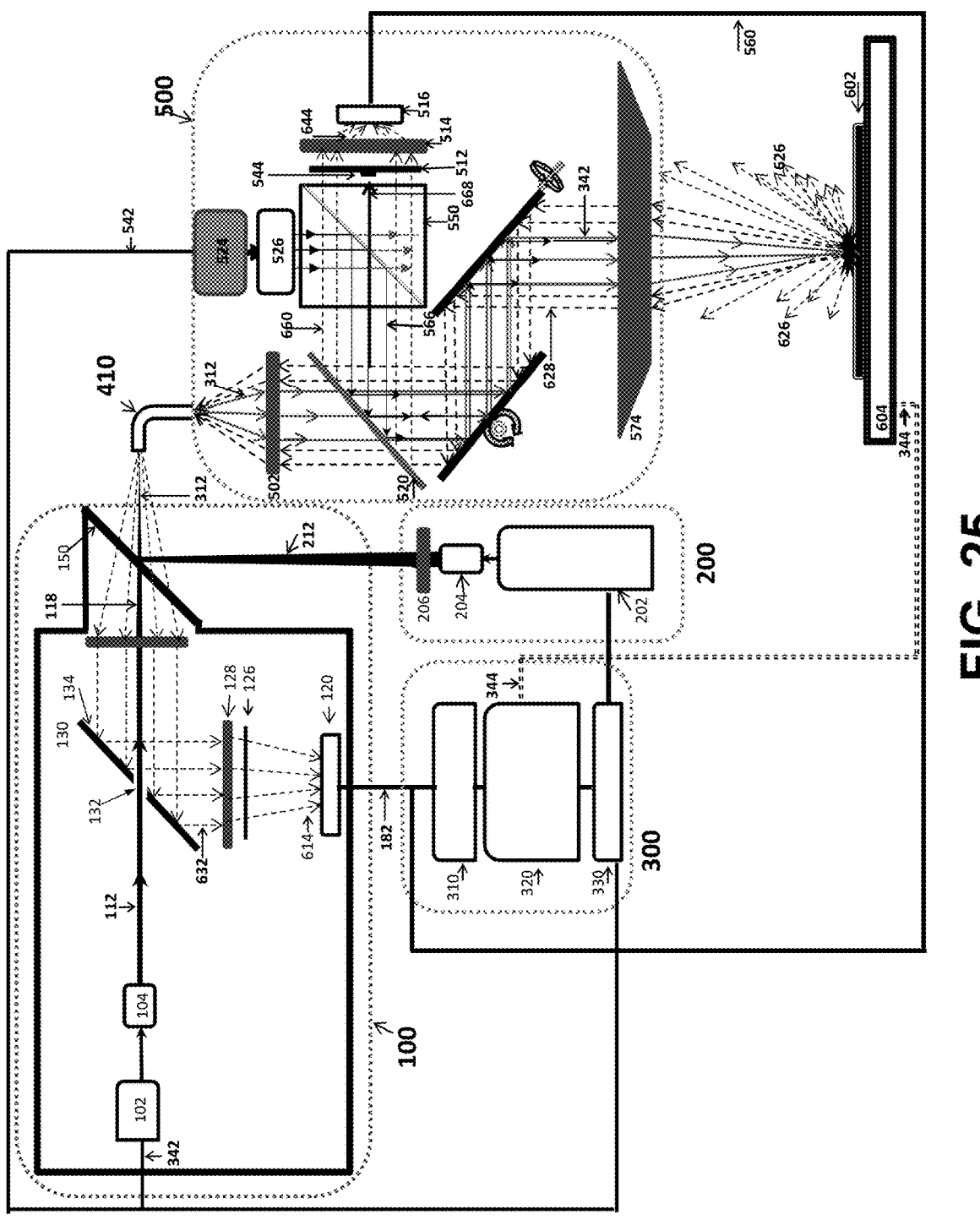
FIG. 25 shows for illustrative purposes only an example of the COA comprising the beam scanning mechanism of one embodiment.

FIG. 25 shows for illustrative purposes only an example of the COA comprising the beam scanning mechanism of one embodiment. FIG. 25 shows the COA comprising a beam scanning mechanism as described in FIG. 15A of one embodiment.

Figure 26:
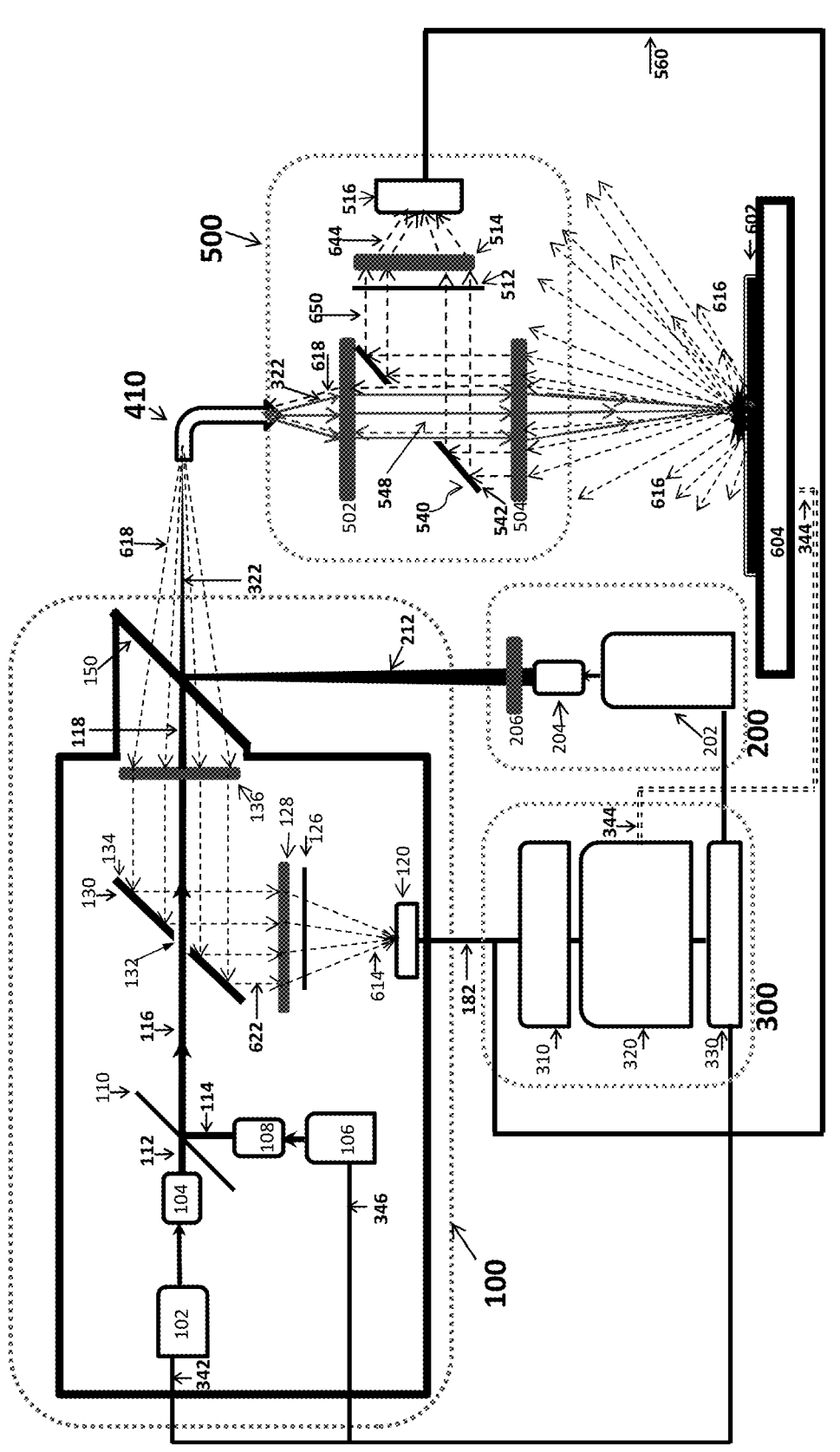
FIG. 26 shows for illustrative purposes only an example of a COA first mirror of one embodiment.

FIG. 26 shows for illustrative purposes only an example of a COA first mirror of one embodiment. FIG. 26 shows the COA comprises mirror 540, instead of the dichroic mirror 520, comprising appropriately large enough pass-thru opening to allow light beams emerging from the fiber optic to pass through the mirror and focus onto the target surface of one embodiment.

Figure 27:
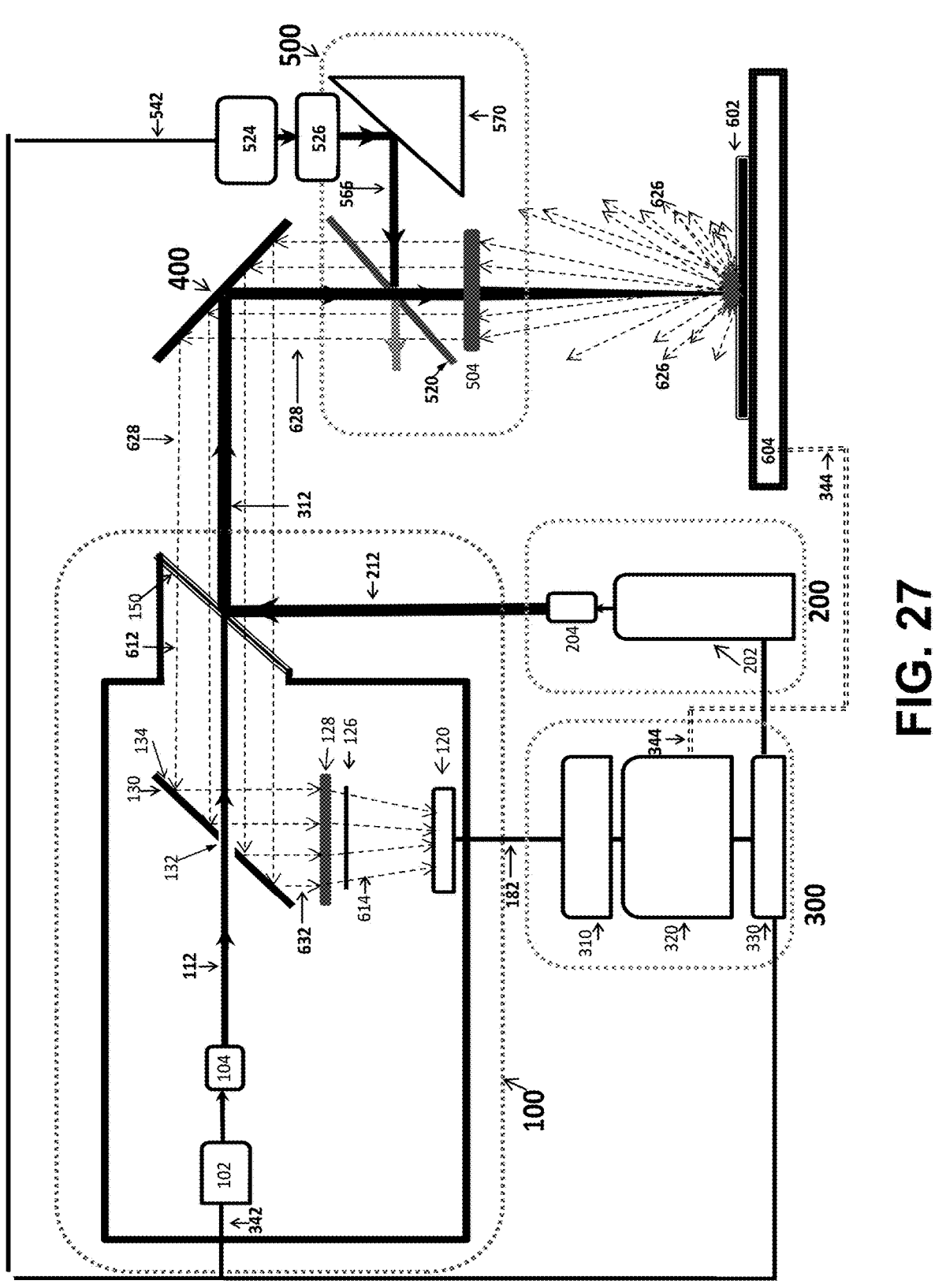
FIG. 27 shows for illustrative purposes only an example of a COA second mirror of one embodiment.

FIG. 27 shows for illustrative purposes only an example of a COA second mirror of one embodiment. FIG. 27 shows a COA without mirror 524 and cube beam splitter 550. Further, the COA comprises mirror 570 (instead of the cube beam splitter 550). In this configuration, the apparatus comprises detection assembly in the OSI while probe illumination beam sources are deployed inside the OSI and the COA. The probe illumination laser beam (diameter-adjusted) 566 (emitted by probe laser source 524 deployed in the COA) is combined with process and probe laser beams emerging from the OSI of one embodiment.

Figure 28:
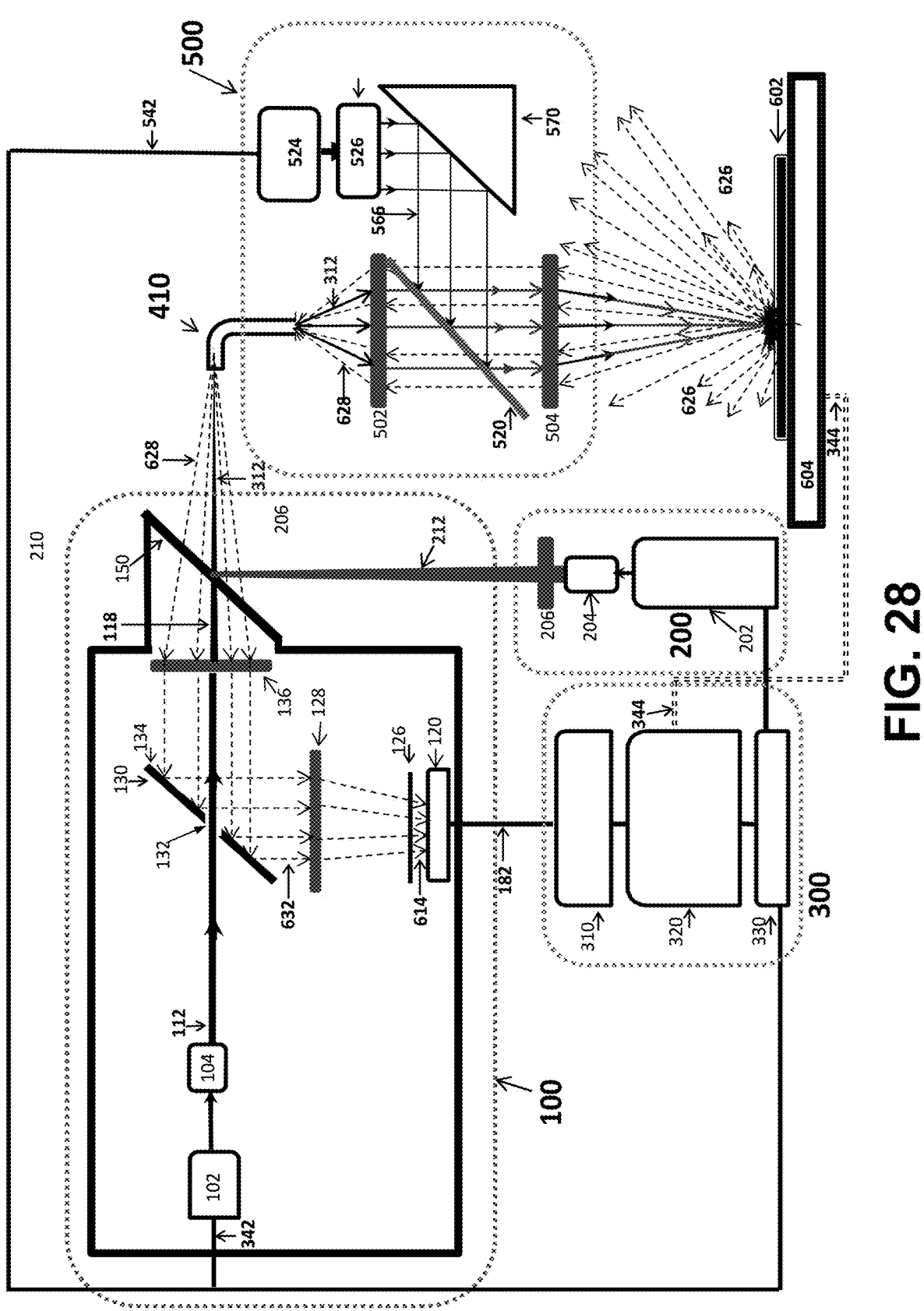
FIG. 28 shows for illustrative purposes only an example of a probe illumination beam of one embodiment.

FIG. 28 shows for illustrative purposes only an example of a probe illumination beam of one embodiment. FIG. 28 shows a probe illumination beam and process laser beams emerging from the OSI are transported to the COA via fiber optic medium 410 of one embodiment.

Figure 29:
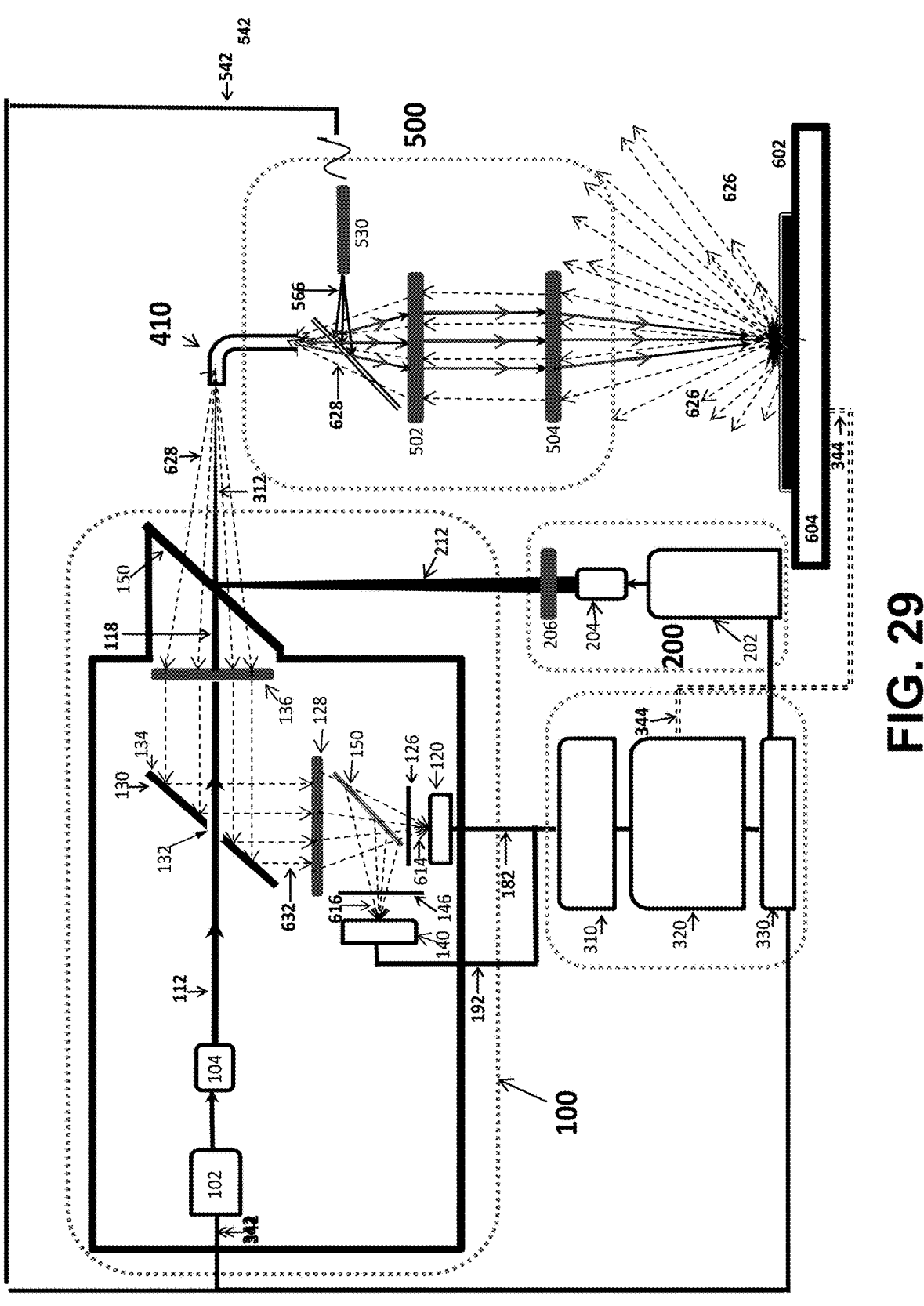
FIG. 29 shows for illustrative purposes only an example of a probe illumination beam delivered into the COA of one embodiment.

FIG. 29 shows for illustrative purposes only an example of a probe illumination beam delivered into the COA of one embodiment. FIG. 29 shows the probe illumination beam 566 is delivered into the COA via a fiber optic medium 530, and is combined with beams emerging from the fiber optic medium 410 before the collimation lens 502. Further, in this configuration, the apparatus comprises a second detector 140 deployed in the OSI. Alternatively, the probe illumination beam 566 is appropriately collimated and combined with the beams emerging from the fiber optic medium 410 after the collimation lens 502.

The fiber optic comprises an output end of non-circular shape, e.g., square shape, whereby the focused image of the fiber optic output end, formed by collimating and focusing lenses on the target surface, is of square shape; or output end of rectangular shape of a desired aspect ratio, whereby the focused image of the fiber optic output end, formed by collimating and focusing lenses on the target surface, is a rectangular spot of the same aspect ratio.

The apparatus probe illumination beam in the COA is combined and collinear with the process laser at the exit-end of said fiber optic, wherein the beams are combined either before the collimation lens 502, deployed in the COA, or after the collimation lens.

The combined process and probe laser beam(s) are transported via a fiber optic medium to the Control Optics Assembly, wherein, said fiber optic medium is either a single-mode fiber optic, or a multi-mode fiber optic, and the COA further comprises collimating optics to collimate or reduce the divergence of the light beams emerging from the output end of said fiber and focusing the lens to focus the beam on the target of one embodiment.

Figure 30:
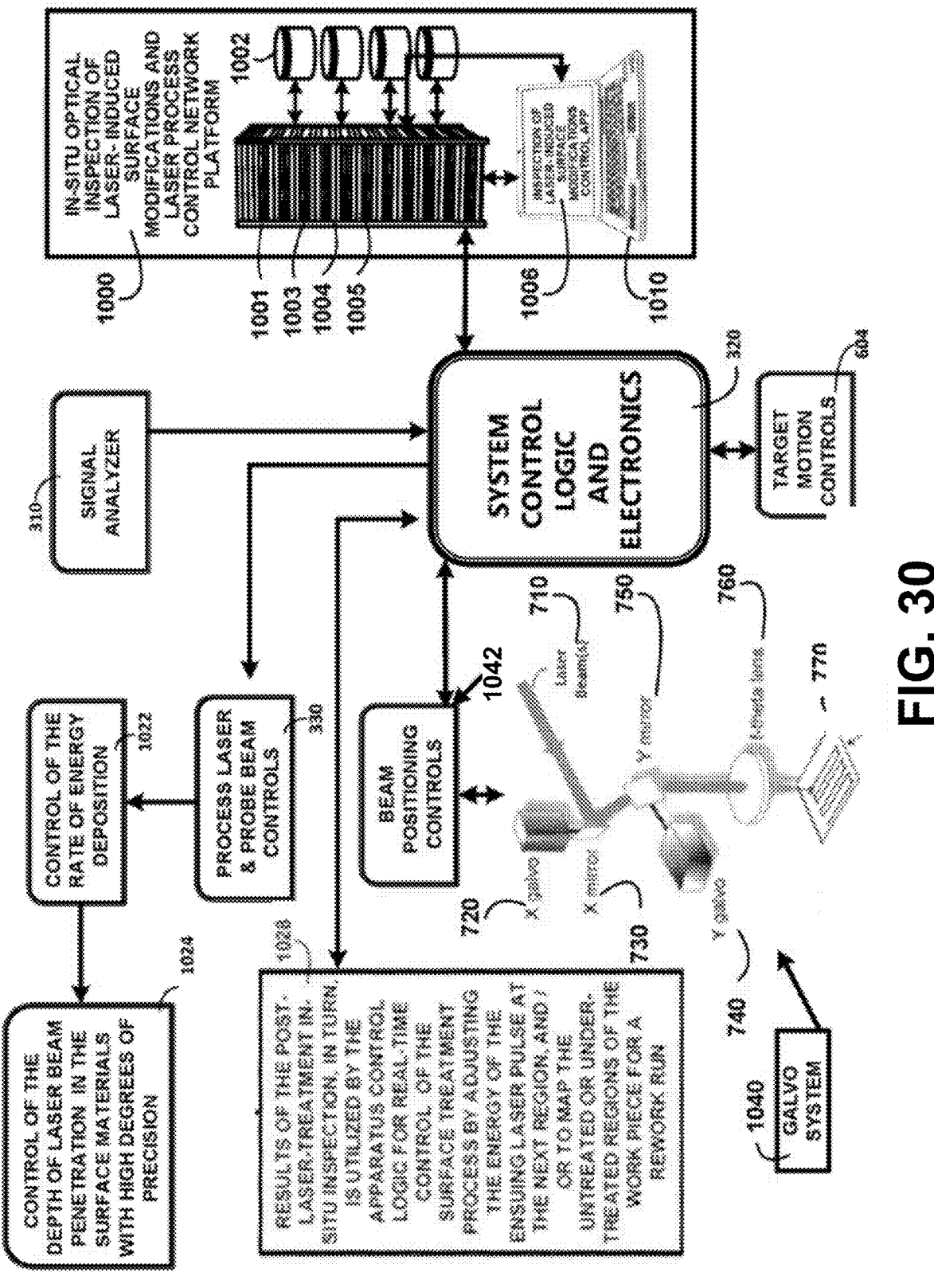
FIG. 30 shows for illustrative purposes only an example of a control network platform of one embodiment.

Control Logic Laser Controls:

FIG. 30 shows for illustrative purposes only an example of a control network platform of one embodiment. FIG. 30 shows an in-situ optical inspection of laser-induced surface modifications and laser process control network platform 1000. The network platform provides a plurality of databases 1002 for recording inspection and modification data. At least one digital server 1001 operates at least one WI-FI internet communication device 1004 and at least one cellular communication device 1005 for remotely communicating with the embodiments of the in-situ optical inspection of laser-induced surface modifications and laser process integrated apparatuses. The network platform includes an inspection of laser-induced surface modifications control app 1006 installed on a network computer 1010. FIG. 30 shows, for example, a galvo system 1040.

The system control logic and electronics 320 transmits generated data from in-situ optical inspection of laser-induced surface modifications to control network platform 1000 using at least one WI-FI internet communication device 1004. The system control logic and electronics 320 using at least one cellular communication device 1005 is transmitting and receiving data to and from a user digital device.

The inspection and modification data transmitted from the control logic is recorded on the plurality of databases 1002. At least one digital server 1001 passes the inspection and modification data to at least one digital processor 1003 for performing an analysis of the data. At least one digital server 1001 transmits the analysis performed by at least one digital processor 1003 of the inspection and modification data to the system control logic and electronics 320. At least one digital processor analysis of the inspection and modification data All Photo-detectors (photo-sensors), e.g., 120 of FIG. 5, 140 of FIG. 6, 516 of FIG. 33 send current electrical signal (i.e., Probe Signal) to Signal Analyzer 310. Signal Analyzer 310 measures the electrical signal (i.e., Probe Signal) and determines the Light Intensity. It then communicates to System Control Logic and Electronics 320. Beam Positioning Control 1042 sends Position Data to System Control Logic and Electronics 320. Target Motion Control 604 sends Position Data System Control Logic and Electronics 320. System Control Logic and Electronics 320 communicates all available Position Data and Probe Signals values with in-situ optical inspection of laser-induced surface modifications and laser process control network platform 1000. In-situ optical inspection of laser-induced surface modifications and laser process control network platform 1000 sends decisions on process Laser Power (e.g., laser pulse intensity, or other laser vital parameters), Positions, and Timing, etc. to the System Control Logic and Electronics 320.

The apparatus further comprises utilizing photodetector signals to construct an image of the target surface before any modifications. The constructed image is recorded in the plurality of databases 1002 as an unmodified or a reference surface. The inspection process of the target surface area, region by region, for determined positions of interest on the surface; and constructing an image of the surface pixel by pixel whereby each pixel represents a region on the surface, each pixel value corresponding to the value of the collected probe light at a region with defined position, whereby the constructed image can be used to guide laser pulse intensity adjustment for each region where the modification is desired, or in a 2nd laser processing run to treat and modify the regions where the modification is needed.

A System Control Unit is used to control lasers and probe illumination light operation; electronics; positioning workpiece; receiving, analyzing, and transmitting digital and analog signals and information for controlling and monitoring apparatus operation, controlling and tracking the position of probe and process laser beams on a target surface, controlling probe beam(s) illumination and/or pulsing, analyzing probe beam signals, constructing a digital image of the target surface, wherein the image pixels corresponds to the collected light at each determined position. The System Control Unit includes control of the depth of laser beam penetration in the surface materials with high degrees of precision 1024, control of the rate of energy deposition 1022, and laser and system control software 330. The galvo system 1040 is a beam scanning system comprising two galvo mirrors 700 of FIG. 1 for a beam positioning controls 1042. A galvo system 1040 includes a laser beam(s) 710, an X galvo 720, an X mirror 730, a Y galvo 740, a Y mirror 750, an f-theta lens 760, and a target surface 770.

Processing the target surface region by region for determined positions on the surface; and constructing an image of the surface pixel by pixel, whereby each pixel represents a region on the surface, the pixels corresponding to the value of collected light at each determined position, whereby the constructed image can be used to guide laser pulse intensity adjustment for each region in a 2nd laser processing to treat and modify the regions where the intended surface modification had not been completed in the first surface processing run.

Temporally separated from the process laser pulse and executed before a process laser pulse impinges the region to perform an in-situ pre-laser-modification inspection of the region, and the method further comprising in-situ adjusting or muting the laser pulse intensity of the ensuing pulse based on analyzing collected probe beam power to avoid delivery of laser energy at the regions where surface modification is not needed and exposing the region to laser radiation may cause harmful effects to the workpiece surface and temporally overlapped, or partially overlapped, with the process laser pulse impinging the region of one embodiment.

In one embodiment the process laser and probe illumination light beams on the target surface are moved in discrete step-and-expose sequence scheme region by region, wherein a region overlaps the previous region(s) and/or the subsequent region(s). The probe illumination light is provided continuously at a target surface, whereby sampling and measurement of back-scattered signal reflected from a region, arriving at said Photo-detector, can be executed at an arbitrary time concerning a process laser pulse impinging the region.

The probe illumination light is provided as pulses of illuminating light at a target surface, whereby the pulse illumination timing at a region under interrogation, sampling, and measuring of the collected back-scattered light reflected from the illuminated area is appropriately synchronized concerning the start and/or the completion of a process laser pulse. Laser pulses are directed onto a target surface to modify the surface by ablating and removing a surface coating layer(s), to expose an under-layer coating or the target surface substrate for rework, further wherein said layer comprises organic coating materials; or inorganic coating materials; or paint materials; or ceramic materials; or primer materials. The laser pulses are directed onto a target surface to modify the surface to produce surface micro or nano bumps or surface micro or nanostructures, to modify surface roughness, friction, surface optical reflectivity, and surface optical characteristics, to ablate surface material to produce surface structure for modifying surface optical and mechanical characteristics, surface patterning, surface structuring, to clean surface contaminants and stain, dust, rust, mold residues, and oil, to enhance the surface hardness, or to alter surface color, and/or surface reflectivity behavior.

The back-scattered probe signal comprises a single or two-photon fluorescence signal, a Raman signal generated from a sample, or laser-induced plasma emission. The Optical Surface Inspection, OSI, assembly includes the Optical Reflector Component and comprises a reflective slab-shape flat mirror comprising at least one reflective surface and one surface through-hole opening; or a through-hole opening, and has different non-slab geometrical shape, e.g., prism shape, wherein said reflective surface is a concave, or a parabolic surface, that reflects and converges the back-scattered light reflected from the region, or a flat surface; or a convex surface; and further the reflective surface is oval shape, or circular shape, square shape, or rectangular shape. A polarizing beam-splitting cube, or a polarizing beam-splitting slab, to split probe light beam(s), both the outgoing source probe beams and incoming back-scattered probe light beam(s) reflected from the target surface; or is a non-polarizing beam-splitting cube, or a non-polarizing beam-splitting slab, to split probe light beam(s), both the outgoing source probe beams and the incoming back-scattered probe light beam(s) reflected from the target surface into two orthogonally polarized beams.

The Optical Surface Inspection, OSI, assembly wherein the probe illumination light source comprises a laser source, wherein the laser source emits polarized laser light; or non-polarized laser light; or non-polarized laser light that is converted to polarized light and an LED source, wherein the LED light source emits near monochromatic radiation; or continuous spectra; or band spectra; or white light source of continuous or band spectra; or plurality of the light sources. The OSI further comprises a second probe illumination source, wherein the second probe beam is a laser beam whose wavelength differs from the first laser probe beam and is combined and collinear with the first probe beam, or it is an LED light beam (near monochromatic, or wide spectrum light), or other wide-spectrum light beams, e.g., white light; and, or a second Photo-detector assembly. The COA further comprises a probe illumination source deployed in the COA, wherein the said probe beam is a laser, or LED light beam (single color, or narrow-spectrum, or wide-spectrum), or wide-spectrum light beam, e.g., white light; and, or Photo-detector assembly.

The Control Optics Assembly, COA, and the target surface plane are appropriately oriented such that the incident angle of the process and laser beams emerging from the COA, and impinging the target surface, deviate from normal to the target surface to minimize or eliminate undesirable specularly reflected light off the surface, traveling along said common optics path, in the collected probe light and allow back-scattered probe light to reach said Photo-detectors. The apparatus further comprises a light-blocking component appropriately positioned in front of a Photo-detector to minimize or eliminate undesirable light specularly reflected off the surface, traveling along the common optics path, in the collected probe light and allowing back-scattered light to reach the Photo-detectors.

In another embodiment, the apparatus further comprises additional auxiliary Photo-detector sub-assemblies attached to the COA and appropriately deployed between the COA and the target surface, wherein said Photo-detectors sub-assemblies comprise multiple one-dimensional linear arrays of Photo-detectors, wherein they are attached to the COA, and deployed and oriented symmetrically concerning central axis of the focusing lens.

The apparatus includes a one-axis line beam scanning mechanism, e.g., a galvo mirror or polygon mirror, or dual-axis XY beam scanning, e.g., XY galvo mirror system, or XY spinning polygon mirror, or a single-axis galvo mirror combined with a single-axis polygon mirror to scan the focus over a target area; or three-axis XYZ beam scanning; or a combination of spinning rotary beam scanning combined with linear translation of said COA, or linear translation of a target surface to provide two-dimensional scanning of the beam over a target area. The apparatus further comprises additional auxiliary Photo-detector sub-assemblies attached to the COA and appropriately deployed between the COA and the target surface, wherein the Photo-detector sub-assemblies comprise at least one single small-area Photo-detector or a one-dimensional linear array of Photo-detectors appropriately positioned to collect back-scattered probe light reflected off the target surface, but not collected by COA focusing optics; or multiple small-area photo-sensitive detectors are deployed and oriented symmetrically concerning the central axis of the focusing lens; or multiple linear arrays of Photo-detectors, wherein they are attached to the COA, and deployed and oriented symmetrically concerning the central axis of the focusing lens.

Multiple small-area Photo-detectors are deployed and oriented symmetrically concerning the central axis of the focusing lens, or at least one single small-area Photo-detector or a one-dimensional linear array of Photo-detectors appropriately positioned to collect back-scattered probe light reflected off the target surface, but not collected by COA focusing optics. The apparatus is configured with at least one device for transmitting high-speed digital information for the apparatus and sub-systems operations of one embodiment.

Figure 31:
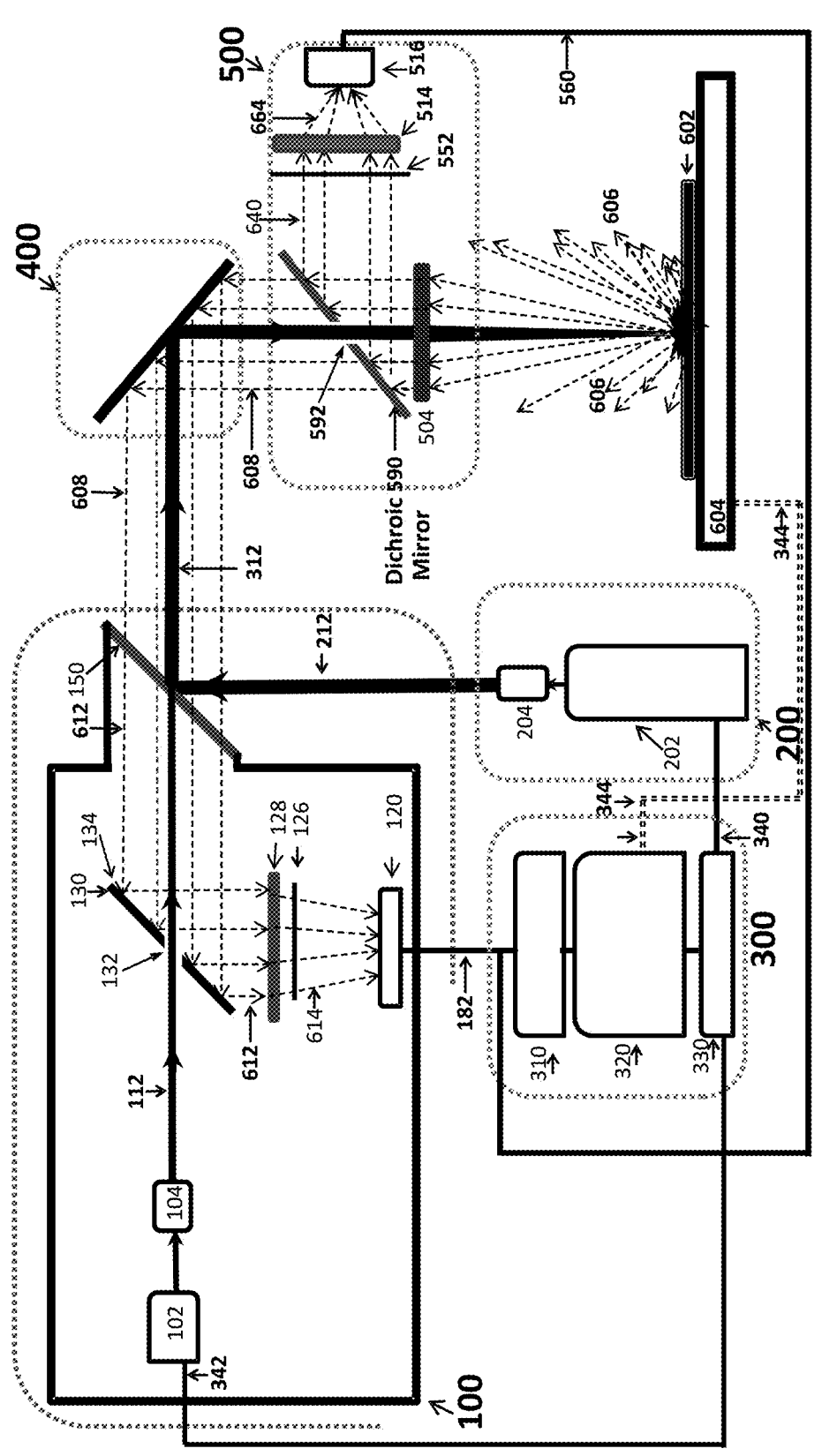
FIG. 31 shows for illustrative purposes only an example of an Optical Surface Inspection apparatus comprising a laser source utilized for surface processing and surface probing of one embodiment, and COA comprising a dichroic mirror with a pass-through opening of another embodiment.

FIG. 31 shows for illustrative purposes only an example of an Optical Surface Inspection apparatus of one embodiment. In this configuration, shown in FIG. 31 as an example, the Optical Surface Inspection apparatus comprises OSI Assembly 100 comprising one probe beam source 102 and a photo-detector subassembly comprising a photo-detector 120. Further, COA 500 comprises a photo-detector subassembly comprising a photo-detector 516 to detect back-reflected process laser beam for measurement and analysis as a probe beam. FIG. 31 shows OSI assembly 100 includes an Optical Reflector Component 130 comprising a surface with high-reflectivity 134 and a thru-hole opening 132, to permit the source probe beam 112 to pass through the mirror, placed in the path of the probe beam 112. Further, the surface of high reflectivity 134 separates a portion of back-scattered probe light beam(s) 612, reflected off of the target surface, and directs it toward the Photo-detector (e.g., a Silicon Photodiode) 120.

The OSI Assembly 100 includes a dichroic combiner mirror 150 that highly reflects the process beam and transmits probe beam(s), and is appropriately positioned and oriented to combine and collinear process beam 212 and probe beam 112, and direct the combined beams 312 toward a turning mirror 400. Further, the OSI Assembly 100 includes a Photo-detector subassembly comprising a Photo-detector 120 which detects probe light power and sends probe power signal to the signal analyzer unit 310, and appropriate optical components, e.g., optical filters 126 to transmit probe light of a wavelength of interest, and condensing lens 128.

FIG. 31 shows the COA 500 comprising a Dichroic Mirror 590 with a pass-thru opening 592 large enough to permit the combined beam Process and Probe beams 312, re-directed by Turning Mirror 400, to pass through the COA and impinge focusing lens 504. Further, Dichroic Mirror 590 highly reflects the back-reflected Process Laser light and substantially transmits desired back-reflected Probe light wavelength(s). The focusing lens 504 focuses the combined beam 312 onto a target surface of one embodiment. The back-reflected scattered light 606 comprising scattered light from probe laser light, process laser light, and light generated by laser-surface materials interaction, scattered off of an illuminated surface area, is partially collected and substantially collimated by COA focusing lens, and partially redirected by dichroic mirror 590, towards photo-detector 516. FIG. 31 shows COA photo-detector subassembly further comprises an optical filter component 552 to efficiently transmit process laser beam component 664 in said redirected beams and block undesired light. Photo-detector 516 detects process laser back-reflected laser beam 664 and sends power signal 560 to the signal analyzer unit 310 to be analyzed as a surface inspection probe signal. Further, back-reflected scattered light 606 is partially transmitted back to OSI Assembly 100 for measuring the light intensity of selected constituent probe wavelength(s) of interest.

Figure 32:
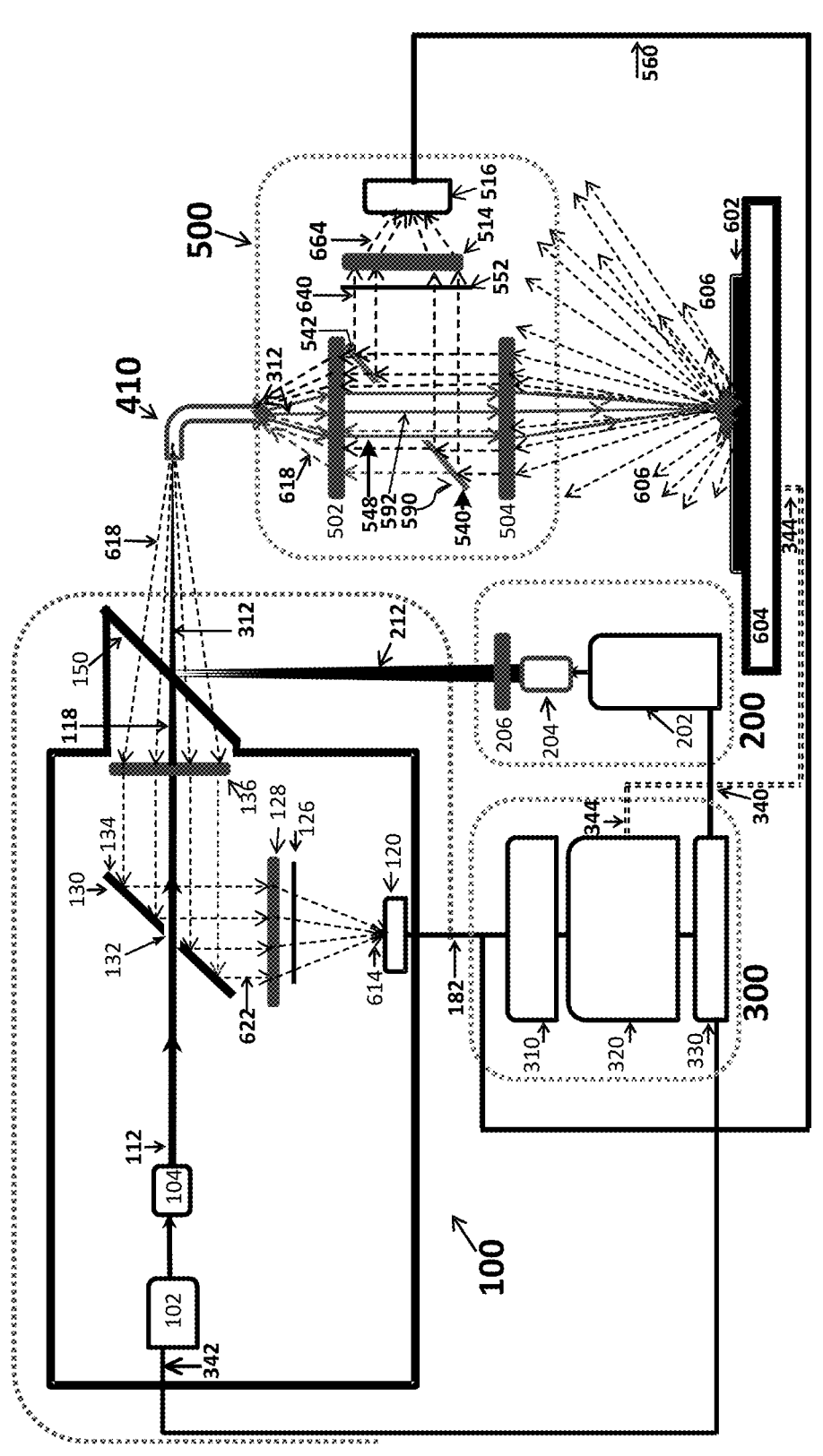
FIG. 32 shows for illustrative purposes only an example of an Optical Surface Inspection apparatus structure comprising a COA pass-through opening dichroic mirror of one embodiment, and fiber-optic medium of another embodiment.

FIG. 32 shows for illustrative purposes only an example of an Optical Surface Inspection apparatus structure of one embodiment. FIG. 32 shows, as an example, an apparatus design configuration as described in FIG. 31 which further comprises a beam delivery fiber optic medium 410 of one embodiment, wherein process and probe laser beams are coupled into said fiber-optic medium 410. COA 500 comprises a dichroic mirror 590, as described in FIG. 31, comprising appropriately large enough pass-thru opening 592 to permit light beams emerging from the fiber optic to pass through the mirror and focus onto the target surface of one embodiment.

Back-reflected scattered light 606, scattered off of an illuminated surface area, is partially collected and substantially collimated by COA focusing lens, and partially redirected by dichroic mirror 590 towards photo-detector 516. FIG. 32 shows COA photo-detector assembly, as described in FIG. 31, further comprises an optical filter component 552 to efficiently transmit process laser beam component 664 in said re-directed beams. The intensity of back-reflected light of process laser beam 664 is measured and analyzed as an inspection probe. Further, back-reflected scattered light 606 is partially transmitted to OSI for measuring the light intensity of selected constituent wavelength(s) of interest.

In another embodiment, instead of the dichroic mirror 590, COA comprises high-reflectivity mirror 540 comprising pass-through opening 548 and substantially reflective surface 542 to partially re-direct back-reflected process light toward the photo-detector 516.

Figure 33:
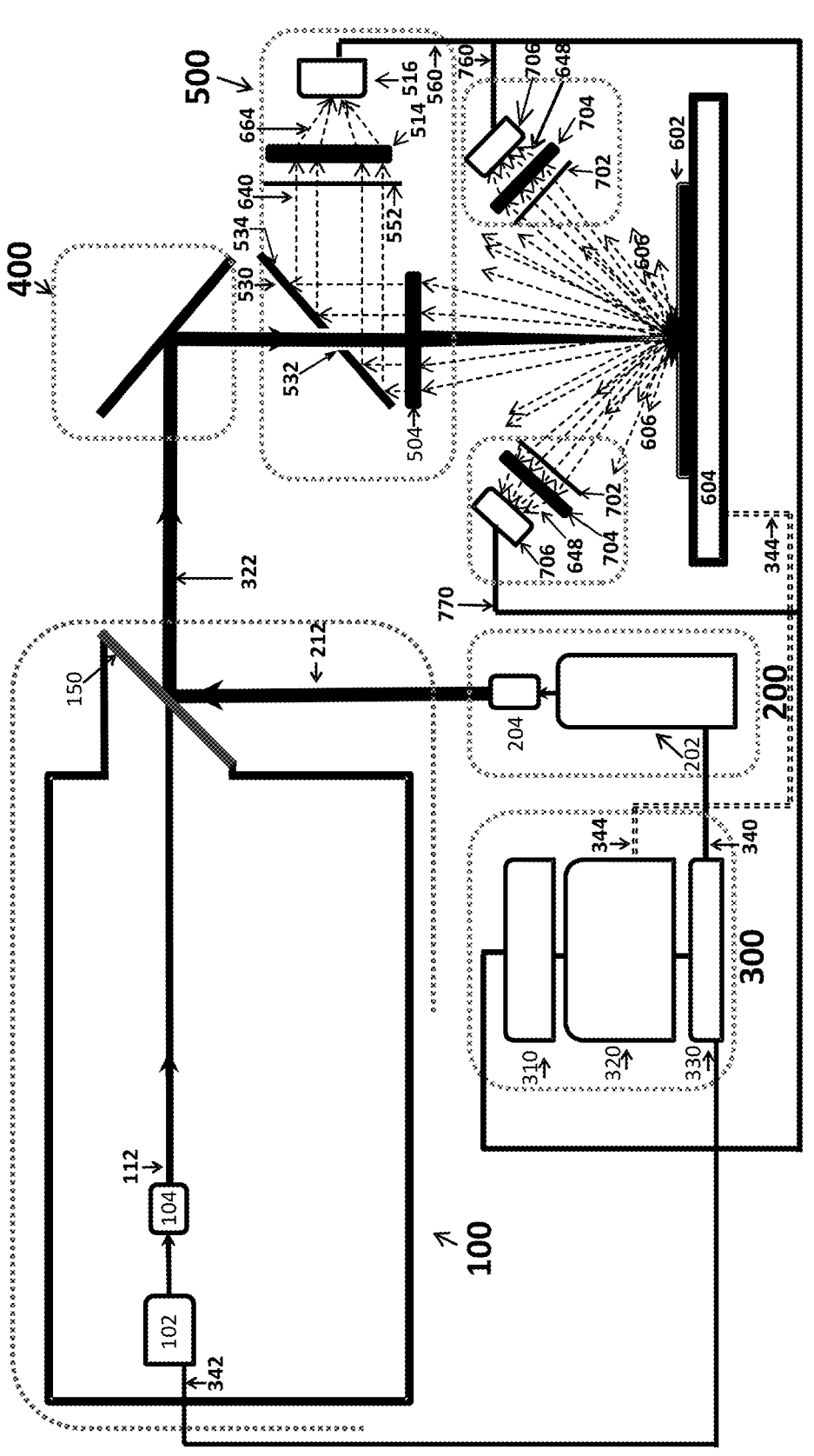
FIG. 33 shows for illustrative purposes only an example of the detection of process laser back-reflected scattered light of one embodiment.

FIG. 33 shows for illustrative purposes only an example of process beam back-scattered light for surface inspection of one embodiment. FIG. 33 shows the utilization of process beam back-scattered light for surface inspection using a photo-detector deployed inside COA. FIG. 33 shows an apparatus design configuration, as an example, wherein the apparatus comprises a photo-detector subassembly inside COA 500, and auxiliary photo-detector assemblies appropriately positioned between the COA 500 and the target surface 602, and one probe beam source 102 inside OSI 100.

FIG. 33 shows COA 500 comprises mirror 530, comprising appropriately large enough pass-through opening to permit light beams 312 entering COA 500 to pass through the mirror and focus onto the target surface of one embodiment, and a surface 534 with high-reflectivity at probe beam and process beam wavelengths. Further COA 500 comprises a photo-detector subassembly as described in FIG. 31. The photo-detector subassembly in COA 500, as described in FIG. 31, comprises an optical filter component 552 to efficiently transmit back-reflected process laser beam 664 for detection by photo-detector 516 and it's utilization as an inspection probe beam.

FIG. 33 further shows auxiliary photo-detectors are appropriately positioned between the COA 500 and the target surface 602 and partially detect scattered light reflected off of an illuminated region. Optical filter component 702 is appropriately selected to efficiently transmit back-reflected probe beam 648 and substantially block undesired light. Filtered back-reflected process laser 648 is condensed by condensing lens 704 and impinges on the photo-detector(s) 706 for measurement, analysis, and utilization as an inspection probe beam. In another embodiment, optical filter component(s) 702 in an auxiliary photo-detector subassembly is appropriately selected to efficiently transmit back-reflected process laser beam for detection by photo-detector 706 and its utilization as an inspection probe beam. In such apparatus configuration, the COA photo-detector 516 and auxiliary photo-detector(s) 706 provide a power signal for back-reflected process laser beam scattered off of an illuminated region on the target surface. Yet in another embodiment, the apparatus optical filter components of COA and auxiliary photo-detector subassemblies are appropriately selected to facilitate the detection of back-reflected Process Laser beam by auxiliary photo-detector 706, and detection of back-reflected Probe beam by COA photo-detector 516.

Figure 34:
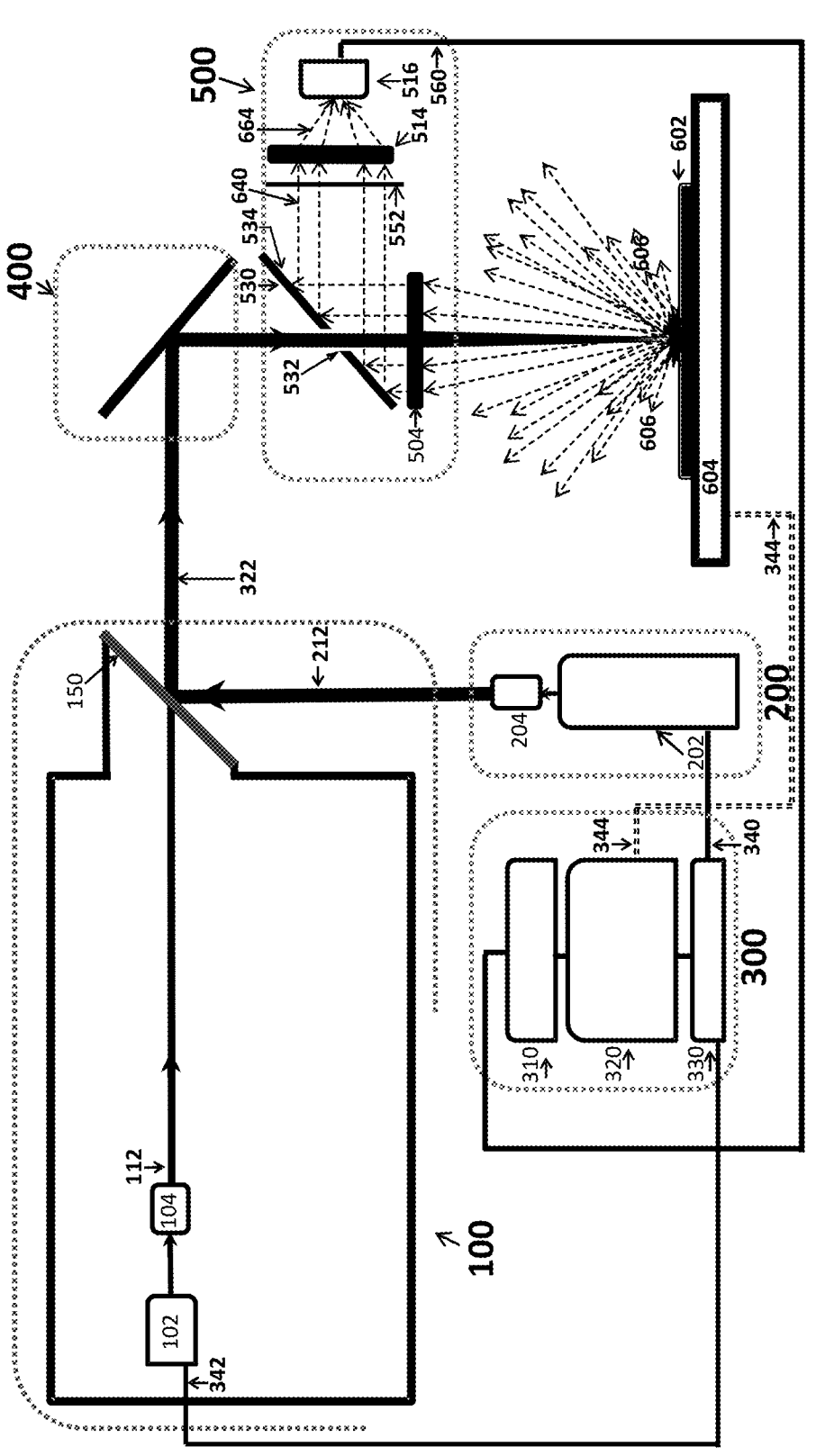
FIG. 34 shows for illustrative purposes only an example of one COA photo-detector subassembly of one embodiment, and the OSI without the Photo-detector and the Optical Reflector Component of another embodiment.

FIG. 34 shows for illustrative purposes only an example of a one photo-detector subassembly of one embodiment. FIG. 34 shows an apparatus design configuration, as an example, wherein the apparatus comprises, as described in FIG. 31, one photo-detector subassembly deployed inside COA 500 and OSI 100 comprises one probe laser 102. Photo-detector subassembly deployed in COA comprises an optical filter component 522, to permit sufficient transmission of process laser back-reflected scattered light 664 for detection and measurement by photo-detector 516 as a probe beam for surface inspection.

In this configuration, optionally, the probe light source 102 can be utilized as a probe beam for surface inspection by replacing optical filter 552 with an appropriate optical filter component that efficiently transmits light at the wavelength of the probe beam source 102.

Figure 35:
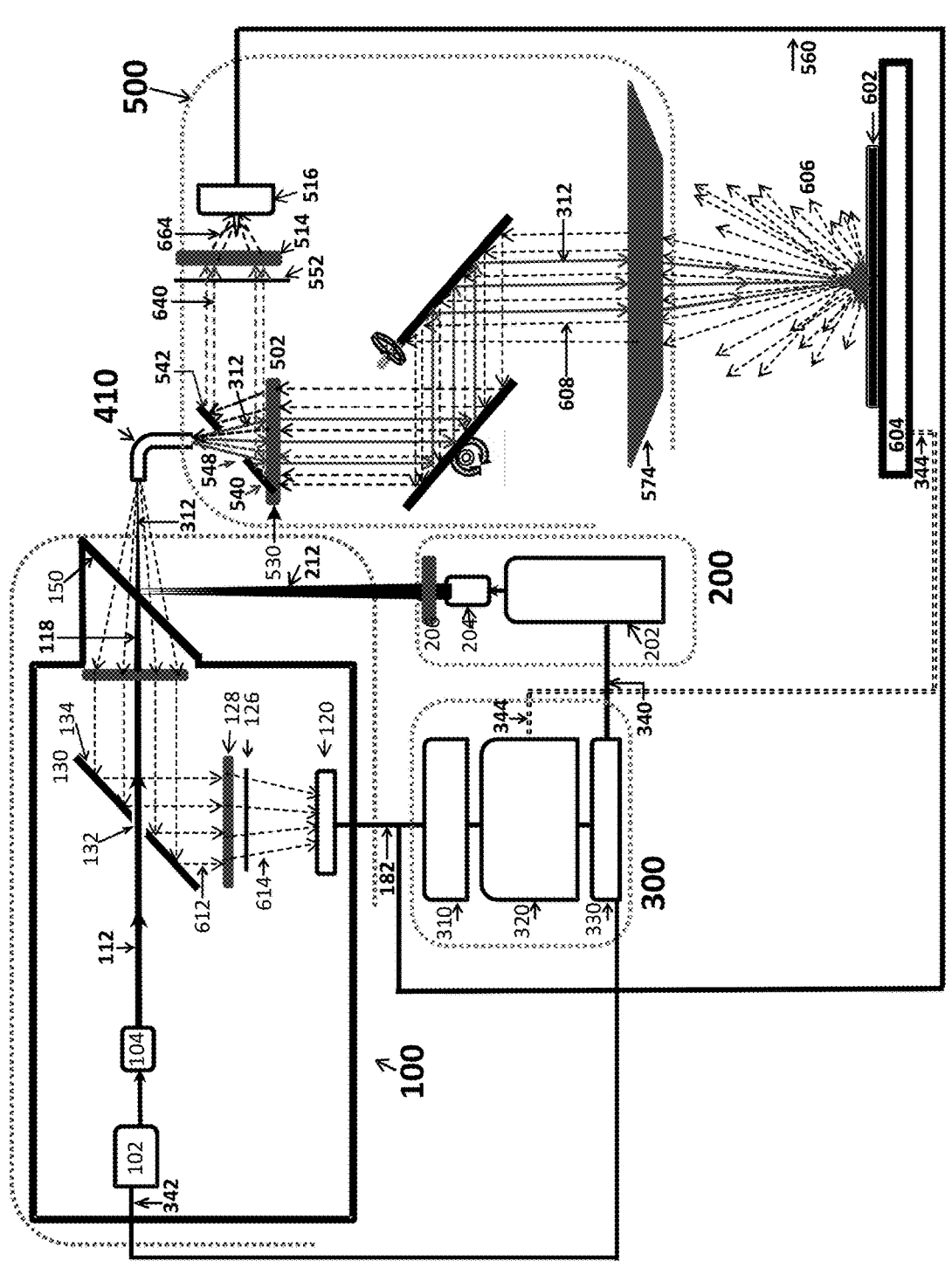
FIG. 35 shows for illustrative purposes only an example of a beam scanning mechanism of one embodiment.

FIG. 35 shows the utilization of process beam back-scattered light for surface inspection in an apparatus configuration comprising a fiber-optic medium and a beam scanning assembly. FIG. 35 shows an apparatus design configuration for illustrative purposes only an example of a beam scanning mechanism of one embodiment. FIG. 35 shows coupled to the COA a beam scanning mechanism. The beam scanning mechanism is controlled and monitored by the system Control Logic to position the process and probe laser beams on the target surface, and appropriate focusing lens, e.g., Telecentric or F-Theta lens 574 of one embodiment.

FIG. 35 shows the apparatus comprises a fiber optic medium of one embodiment wherein process and probe laser beams are coupled into the fiber-optic medium 410. FIG. 35 shows COA 500 comprises a beam-scanning sub-assembly and a mirror 540 comprising pass-through opening 548 large enough to permit a beam emerging from said fiber-optic to pass through and be delivered to a target surface 602 via said beam-scanning sub-assembly.

Back-reflected scattered light 606 is partially collected and collimated 608 by focusing lens 574 and partially re-directed towards photo-detector 516 by the said mirror 540. Further COA comprises an optical filter component 552 to efficiently transmit the process beam component in the back-reflected beam, and substantially eliminate the unwanted light. The transmitted process laser beam component 664 impinges on the photo-detector 516 which detects back-reflected process beam light power and sends the power signal 560 to the signal analyzer unit 310 to be utilized as an inspection probe signal. FIG. 35 further shows the OSI 100, as described in the apparatus design configuration in FIG. 32, comprises one probe laser beam source 102, Optical Reflector Component 130, and photo-detector 120 to detect probe light power and send probe power signal 182 to the signal analyzer unit 310. In another embodiment, alternatively, instead of high-reflectivity, HR, mirror 540 a dichroic mirror 590 as described in the apparatus design configuration in FIG. 31 is deployed inside COA at the exit end of said fiber optic.

Figure 36:
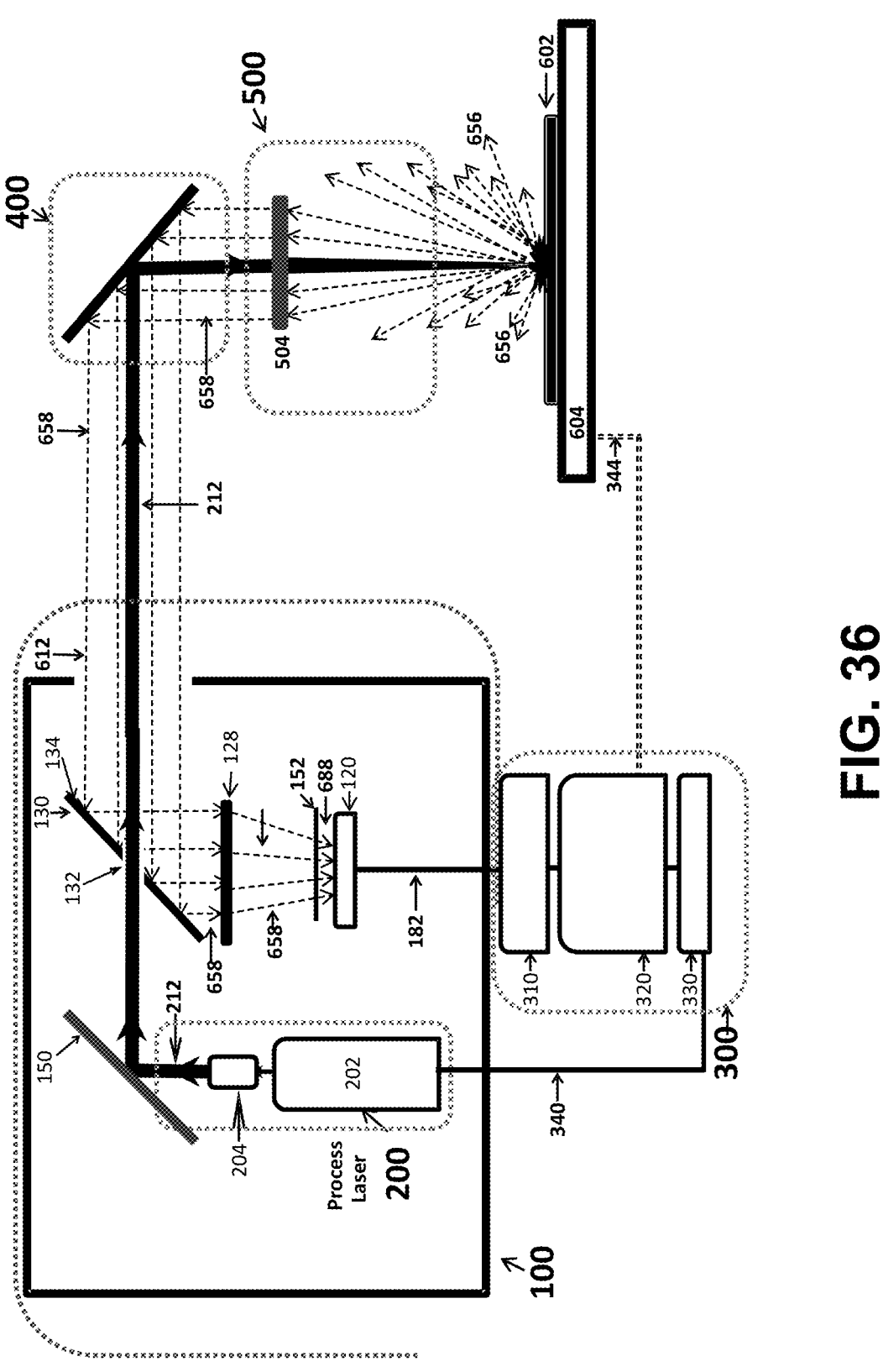
FIG. 36 shows for illustrative purposes only an example of a process laser system deployed inside the Optical Surface Inspection, OSI, assembly of one embodiment.

FIG. 36 shows for illustrative purposes only an example of a process laser system 200 deployed inside an Optical Surface Inspection Assembly of one embodiment. FIG. 36 shows the utilization of process beam back-scattered light for surface inspection deploying a Process Laser source, and a Photo-detector assembly inside OSI. FIG. 36, shows an example of an apparatus design configuration that comprises a process laser system 200 deployed inside the Optical Surface Inspection (OSI) Assembly 100 that emits Process beam 212 that passes through beam diameter-adjusting optics 204.

OSI 100 also includes Optical Reflector Component 130 with a pass-thru-hole to permit the Process Laser beam 212 to pass through the Optical Reflector Component 130 and be re-directed by turning mirror 400 to enter COA 500. FIG. 36 shows the back-reflected scattered light 656, scattered off of an illuminated surface area, is partially collected and substantially collimated 658 by COA focusing lens, and partially redirected back towards OSI Assembly 100. The back-reflected beam 658 entering OSI is substantially re-directed by Optical Reflector Component 130 towards a Photo-detector 120 deployed inside the OSI.

FIG. 36 further shows the OSI 100 comprises a Photo-detector subassembly comprising one Photo-detector 120 of one embodiment. Further, the Photo-detector assembly comprises an optical filter component 152 appropriately selected to efficiently transmit back-reflected Process laser beam component 688 and block undesired light. Back-reflected process beam 688 impinges Photo-detector 120 which detects process source back-reflected beam 688 and sends probe power signal 182 to the signal analyzer unit 310 to be analyzed as a surface inspection probe signal.

Figure 37A:
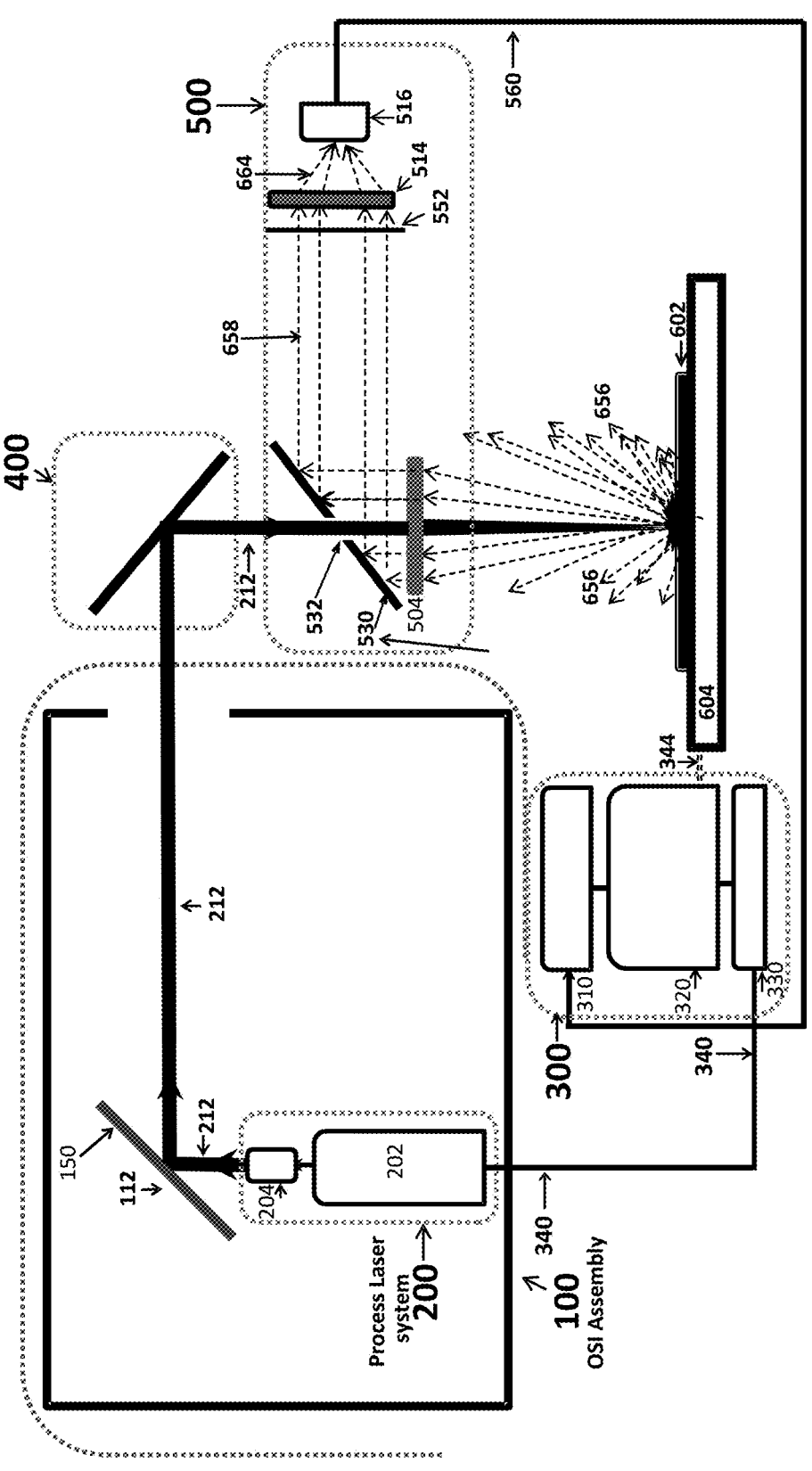
FIG. 37A shows for illustrative purposes only an example of a process laser system with no secondary probe beam source of one embodiment.

FIG. 37A shows for illustrative purposes only an example, the utilization of process beam back-scattered light for surface inspection deploying a Process Laser source inside OSI 100, with no secondary probe beam source, and a Photo-detector assembly inside COA 500. FIG. 37A shows an example of an apparatus design configuration that comprises a process laser system 200 deployed inside the Optical Surface Inspection (OSI) Assembly 100 as described in FIG. 36. The OSI Assembly 100 comprises a dichroic combiner mirror 150, or alternatively, a high-reflectivity mirror, that highly reflects process beam 212 and re-directs it towards turning mirror 400 which further redirects it to enter COA 500. FIG. 37A shows COA 500 comprises a mirror 530 comprising appropriately large enough pass-thru opening 532 to permit light beam 212, re-directed by mirror 400, to pass through the mirror and focus onto the target surface of one embodiment.

The back-reflected scattered light 656, scattered off of an illuminated surface area, is partially collected and substantially collimated by COA focusing lens, and substantially redirected by mirror 530 towards photo-detector 516. FIG. 37A shows COA photo-detector assembly further comprises an optical filter component 552 that efficiently transmits back-reflected Process laser beam component 664 in said re-directed beam and blocks undesired light. Photo-detector 516 detects process laser back-reflected beam 664 and sends power signal 560 to the signal analyzer unit 310 to be analyzed as a surface inspection probe signal. In another embodiment, alternatively, the mirror 530 can be replaced by a Dichroic Mirror (DM) 590 as described in FIG. 31.

Figure 37B:
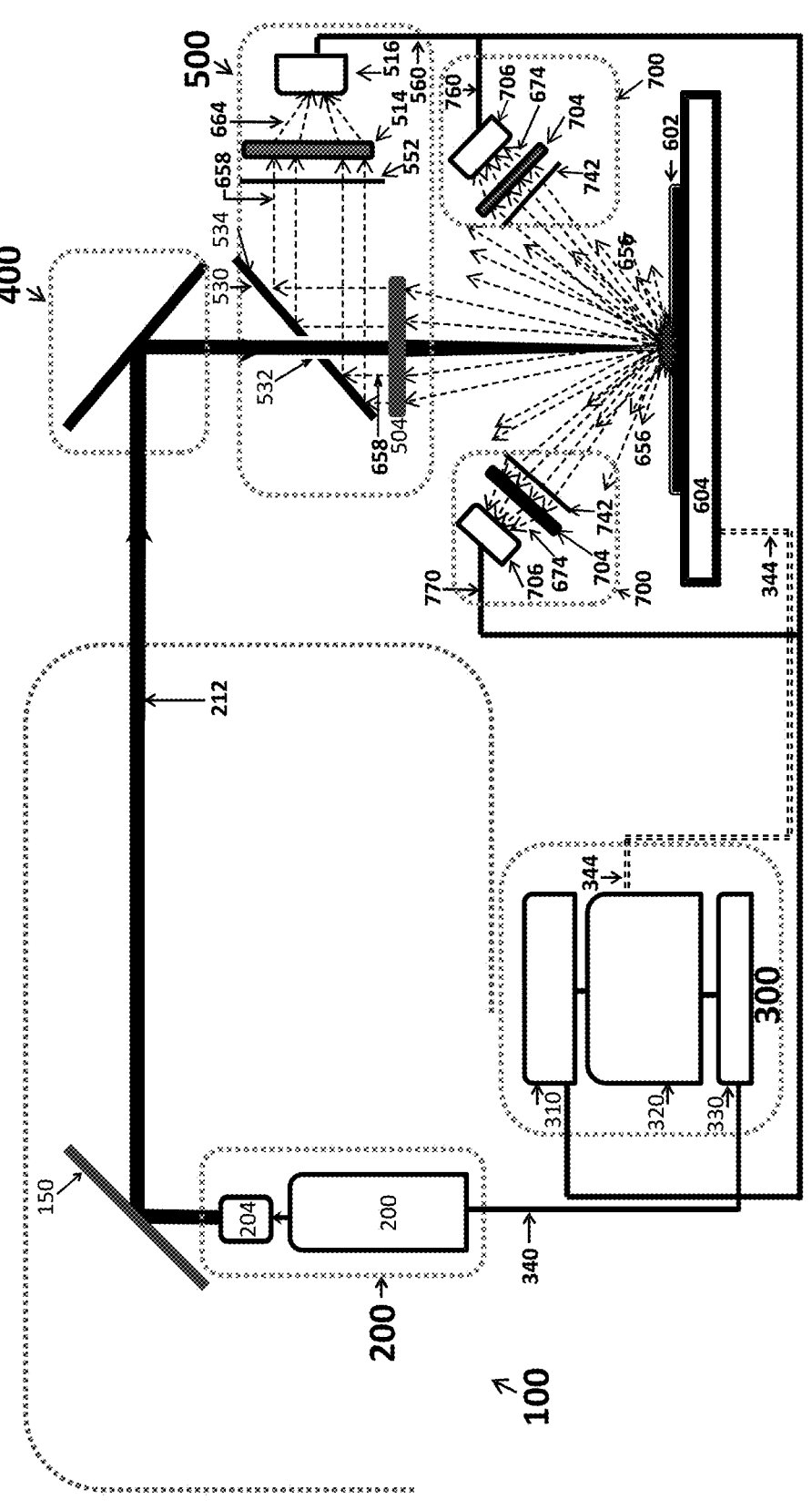
FIG. 37B shows for illustrative purposes only an example of additional auxiliary photo-detection assemblies of one embodiment.

FIG. 37B shows for illustrative purposes only an example of auxiliary photo-detection assemblies of one embodiment. FIG. 37B shows an example of an apparatus configuration design as described in FIG. 37A, wherein additional auxiliary photo-detector assemblies are conveniently deployed between a target surface 602 and COA 500. FIG. 37B shows the detection of process laser back-reflected beam 664 using COA photo-detection subassembly, as described in FIG. 37A. Additionally, utilizing optical filter component(s) 742 facilitates the detection of process laser back-reflected beam 674 by auxiliary photo-detector(s) 706.

Figure 38:
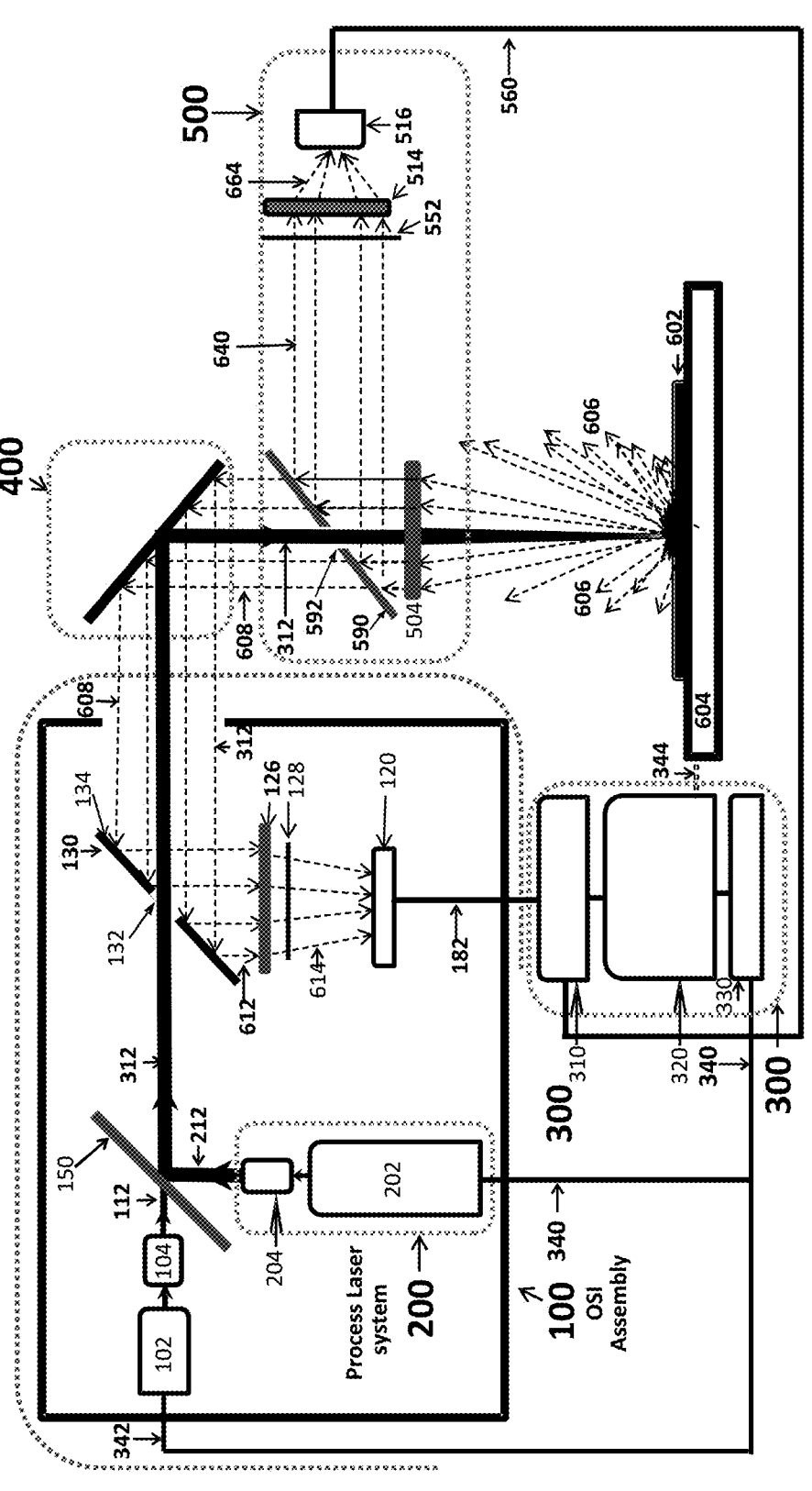
FIG. 38 shows for illustrative purposes only an example of an additional probe beam source and a dichroic combiner mirror of one embodiment.

FIG. 38 shows for illustrative purposes only an example of an apparatus design configuration that comprises a process laser system 200 deployed inside the Optical Surface Inspection (OSI) Assembly 100, as described in FIG. 36, and a probe laser beam source 102 that emits a Probe beam that passes through beam diameter-adjusting optics 104. OSI 100 comprises an optical reflector component 130 of one embodiment, and a dichroic combiner mirror 150 of another embodiment inside OSI. OSI 100 includes a dichroic combiner mirror 150 that highly reflects process beam and transmits probe beam 112, and is appropriately positioned and oriented to combine and collinear process beam 212 and probe beam 112 and direct the combined beam 312 toward a turning mirror 400.

FIG. 38 shows COA 500 comprises a dichroic mirror 590, as described in FIG. 31, comprising appropriately large enough pass-thru opening 592 to permit light beams 312 re-directed by mirror 400, to pass through said dichroic mirror and focus onto the target surface of one embodiment.

As described in FIG. 31, the back-reflected scattered light 606, scattered off of an illuminated surface area, is partially collected and substantially collimated by the COA focusing lens and partially redirected towards photo-detector 516. FIG. 38 shows COA photo-detector assembly further comprises an optical filter component 552 to efficiently transmit process laser beam component 664 in said re-directed beam and block undesired light. Photo-detector 516 detects process laser back-reflected laser beam 664 and sends power signal 560 to the signal analyzer unit 310 to be analyzed as a surface inspection probe signal. Further, back-reflected scattered light 606 is partially transmitted through dichroic mirror 590 and directed back inside OSI for measuring the light intensity of selected constituent wavelength(s) of interest. FIG. 38 shows the OSI comprises, as described in FIG. 36, an Optical Reflector Component 130, which re-directs said returned beam 608, and a Photo-detector 120 which detects probe light power and sends probe power signal 182 to the signal analyzer unit 310.

Figure 39:
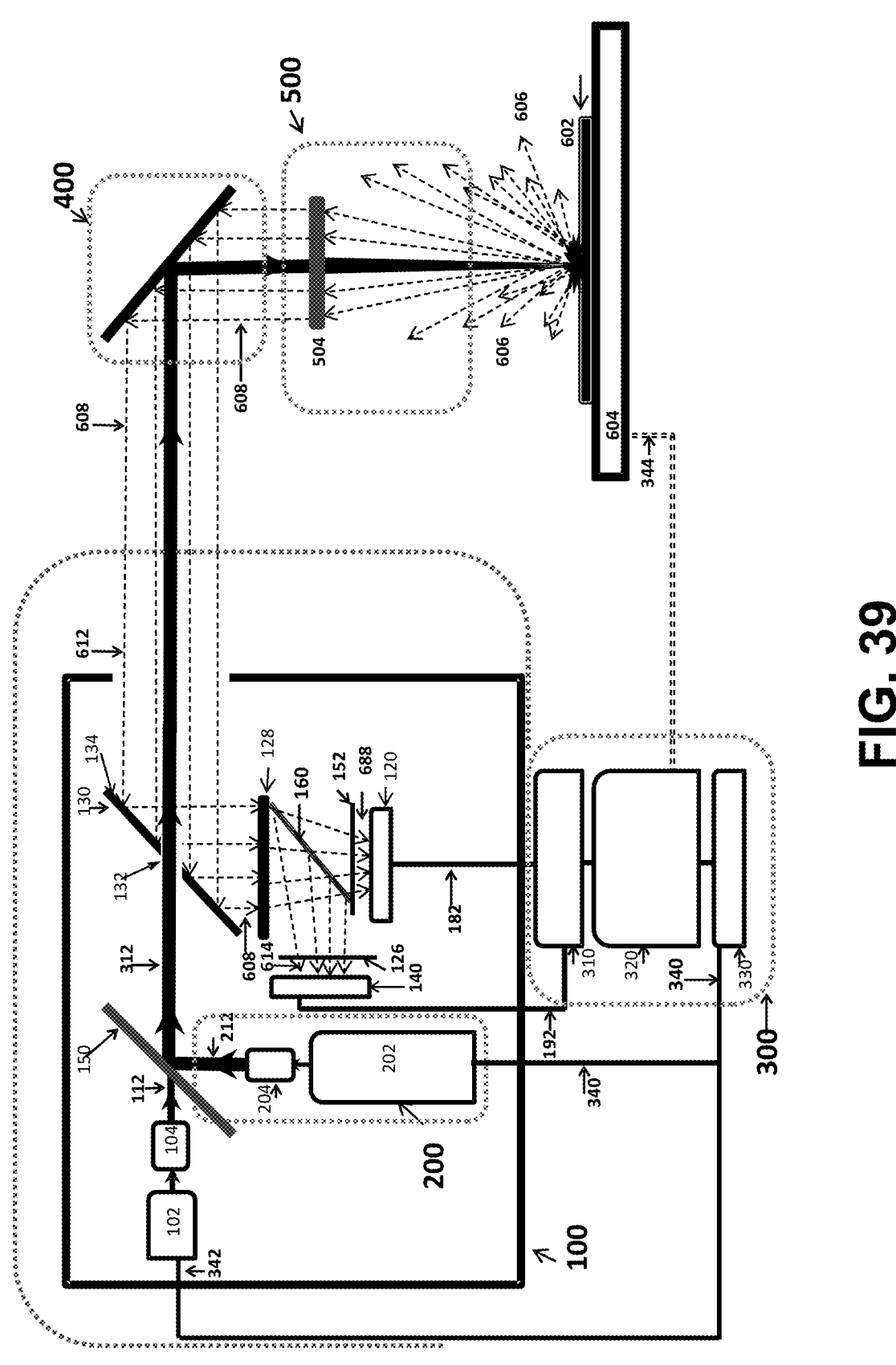
FIG. 39 shows for illustrative purposes only an example of an additional Photo-detector deployed inside of OSI of one embodiment.

FIG. 39 shows for illustrative purposes only an example of an apparatus design configuration wherein OSI 100 comprises a second photo-detector 140 of one embodiment. FIG. 39 also shows a dichroic mirror 160, deployed inside OSI 100, which splits the returned probe beams 608 based on its constituent wavelengths to reach Photo-detectors 120 and 140 of one embodiment.

FIG. 39 shows an apparatus design configuration that comprises a process laser system 200 and a probe beam source 102 deployed inside the Optical Surface Inspection (OSI) Assembly 100, as described in FIG. 38. FIG. 39 shows OSI 100 comprises a dichroic combiner mirror 150 of one embodiment, and an Optical Reflector component 130 of another embodiment, as described in FIG. 38. As described in FIG. 31, the back-reflected scattered light 606, scattered off of an illuminated surface area, is partially collected and substantially collimated 608 by COA focusing lens, and re-directed back towards OSI 100.

The OSI comprises two photo-detectors 120 and 140. The back-reflected beam transmitted back 608 inside OSI is partially re-directed by Optical Reflector Component 130 towards Photo-detector subassemblies. Further, OSI comprises a dichroic mirror 160 which splits the returned beams 608 based on its constituent wavelengths to reach Photo-detectors 120 and 140 of one embodiment. The dichroic mirror 160 is appropriately selected to efficiently transmit light at the wavelength of process laser source 202, and efficiently reflect light at the wavelength of probe beam source 102.

Further, Photo-detector assemblies comprise an optical filter component 152 appropriately selected to efficiently transmit back-reflected Process laser beam component 688 and block undesired light. Back-reflected process beam 688 impinges Photo-detector 120 which detects back-reflected process beam power and sends power signal 182 to the signal analyzer unit 310 to be analyzed as a surface inspection probe. Further, the light beam reflected by dichroic mirror 160 passes through an optical filter component 126 which efficiently transmits constituent beam 614 of desired wavelength and blocks undesired light. Said probe beam 614 impinges on photo-detector 140 which detects probe beam power and sends power signal 192 to the signal analyzer unit 310 to be analyzed as another surface inspection probe.

Figures 40A, 40B, 40C:
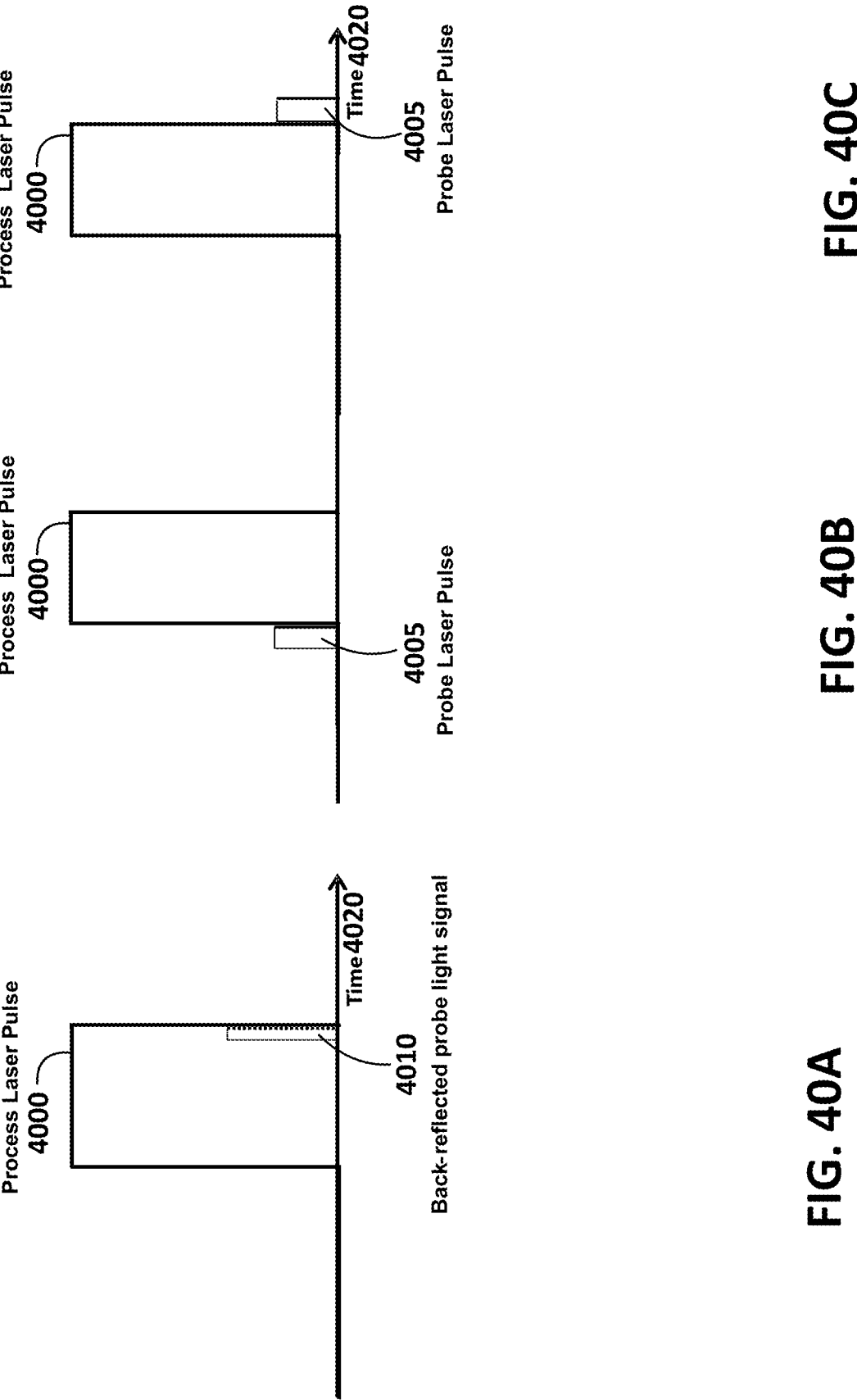
FIG. 40A shows for illustrative purposes only an example of a temporal position of sampling process laser back-reflected beam power signal for measurement and analysis of one embodiment.
FIG. 40B shows for illustrative purposes only an example of temporal separation of a Process Laser pulse and a secondary laser pulse generated by a Process Laser source for in-situ pre-process surface inspection of one embodiment.
FIG. 40C shows for illustrative purposes only an example of temporal separation of a Process Laser pulse and a secondary laser pulse generated by a Process Laser source for in-situ post-process surface inspection of one embodiment.

FIG. 40A shows for illustrative purposes only an example of a back reflected process beam collected and analyzed of one embodiment. FIG. 40A shows for illustrative purposes only an example of a temporal position of sampling process laser back-reflected beam power signal for measurement and analysis of one embodiment.

FIG. 40A shows a process laser pulse 4000 impinging a region on the target surface. The back-reflected process laser light pulse (i.e., probe pulse) 4010 is sampled by the apparatus photo-detector(s), over an arbitrary time period just before a process laser pulse 4000 ends. The corresponding power signal generated by the receiver photo-detector(s) in the apparatus is analyzed for in-situ post-process surface inspection of the treated region at the end of a Process Laser pulse 4000 of one embodiment.

FIG. 40B shows for illustrative purposes only an example of an in-situ pre-process surface inspection of one embodiment. FIG. 40B shows for illustrative purposes only an example of temporal separation of a Process Laser pulse 4000 and a Probe laser pulse 4005, i.e. a secondary pulse generated by the apparatus Process Laser source impinges a region on the target surface just before a Process Laser pulse 4000 for in-situ pre-process surface inspection of one embodiment. The back-reflected light of the probe laser pulse impinging a region is collected and detected by photo-detector(s) deployed inside the apparatus A probe power signal is generated by the photo-detector(s) deployed inside the apparatus and sent to Probe Signal Analyzer 310 of FIG. 5 to analyze surface condition of the region.

FIG. 40C shows for illustrative purposes only an example of an in-situ post-process surface inspection of one embodiment. FIG. 40C shows for illustrative purposes only an example of temporal separation of a Process Laser pulse and a secondary Probe laser pulse generated by the apparatus Process Laser source 4000 impinges a region on the target surface just after a Process Laser pulse 4000 for in-situ post-process surface inspection of one embodiment. The back-reflected light of the probe laser pulse impinging a region is collected and detected by photo-detector(s) deployed inside the apparatus. A probe power signal is generated by the photo-detector(s) deployed inside the apparatus and sent to Probe Signal Analyzer 310 of FIG. 5 to analyze surface condition of the region after process laser pulse impinges the region.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A method for in-situ processing and inspection of an object, comprising:
   utilizing a process laser beam source in a process for a probe light beam source for in-situ inspection of an object surface;
   impinging at least one process laser pulse onto a target surface region;
   modifying at least one of the optical, mechanical, or chemical properties of a first region of the surface;
   generating back-reflected scattered laser light and/or laser light reflected in a specular beam off an illuminated spot on the object surface generating scattered light emitted in a laser-surface interaction;
   collecting and measuring the generated scattered light and/or laser light reflected in a specular beam off an illuminated spot and/or light emitted in a laser-surface interaction through at least a portion of a combined and collinear optical light path to provide a bi-directional common optic path to analyze the condition of the target spot; and
   constructing an image of the modified surface wherein the constructed image is used to adjust laser pulse intensities for predetermined modifications to other regions.

2. The method for in-situ processing and inspection of an object of claim 1, further comprising impinging with a process laser pulse a region on the target surface, wherein the pulsed laser source generated laser pulses are directed onto a target surface to modify the surface, and wherein the back-scattered light and/or laser light reflected in a specular beam off the impinged region, is collected just before the process laser pulse ends.

3. The method for in-situ processing and inspection of an object of claim 1, further comprising emitting a secondary laser pulse from the process laser source for a probe light illumination of the first region;
   wherein the secondary laser pulse is provided:
   just after the process laser pulse ends for in-situ post-process inspection; and
   just before the process laser pulse starts for in-situ pre-process inspection.

4. The method for in-situ processing and inspection of an object of claim 1, further comprising deploying a process laser in an integrated apparatus to enable collecting scattered light generated as a result of process laser-surface interaction when a process laser pulse impinges a region of the target surface.

5. The method for in-situ processing and inspection of an object of claim 1, further comprising:
   providing an optical reflector component, allowing the outgoing laser beam to transmit through the optical reflector component and delivery path to a target while separating, in part, back-scattered laser light reflected off the illuminated region and directing it to a photo-detector and analyzer device.

6. The method for in-situ processing and inspection of an object of claim 1, further comprising redirecting the specularly-reflected beam off an illuminated region out of the outgoing laser process beam path using at least one optical module component.

7. The method for in-situ processing and inspection of an object of claim 1, further comprising circularly polarizing the outgoing laser beam and substantially directing the specularly-reflected beam out of the outgoing beam path for measurement and analysis using an optical module comprising optical polarizers and waveplate components.

8. The method for in-situ processing and inspection of an object of claim 1, further comprising a dichroic mirror component comprising a pass-thru opening;
   permitting outgoing beams to pass through and impinge on a target surface while separating and re-directing process laser constituent in the back-reflected light for independent measurement; and
   further allowing transmission of desired constituents of back-reflected light to return to an optical surface inspection assembly for measurement of a secondary probe light of interest.

9. The method for in-situ processing and inspection of an object of claim 1, further comprising:
   providing additional probe beam source impinging a region on the target surface for in-situ inspection;
   combining and directing collinear probe and process beams onto a target surface;

substantially superimposing probe and process beams focus spots onto the object surface;

providing an additional photo-detector;

collecting and measuring the generated probe and/or process scattered light and/or light reflected in a specular beam off an illuminated spot to analyze the condition of the target spot; and assessing modifications continually to each target region and controlling predetermined modifications to the next region by automatically adjusting laser pulse intensities of the laser beam.

10. The method for in-situ processing and inspection of an object of claim 9, wherein the intensity distribution of the focal spot of a process laser beam, comprises a desired profile structure, a flat-top or multi-mode profile, and further wherein the said focus spots are circular, or square, or rectangular, or of a desired shape.

11. The method recited in claim 9, wherein sampling of the probe light reflected off of a laser-treated region is temporally synchronized with the process laser pulse to perform in-situ post-laser-modification inspection of a region, or/and to perform in-situ pre-laser-modification inspection of the region, and the method further comprising in-situ adjusting or muting the laser pulse intensity of the at least one ensuing pulse.

12. The method for in-situ processing and inspection of an object of claim 9 wherein laser pulses are directed onto a target surface to modify the surface wherein the surface modification comprises ablating and removing surface contaminants, surface stains, and surface protective or decorative layer(s).

13. The method for in-situ processing and inspection of an object of claim 9, wherein focus spots of a process beam and a probe beam on a target surface are spatially separated with minimal overlap or gap, further wherein the focus spots concurrently move on the surface region to region, wherein:

The focused probe spot lags the process spot for in-situ post-process inspection of a treated region, or The focused probe spot leads the process spot for in-situ pre-process inspection of a target region.

14. An apparatus, comprising:

a process laser beam source coupled to an optical surface inspection integrated system configured to use in a process and utilized as a probe light beam source for in-situ surface inspection;

an optical reflector component comprising a reflective slab-shape flat mirror with a pass-thru-hole coupled to the optical surface inspection assembly integrated system configured to allow the outgoing laser beam to propagate through the hole and delivery path to a target, while separating, in part, back-scattered laser light reflected off the illuminated region and directing it to the apparatus photo-detector device;

a collection and measurement device coupled to the optical surface inspection integrated system configured to collect and measure the generated scattered laser light and/or laser light reflected in a specular beam off an illuminated spot to analyze the condition of the target spot;

a probe illumination light beam configured to be directed to the optics path for producing a combined and collinear optical light path, wherein the combined and collinear optical light path are focused and delivered at a same region on the surface;

a process laser system coupled to the optical surface inspection integrated system configured to be an energy source for modifying at least one of an optical, mechanical, or chemical property of a first region of the surface; and wherein focused spots of a process beam and a probe beam on a target surface are spatially separated with minimal overlap or gap, as an example by appropriately deploying a wedge prism component in the optical path of the collinear combined process and probe beams after the focusing lens, and further wherein the focused spots concurrently move on the surface region to region, wherein the focused probe spot lags the process spot for in-situ post-process inspection of a treated region, or the focused probe spot leads the process spot for in-situ pre-process inspection of a target region.

15. The apparatus of claim 14, wherein optical surface inspection (OSI), assembly further comprising an optical reflector component configured to allow an outgoing laser beam to transmit through the optical reflector component and delivery path to a target while separating, in part, back-scattered laser light reflected off the illuminated region and directing it to an apparatus photo detector and analyzer device wherein said optical reflector component comprises;

a reflective slab-shape flat mirror with a pass-thru-hole, to allow the outgoing laser beam to propagate through the hole; or a reflective slab-shape flat mirror with a proper surface coating to efficiently reflect, in part, the back-scattered light, and substantially transmit the outgoing process beam; or a prism-shaped optical reflector comprising a through-opening and a reflective surface, wherein said reflective surface is a concave, convex, or flat surface.

16. The apparatus of claim 14, further comprising beam shaping and focusing optics to shape and focus the process laser beam to a focal spot of desired shape, size, and intensity distribution profile on the target surface, wherein, The beam shaping optics comprises refractive optics; or diffractive optics.

17. The apparatus of claim 14, further comprising a dichroic mirror component comprising a pass-thru opening coupled to the optical surface inspection integrated system configured to permit outgoing beams to pass through and impinge on a target surface while separating and re-directing process laser constituent in the back-reflected light, or constituent scattered light of interest, to an apparatus photo-detector and analyzer device for independent measurement using.

18. The apparatus of claim 14, further comprising a secondary laser pulse from the process laser configured for emitting a probe light illumination of the first region just before and/or after the process laser pulse ends.

19. The apparatus of claim 14, further comprising:

an additional probe beam source impinging a region on the target surface for in-situ inspection;

a combination of at least one collinear probe and at least one process beam directed towards a target surface;

an additional photodetector, wherein a photodetector is a sensor configured to send a current electrical signal to a signal analyzer to measure and determine the laser light intensity; and collecting and measuring the generated probe and/or process scattered light and/or light reflected in a specular beam off an illuminated spot to analyze the condition of the target spot.

* * * * *